(12) United States Patent  
Woodward et al.

(10) Patent No.: US 11,967,884 B2
(45) Date of Patent: Apr. 23, 2024

(54) ENERGY CONVERSION DEVICE, ASSOCIATED SYSTEMS AND METHODS

(71) Applicant: GIG Energy LLC, Provo, UT (US)

(72) Inventors: Jon Woodward, Mapleton, UT (US); Craig Allan Coad, Coeur d'Alene, ID (US); Hal Parks, Litchfield Park, AZ (US)

(73) Assignee: GIG Energy LLC, Provo, UT (US)

( * ) Notice: Subject to any disclaimer, the term of this patent is extended or adjusted under 35 U.S.C. 154(b) by 33 days.

(21) Appl. No.: 17/805,949

(22) Filed: Jun. 8, 2022

(65) Prior Publication Data

US 2022/0393549 A1    Dec. 8, 2022

Related U.S. Application Data

(60) Provisional application No. 63/298,771, filed on Jan. 12, 2022, provisional application No. 63/208,167, filed on Jun. 8, 2021.

(51) Int. Cl.
    *H02K 7/18*      (2006.01)
    *H02J 3/38*      (2006.01)
    (Continued)

(52) U.S. Cl.
    CPC .............. *H02K 7/183* (2013.01); *H02J 3/381* (2013.01); *H02K 7/003* (2013.01); *H02K 7/08* (2013.01);
    (Continued)

(58) Field of Classification Search
    CPC .. F03D 1/00; H02J 3/381; H02K 7/18; H02K 7/118; H02K 7/116; H02K 7/08;
    (Continued)

(56) References Cited

U.S. PATENT DOCUMENTS 8,436,485 B1 *   5/2013   Smith ................... F03D 9/11
                                                                        290/55
9,067,500 B2 *   6/2015   Penev ................... F03D 9/32
                 (Continued)

FOREIGN PATENT DOCUMENTS

KR           20-0326768 Y1     9/2003
KR        10-2012-0000189 A     1/2012
                 (Continued)

OTHER PUBLICATIONS

International Search Report for International Application No. PCT/US2022/072813 dated Sep. 29, 2022, 4 pages.

(Continued)

*Primary Examiner* — Igor Kershteyn
(74) *Attorney, Agent, or Firm* — TraskBritt

(57) ABSTRACT

An energy conversion device may include a shaft including a first portion and a second portion wherein the first portion of the shaft is configured to rotate relative to the second portion of the shaft. A rotor may be coupled to the first portion of the shaft and a stator may be coupled to the second portion of the shaft. A first one-way bearing may be coupled to the first portion of the shaft and configured to transfer rotational input to the first portion of the shaft in a first direction. A second one-way bearing may be coupled to the second portion of the shaft and configured to transfer rotational input to the second portion of the shaft in a second direction opposite the first direction.

20 Claims, 64 Drawing Sheets

(51) Int. Cl.
*H02K 3/38* (2006.01)
*H02K 7/00* (2006.01)
*H02K 7/08* (2006.01)
*H02K 7/11* (2006.01)
*H02K 7/116* (2006.01)
*H02K 11/00* (2016.01)

(52) U.S. Cl.
CPC ......... *H02K 7/116* (2013.01); *H02K 11/0094* (2013.01)

(58) Field of Classification Search
CPC .......... H02K 7/183; H02K 5/26; H02K 21/22; H02K 11/0094; H02K 16/005
See application file for complete search history.

(56) References Cited

U.S. PATENT DOCUMENTS

| | | | |
|---|---|---|---|
| 10,207,588 B1 * | 2/2019 | Roden | B60L 8/006 |
| 10,358,039 B1 * | 7/2019 | Frierman | F03D 3/02 |
| 10,479,197 B1 | 11/2019 | Kim | |
| 11,124,063 B2 * | 9/2021 | Albrecht | B61D 43/00 |
| 2005/0184529 A1 * | 8/2005 | Ueda | B60W 20/00 |
| | | | 290/40 C |
| 2007/0163829 A1 | 7/2007 | Ellis | |
| 2014/0116042 A1 | 5/2014 | Lo et al. | |
| 2017/0342964 A1 | 11/2017 | Cianflone | |
| 2018/0347669 A1 | 12/2018 | Nayak et al. | |
| 2021/0126509 A1 * | 4/2021 | Macaluso | B60L 50/90 |
| 2022/0161621 A1 | 5/2022 | Verdyan et al. | |

FOREIGN PATENT DOCUMENTS

| | | |
|---|---|---|
| KR | 10-2013-0058433 A | 6/2013 |
| KR | 10-2016-0091066 A | 8/2016 |
| KR | 10-1687910 B1 | 12/2016 |

OTHER PUBLICATIONS

International Written Opinion for International Application No. PCT/US2022/072813 dated Sep. 29, 2022, 4 pages.

* cited by examiner

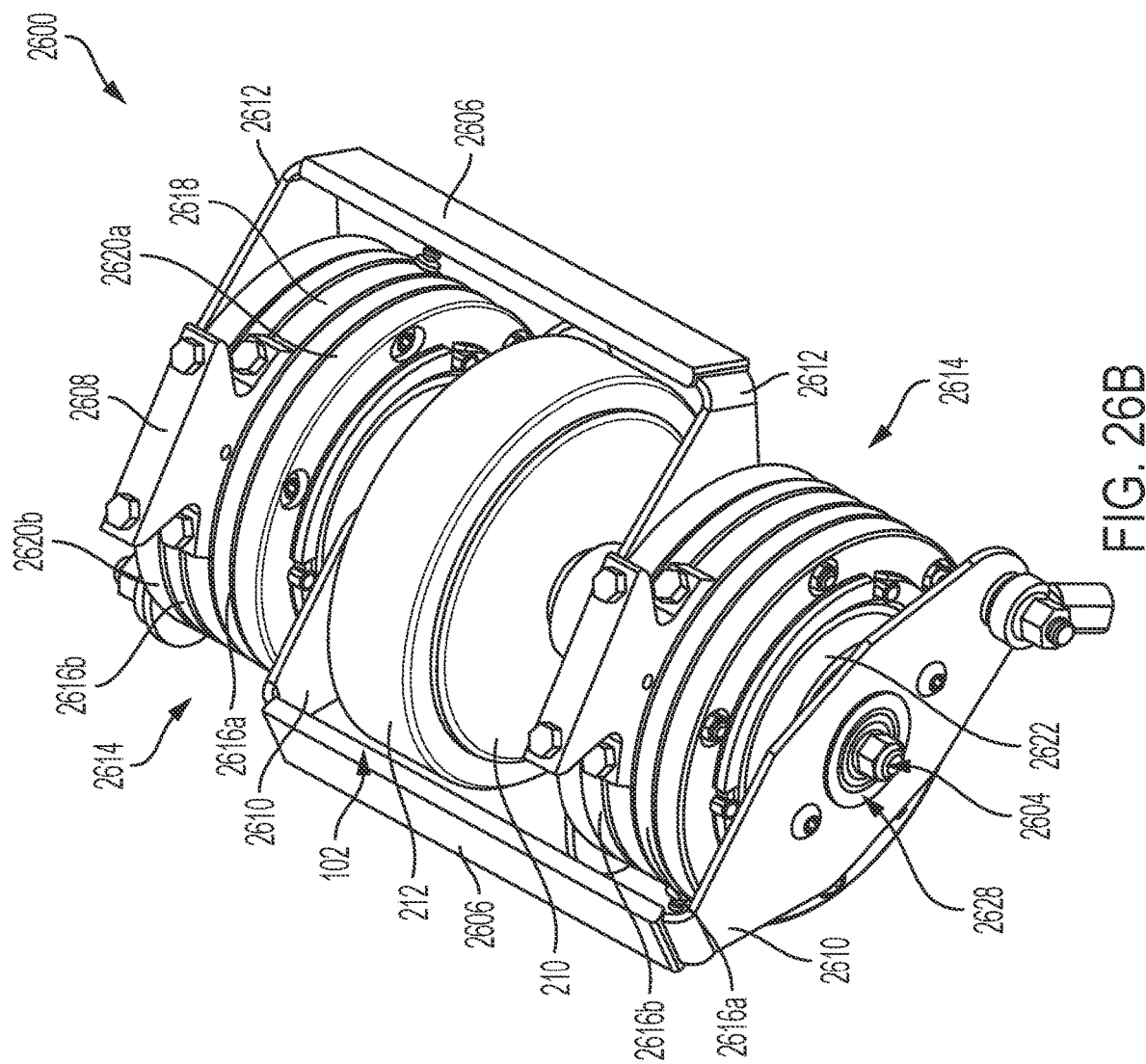

ENERGY CONVERSION DEVICE, ASSOCIATED SYSTEMS AND METHODS

CROSS-REFERENCE TO RELATED APPLICATIONS

This application claims the benefit under 35 U.S.C. § 119(e) of U.S. Provisional Patent Application Ser. No. 63/208,167, filed Jun. 8, 2021, and to U.S. Provisional Patent Application Ser. No. 63/298,771, filed Jan. 12, 2022, the disclosure of each of which is hereby incorporated herein in its entirety by this reference.

TECHNICAL FIELD

Embodiments of the present disclosure generally relate to energy conversion devices. In particular, embodiments of the present disclosure relate to energy conversion devices and associated systems and methods.

BACKGROUND

Increasing costs of fossil fuels have increased the search for alternative methods means of obtaining and utilizing energy. Often the alternative methods involve electrical generators configured to harness other types of energy, such as kinetic energy from movement of a medium, and convert the energy into electrical energy. Some examples include windmills that convert kinetic energy from the movement of air into electrical power by rotating the blades of the windmill. Another example includes hydroelectric dams that pass water flowing down through the dam through a turbine while converting the kinetic energy of the moving water into electrical energy.

The increasing cost of fossil fuels used to power internal combustion engine vehicles has also led to the development of hybrid vehicles. Hybrid vehicles are powered by both an internal combustion engine and an electric motor. The electric motor is powered by a battery provided on the vehicle. The internal combustion engine typically provides power to the battery through an electric generator. The generator is mechanically connected to the internal combustion engine and is electrically connected to the battery. Operation of the internal combustion engine rotates the armature of the generator relative to the stator of the generator, which produces electricity that charges the battery. In the operation of a conventional hybrid vehicle, the output of the internal combustion engine is relied on in rotating the armature of the generator to produce the electricity that recharges the vehicle battery.

BRIEF SUMMARY

Embodiments of the present disclosure may include an energy conversion device. The device may include a shaft including a first portion and a second portion wherein the first portion of the shaft is configured to rotate relative to the second portion of the shaft. The device may also include a rotor coupled to the first portion of the shaft. The device may further include a stator coupled to the second portion of the shaft. The device may also include a first one-way bearing coupled to the first portion of the shaft configured to transfer rotational input to the first portion of the shaft in a first direction. The device may further include a second one-way bearing coupled to the second portion of the shaft configured to transfer rotational input to the second portion of the shaft in a second direction opposite the first direction.

Another embodiment of the present disclosure may include an energy conversion assembly. The assembly may include a drive shaft, the drive shaft including a first portion and a second portion, wherein the first portion is configured to rotate relative to the second portion. The assembly may further include a first input arm coupled to the drive shaft through at least two one-way bearings. A first one-way bearing may be coupled to the first portion of the drive shaft and positioned in a first direction and a second one-way bearing may be coupled to the second portion of the drive shaft in a second direction opposite the first direction. The assembly may also include a generator coupled to the drive shaft. The generator may include a rotor and a stator, wherein the rotor is coupled to the first portion of the drive shaft and the stator is coupled to the second portion of the drive shaft.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
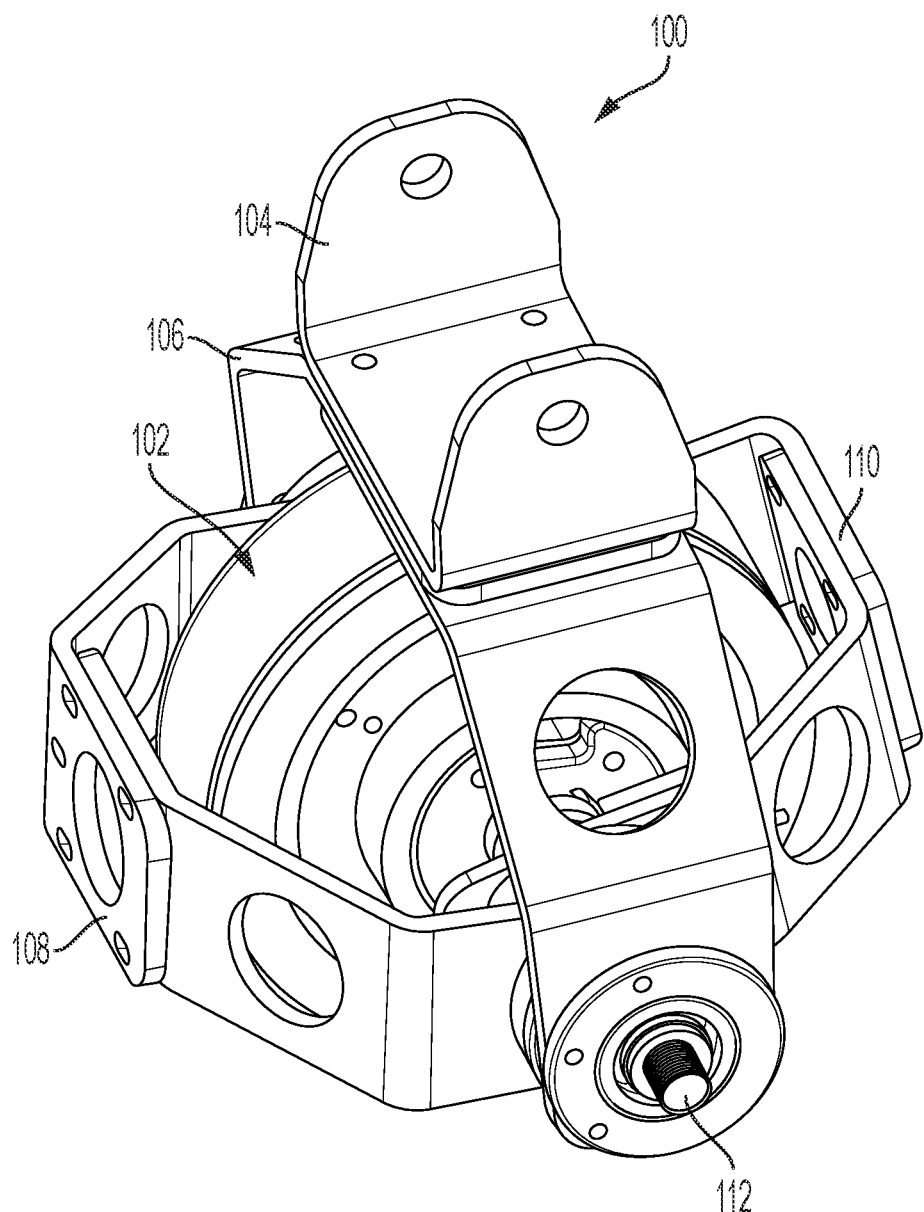
FIGS. 1-5 illustrate different views of an energy conversion device in accordance with embodiments of the present disclosure.

The illustrations presented herein are not meant to be actual views of any particular energy conversion device or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As discussed above, increasing costs of fossil fuels have increased the use of alternative methods for converting energy beyond burning fossil fuels. One type of kinetic energy that may be harnessed to convert into electrical energy may be oscillating motion, such as vibrations, waves on a body of water, or movement of a spring system, such as a suspension system.

Embodiments described in the present disclosure include an energy conversion apparatus for converting oscillating motion, such as vibrations experienced by a vehicle (e.g., automobile, car, truck, semi-truck, locomotive, all-terrain vehicle (ATV), utility vehicle (UTV), tractor, etc.) or waves on a body of water (e.g., ocean, sea, lake, pond, river, etc.) into usable energy, such as electrical energy. The embodiments of the present disclosure may convert an oscillating motion into rotation of a single direction. The single direction rotation may rotate an internal generator configured to generate electrical power by rotating magnets relative to a series of coils.

Generating electrical power from vibrations may provide advantages over conventional energy conversion devices (e.g., devices that capture energy when vehicles are braking). For instance, the energy conversion device of the present disclosure may allow vehicles to generate power from suspension vibrations that occur anytime the vehicle is moving. The foregoing may reduce extreme cycles on rechargeable batteries and may reduce fuel consumption. Furthermore, some embodiments of the present disclosure may allow the generation of power (e.g., provide renewable energy) directly from the oscillatory motion of waves on a body of water, which may increase the efficiency of tidal generators that convert the energy of the waves multiple times before generating electricity, such as generating hydraulic pressure from the waves that is then used to turn a hydraulic pump to generate electricity.

In some embodiments, the energy conversion device may be attachable to current vehicles not currently using energy conversion devices. For instance, the energy conversion device of the present disclosure may provide a "clamp on" device/solution for most, if not all, vehicles for capturing additional energy and reducing fuel consumption.

FIGS. 1-5 are views of an energy conversion device 100. The energy conversion device 100 may include a generator 102 configured to generate electrical energy from rotational motion. The generator 102 is described in further detail below in reference to FIG. 9-FIG. 17. The energy conversion device 100 may be configured to mount to a structure through a mount 104 and a mount arm 106. The structure may be a substantially stationary structure relative to the motion being captured and converted to electrical energy. For example, the stationary structure may be the frame of a vehicle and the motion being captured may be at least one of suspension motion relative to the frame, axle motion relative to the frame, wheel motion relative to the frame, etc.

The mount arm 106 may be configured to secure the entire assembly to a relatively stationary structure. The mount arm 106 may be rotationally secured to the shaft 112 on either side of the assembly through bearings 302. The bearings 302 may be ball bearings, roller bearings, etc., configured to allow substantially free rotation in at least two opposing directions about an axis of the respective bearing 302, such that the shaft 112 and the generator 102 may rotate about an axis of the shaft 112 relative to the mount arm 106.

The energy conversion device 100 may be configured to receive the motion through an outer input arm 108 and an inner input arm 110. The outer input arm 108 and the inner input arm 110 may be coupled to the shaft 112 through respective outer bearings 202a, 202b and inner bearings 204a, 204b. The outer bearings 202a, 202b and the inner bearings 204a, 204b may be one directional bearings (e.g., unidirectional bearings, sprag clutch, one-way bearing, etc.) configured to allow free rotation in one direction while transmitting rotation from the respective outer input arm 108 or inner input arm 110 to the shaft 112 in the other direction.

Figure 2:
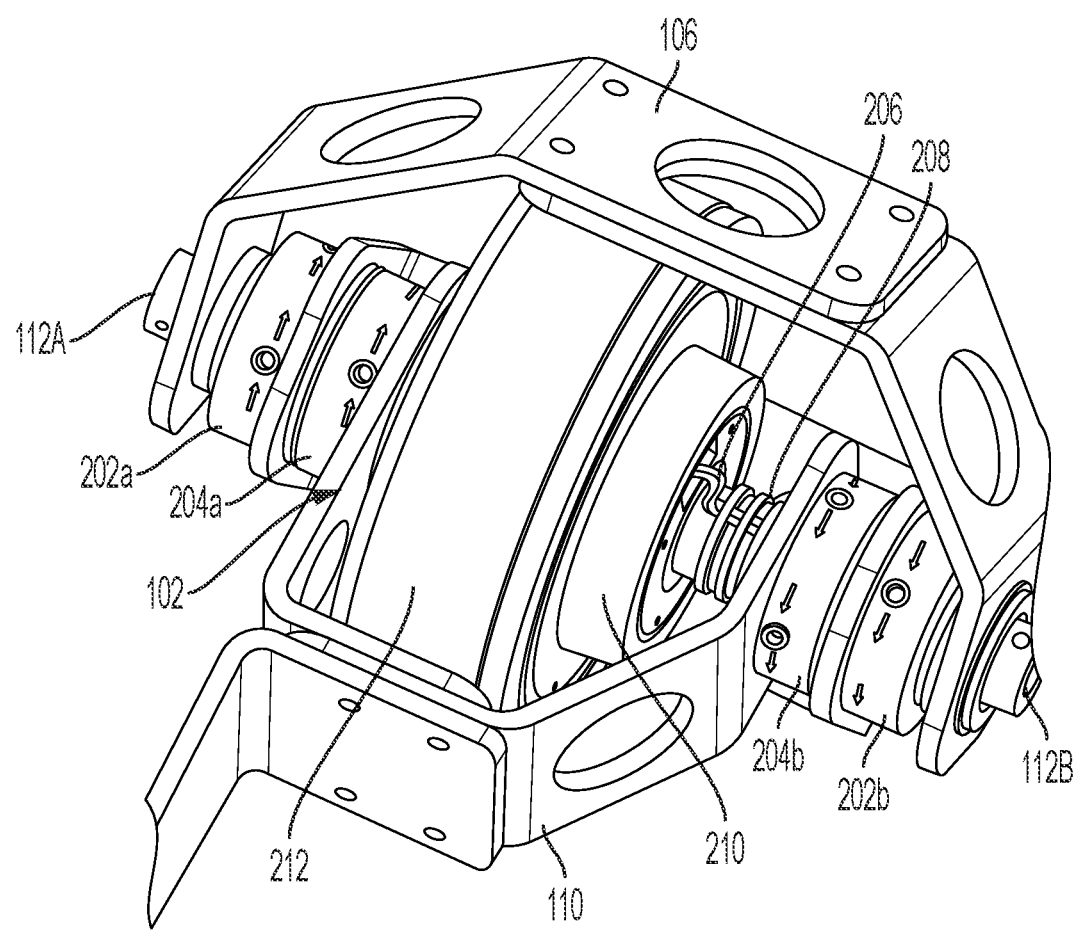
Figure 3:
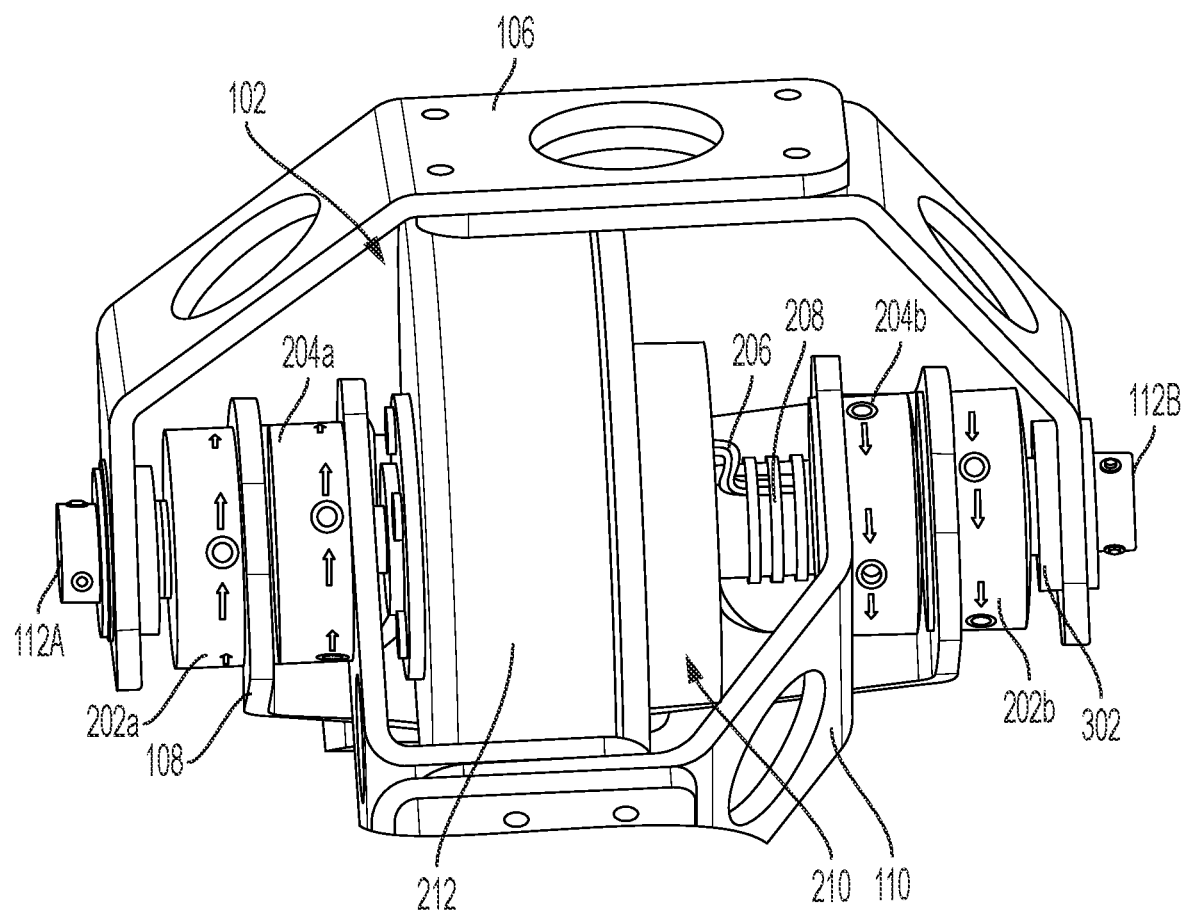

The generator 102 may be formed from two casing members, referred to herein as a rotor 212 (e.g., a first casing member) and a stator 210 (e.g., a second casing member), that are configured to rotate relative to one another. As described in further detail below with respect to FIG. 9, the shaft 112 may be formed in at least two interlocking section configured to rotate relative to one another. A first portion of the shaft 112A may be coupled to the rotor 212 and a second portion of the shaft 112B may be coupled to the stator 210. As illustrated in FIGS. 2 and 3, the outer bearing 202*a* and the inner bearing 204*a* on the first portion of the shaft 112A coupled to the rotor 212 may be positioned in a first direction, such that motion of the inner input arm 110 and the outer input arm 108 may cause the rotor 212 to rotate in the first direction. The outer bearing 202*b* and the inner bearing 204*b* on the second portion of the shaft 112B may be positioned in a second direction opposite to the first direction of the outer bearing 202*a* and inner bearing 204*a* on the first portion of the shaft 112A. Thus, oscillating motion input to the shaft 112 by the outer input arm 108 or the inner input arm 110 may cause the rotor 212 to rotate in the first direction and may cause the stator 210 to rotate in the second opposite direction. The oscillating input may cause the rotor 212 and the stator 210 to rotate at substantially the same speed in opposing directions, such that the relative rotational speed between the rotor 212 and the stator 210 is about twice the rotation speed of the rotor 212 and/or stator 210 alone.

The rotation of the rotor 212 relative to the stator 210 of the generator 102 may generate electrical energy. The electrical energy may be output from the generator 102 through wires 206. The wires 206 may be coupled to electrical outputs 208. The electrical outputs 208 may be conductive paths about the shaft 112 configured to interface with stationary electrical pick-ups, such as brushes, to transfer the electrical energy from the rotating generator 102 and shaft 112 to a stationary device.

As illustrated in FIGS. 1-3, the mount arm 106 may be the outermost arm and the outer input arm 108 and the inner input arm 110 may be nested inside the mount arm 106. In some embodiments, the arrangement of arms 106, 108, 110 may be different. For example, the mount arm 106 may be the innermost arm and the outer input arm 108 may be the outermost arm. The arrangement of the arms 106, 108, 110 may be adjusted for different applications in consideration of space requirements, locations of the oscillating structures relative to the stationary structure, etc.

As illustrated, the arms 106, 108, 110 may each have substantially similar shapes, such that changing an arrangement of the arms 106, 108, 110 may be accomplished by changing the positions of the outer bearings 202*a*, 202*b*, inner bearings 204*a*, 204*b*, and bearings 302 to change the respective functions of the arms 106, 108, 110.

Figure 6:
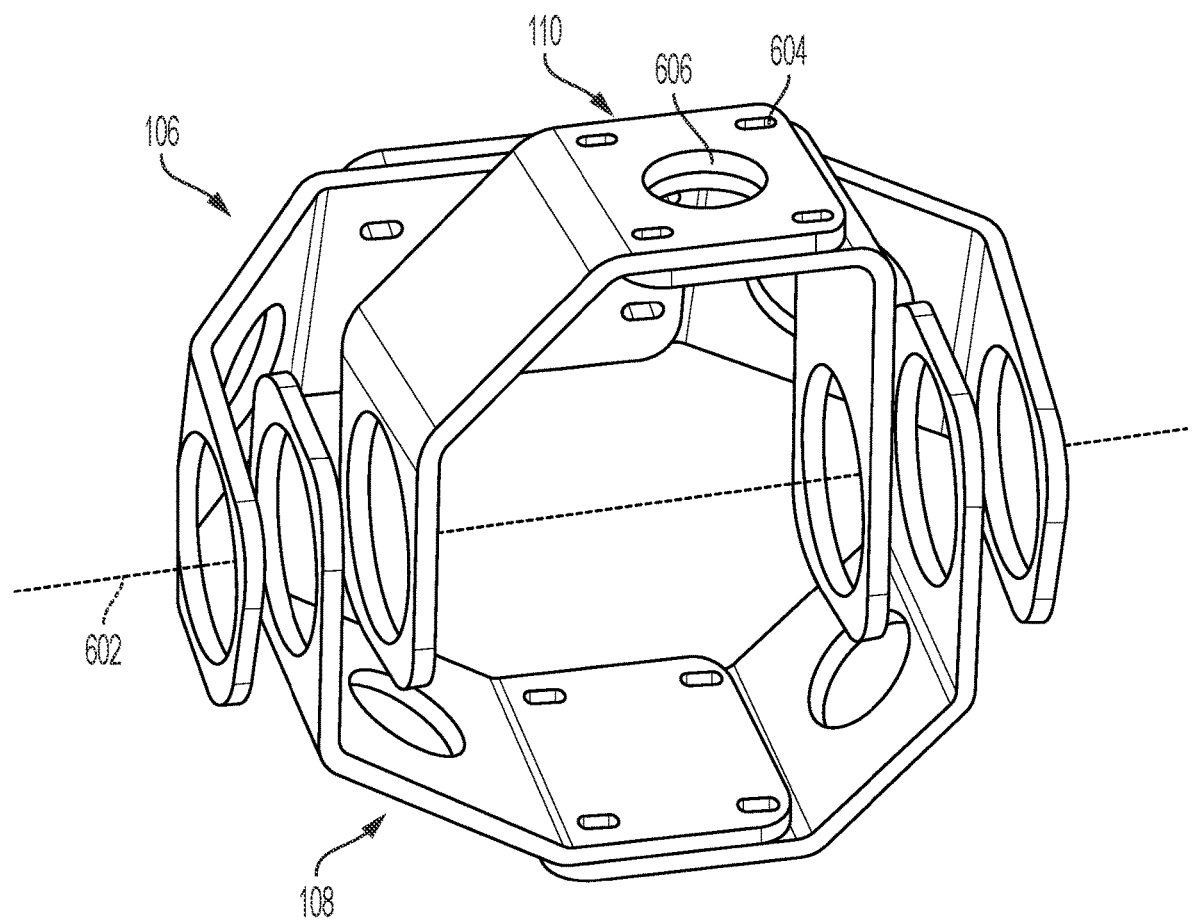
FIGS. 6 and 7 illustrate different perspective views of the input and mounting arms of the energy conversion device illustrated in FIGS. 1-5 in accordance with one or more embodiments of the present disclosure.
Figure 7:
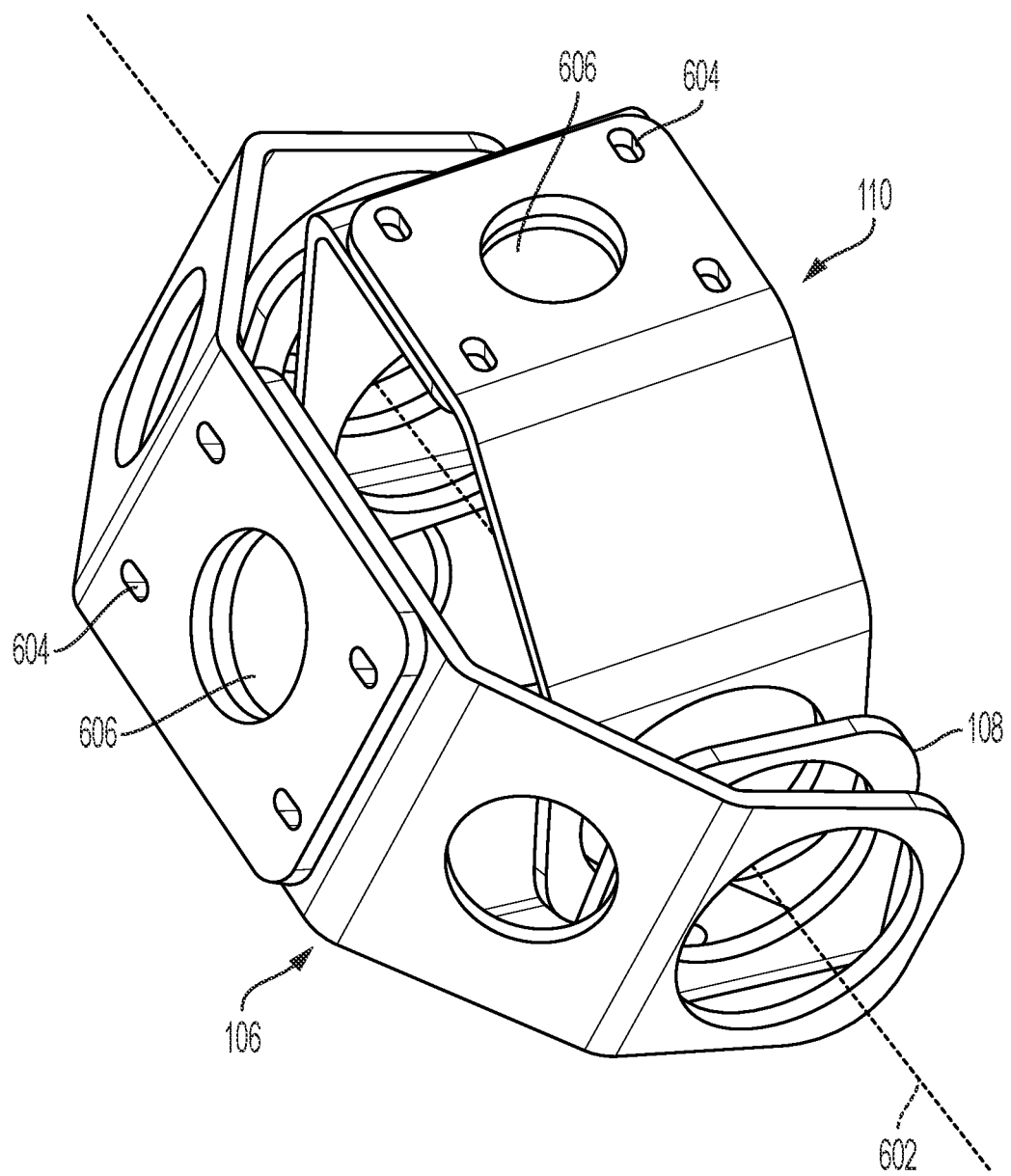

FIGS. 6 and 7 illustrate views of the arms of the energy conversion device 100. The energy conversion device 100 may include at least three arms. One of the arms may be a mount arm 106 configured to secure the energy conversion device 100 to a support structure. The other two arms may be input arms 108 and 110. The arms may be configured such that each may rotate relative to the other arms about an axis 602. When the energy conversion device 100 is assembled, the axis 602 may be substantially coaxial with the axis of the shaft 112, such that each of the arms is configured to rotate relative to the other arms about the axis of the shaft 112.

In some embodiments, one or more of the arms 106, 108, 110 may be formed from multiple pieces as illustrated in FIG. 6 and FIG. 7. The multiple pieces may enable the energy conversion device 100 to be assembled in pieces. For example, the first portion of the shaft 112A coupled to the rotor 212 may be assembled separate from the second portion of the shaft 112B coupled to the stator 210. The two portions may then be coupled together in a separate step.

The arms 106, 108, 110 may include mounting structures 604. The mounting structures 604 may be configured to receive hardware, such as screws, nuts and bolts, studs, rivets, etc. The hardware may be configured to secure the multiple pieces of the respective arms 106, 108, 110 to one another. In some embodiments, the hardware may be configured to secure the respective arms 106, 108, 110 to a structure. For example, as described above, the mount arm 106 may be secured to a relatively stationary structure. The outer input arm 108 and the inner input arm 110 may be secured to an oscillating structure, such as a suspension arm, a suspension mount, a spring mount, a shock mount, an axle, a wheel hub, etc.

In some embodiments, one or more of the arms 106, 108, 110 may include an aperture 606. The aperture 606 be configured to align the respective arms 106, 108, 110 with the respective structures to which they may be mounted. In some embodiments, the aperture 606 may enable a portion of the respective structure to pass through the respective arm 106, 108, 110.

Figure 8:
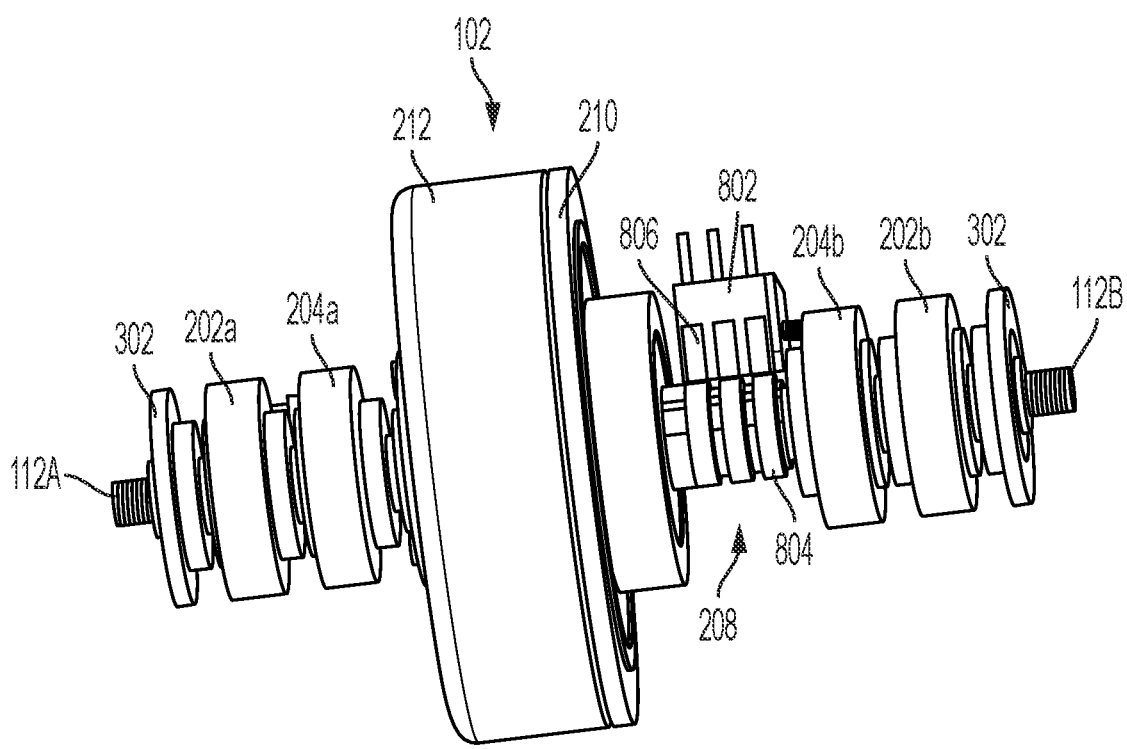
FIG. 8 illustrates a perspective view of the energy conversion device of FIGS. 1-5 with the arms removed in accordance with one or more embodiments of the present disclosure.

FIG. 8 illustrates the energy conversion device 100 without the arms 106, 108, 110. The assembly may be assembled along the shaft 112 with the bearings 302 as the outermost elements in the assembly. The one-way outer bearings 202*a*, 202*b* and inner bearings 204*a*, 204*b* may be positioned between the bearings 302 and the generator 102.

The generator 102 may be offset to one side, such that the electrical output 208 may be positioned on the shaft 112 between the stator 210 and the respective inner bearing 204*b*. As described above, the electrical output 208 may include raised conductive paths 804 extending around the shaft 112. The conductive paths 804 of the electrical output 208 may be formed from a conductive metal. In some embodiments, the electrical output 208 may include multiple conductive paths 804. For example, the number of conductive paths 804 may correspond to the phases of the generator 102 similar to the number of wires. As illustrated in FIG. 8, a three phase generator 102 may include an electrical output 208 having three raised conductive paths 804, wherein each raised conductive path 804 corresponds to a phase.

The conductive paths 804 may interface with a pick-up module 802. The pick-up module 802 may include multiple pick-ups 806 (e.g., brushes) corresponding to the raised conductive paths 804. The pick-ups 806 may be configured to receive electrical energy from the conductive paths 804 through sliding contact between the pick-ups 806 and the conductive paths 804, similar to the transfer of electrical energy between a brush and a commutator in a brushed electric motor. The pick-up module 802 may remain substantially stationary enabling the transfer of power from the rotating generator 102 to a stationary electrical element or energy storage device.

Figure 9:
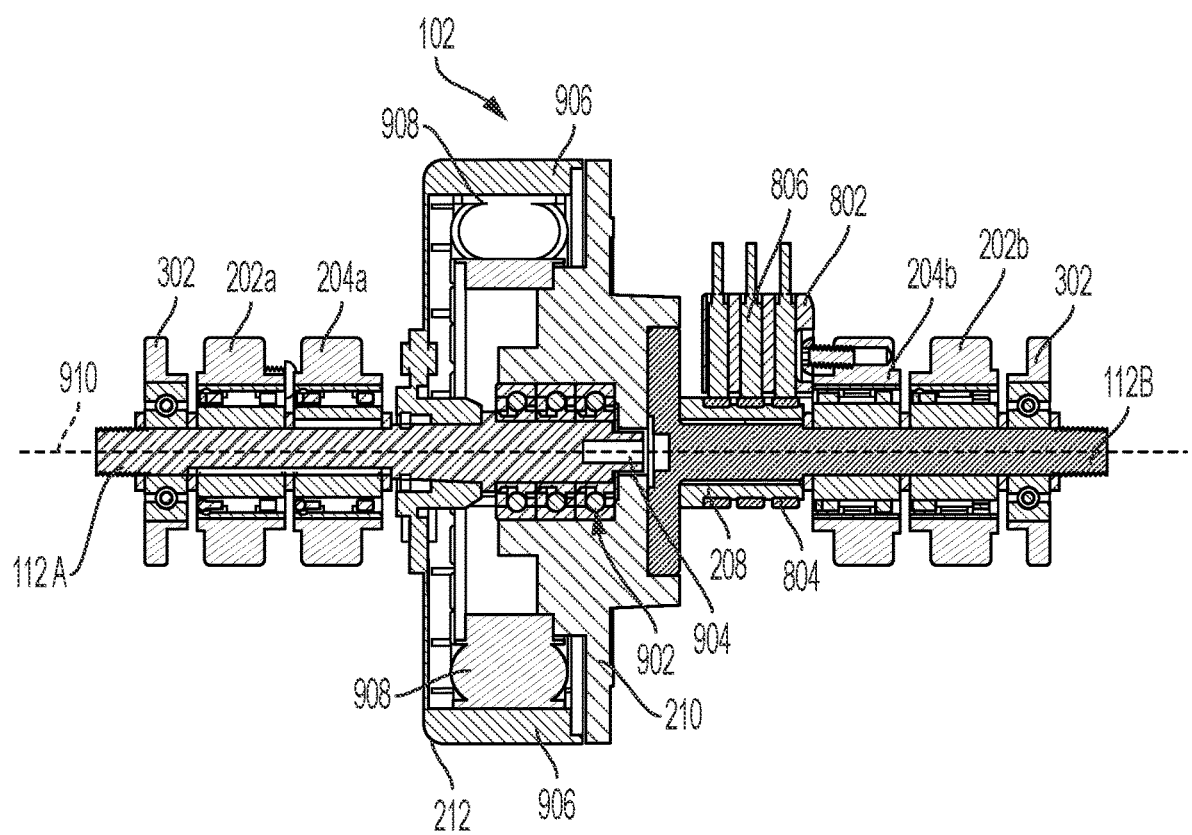
FIG. 9 illustrates a cross-sectional view of the energy conversion device of FIGS. 1-5 with the arms removed in accordance with one or more embodiments of the present disclosure.

FIG. 9 illustrates a cross-sectional view of the energy conversion device 100. As described above, the energy conversion device 100 may include two adjoining portions associated respectively with the rotor 212 and the stator 210. The portion associated with the rotor 212 may be assembled on a first portion of the shaft 112A and the portion associated with the stator 210 may be assembled on the second portion of the shaft 112B. The first portion of the shaft 112A may be coupled to the second portion of the shaft 112B through a coupler 904. The coupler 904 may be configured to secure the two portions of the shaft 112A, 112B, in a manner such that the first portion of the shaft 112A may rotate relative to the second portion of the shaft 112B about an axis 910 of the shaft while maintaining the two portions of the shaft 112A, 112B in a substantially coaxial relationship. For example, the coupler 904 may include two coaxial protrusions extending in opposite directions along the axis 910. A first protrusion may extend into the first portion of the shaft 112A and a second protrusion may extend into the second portion of the shaft 112B, such that the first portion of the shaft 112A and the second portion of the shaft 112B may be secured to one another in a substantially coaxial relationship through the coupler 904.

The stator 210 may include one or more support bearings 902 configured to create an interface between the stator 210 and the first portion of the shaft 112A. The support bearing 902 may be configured to allow the stator 210 to rotate relative to the first portion of the shaft 112A while also allowing the first portion of the shaft 112A to rotate in an opposite direction relative to the stator 210. The support bearings 902 may also be configured to substantially maintain a coaxial relationship between the stator 210 and the first portion of the shaft 112A.

The first portion of the shaft 112A may be coupled to the rotor 212 of the generator 102, such that the rotor 212 is configured to rotate with the first portion of the shaft 112A relative to the second portion of the shaft 112B and the stator 210. The rotor 212 may include a pattern of magnets 906 arranged about an outer portion of the rotor 212. The arrangement of magnets 906 is described in further detail below with respect to FIG. 12 and FIG. 13.

As described above, the outer bearings 202a and the inner bearing 204a may be configured to transfer rotation from the respective arms to the first portion of the shaft 112A in only one direction, while allowing the first portion of the shaft 112A to rotate relative to the respective arms in the opposite direction. Thus, the rotation transferred to the first portion of the shaft 112A may be in only one direction, such that the rotor 212 may only rotate in one direction relative to the stator 210.

The second portion of the shaft 112B may be coupled to the stator 210 of the generator 102, such that the stator 210 is configured to rotate with the second portion of the shaft 112B relative to the first portion of the shaft 112A and the rotor 212. The stator 210 may include multiple sets of windings 908 arranged radially about the stator 210. The windings 908 may be coils of wire configured to generate electrical current in the wire as a magnetic field around the windings 908 changes, such as when the magnets 906 of the rotor 212 pass by the windings 908.

As described above, the outer bearing 202b and the inner bearing 204b may be configured to transfer rotation from the respective arms to the second portion of the shaft 112B in only one direction, while allowing the second portion of the shaft 112B to rotate relative to the respective arms in the opposite direction. Thus, the rotation transferred to the second portion of the shaft 112B may be in only one direction. The one direction may be a direction opposite the direction of the first portion of the shaft 112A, such that the stator 210 may only rotate in an opposite direction relative to the rotor 212. Thus, the rotational speed of the rotor 212 relative to the stator 210 may be greater that the rotational speed of either the rotor 212 or the stator 210 alone.

As a relative rotational speed of the rotor 212 relative to the stator 210 increases, the amount of current generated in the windings 908 may increase. The power generated by the generator 102 may be proportional to the current generated in the winding 908. Thus, by simultaneously rotating the rotor 212 and the stator 210 in opposite directions the power output by the generator 102 may increase over applications that only rotate the rotor 212 or the stator 210. Furthermore, when no rotation is being input through the respective arms, the rotor 212 and the stator 210 may continue to rotate relative to one another at least due to residual momentum and the one directional bearings, such that the rotor 212 and the stator 210 may continue to generating current for a period of time when the other components are at rest.

Figure 10:
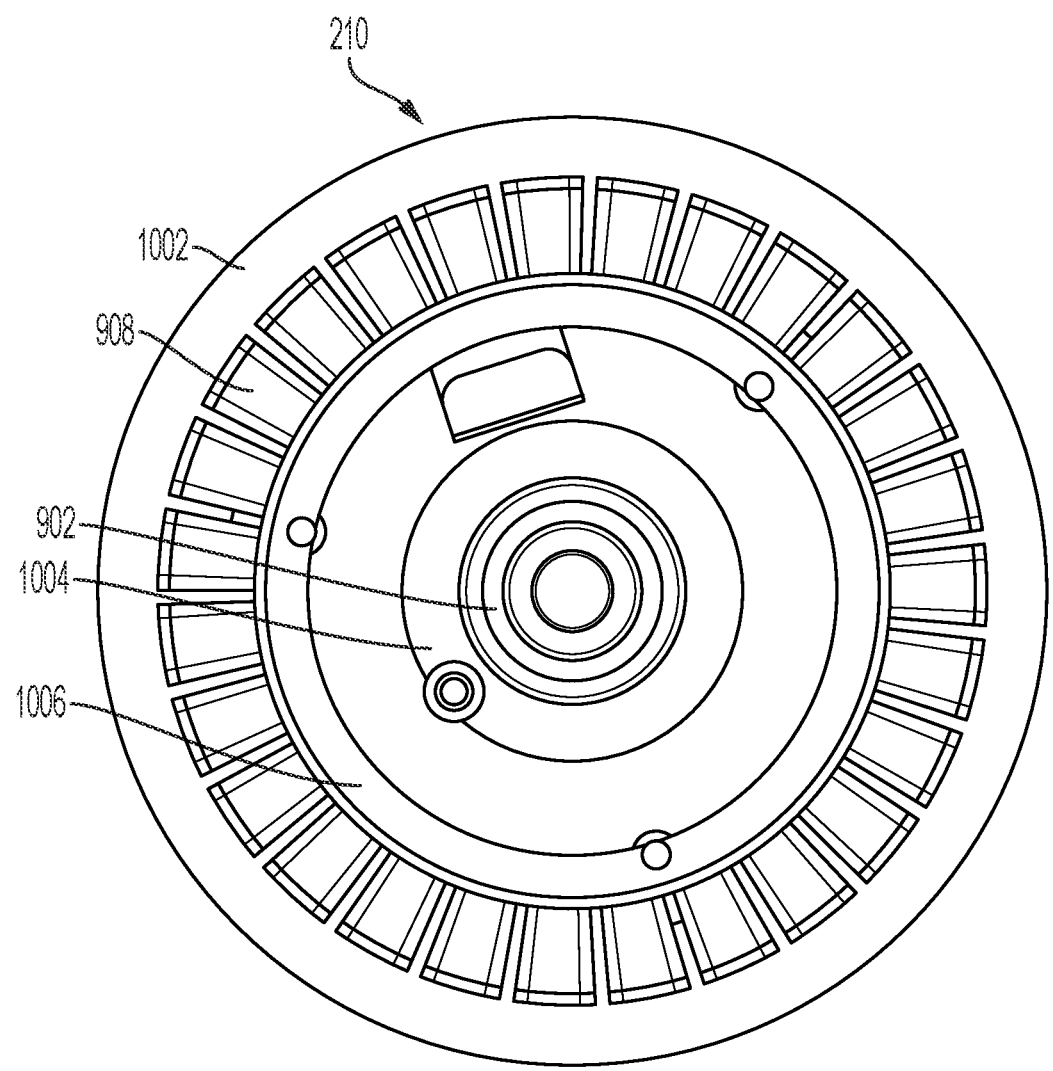
FIGS. 10 and 11 illustrate different views of the stator assembly of the energy conversion device of FIGS. 1-5, 8, and 9 in accordance with one or more embodiments of the present disclosure.
Figure 11:
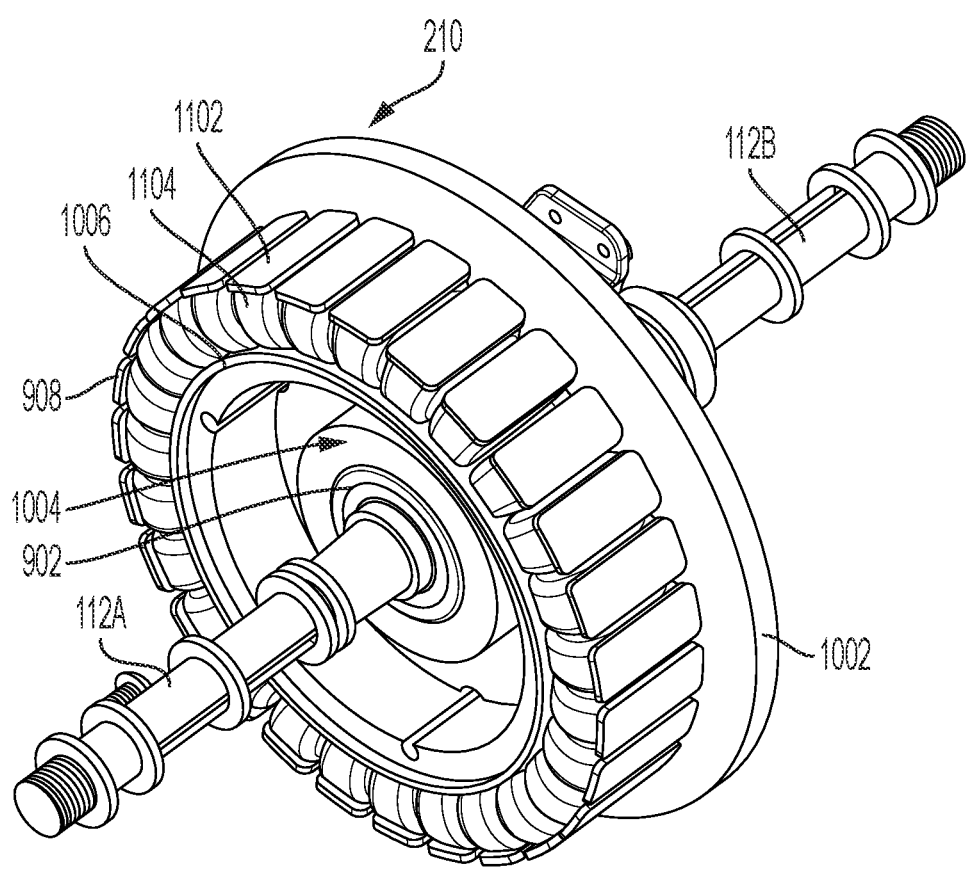

FIG. 10 and FIG. 11 illustrate different views of the stator 210. The stator 210 may include a winding plate 1002 configured to support the windings 908 in a substantially circular arrangement. The winding plate 1002 may be configured to be secured to the second portion of the shaft 112B. The winding plate 1002 may include a stator support 1004 configured to interface with the support bearings 902 to position the stator 210 relative to the first portion of the shaft 112A.

The winding plate 1002 may include a shelf 1006 extending from the winding plate 1002 in an axial direction. The shelf 1006 may be configured to support the windings 908 in a radial configuration about the winding plate 1002. Each of the windings 908 may include wire coils 1104 formed around a core 1102. The number of wire coils in each of the windings 908 may define the voltage output of the winding 908. The wiring between the windings 908 may determine the number of phases produced by the generator 102. For example, if every third winding 908 is connected in series the generator 102 may produce 3-phase power when it rotates.

Figure 12:
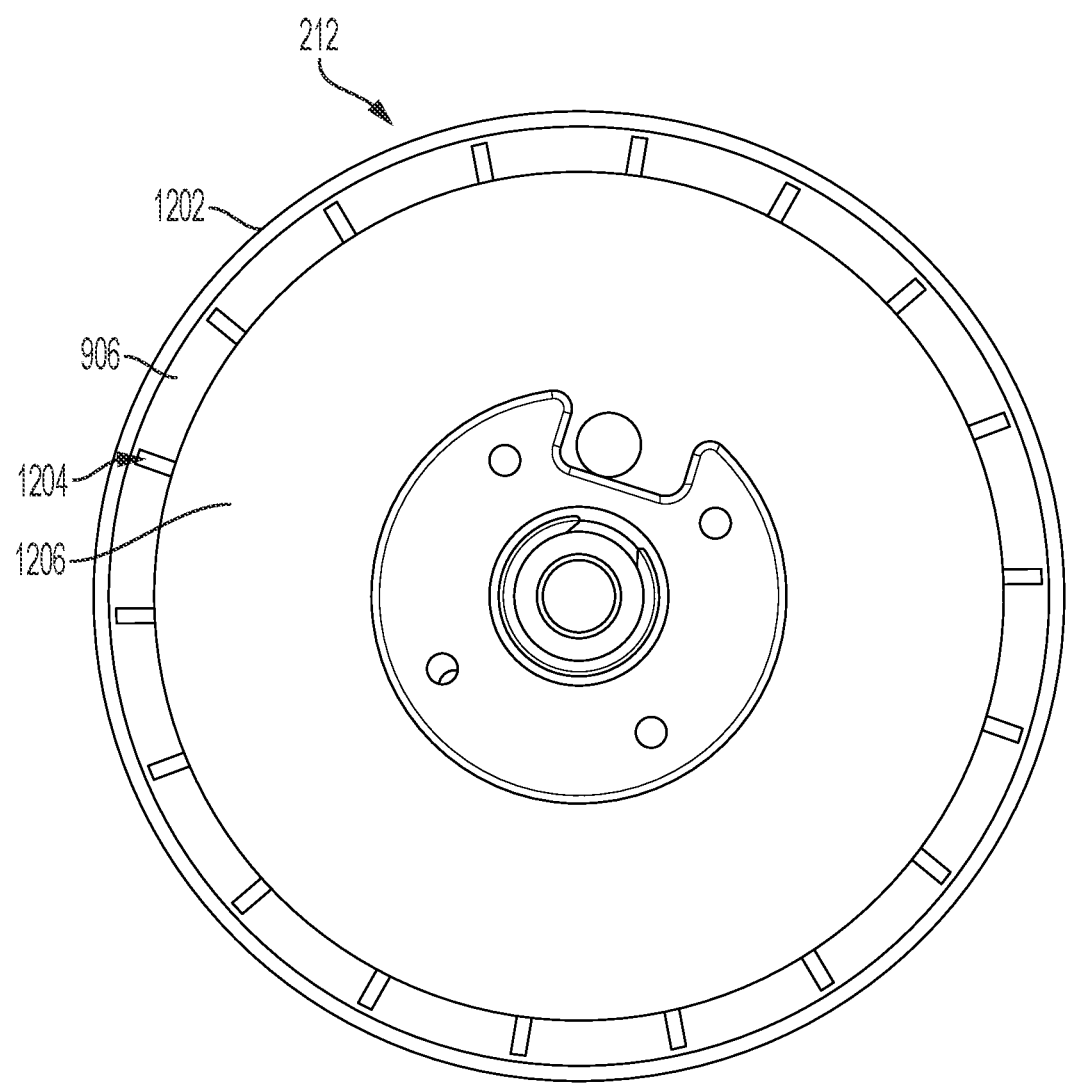
FIGS. 12 and 13 illustrate different views of the rotor assembly of the energy conversion device of FIGS. 1-5, 8, and 9 in accordance with one or more embodiments of the present disclosure.
Figure 13:
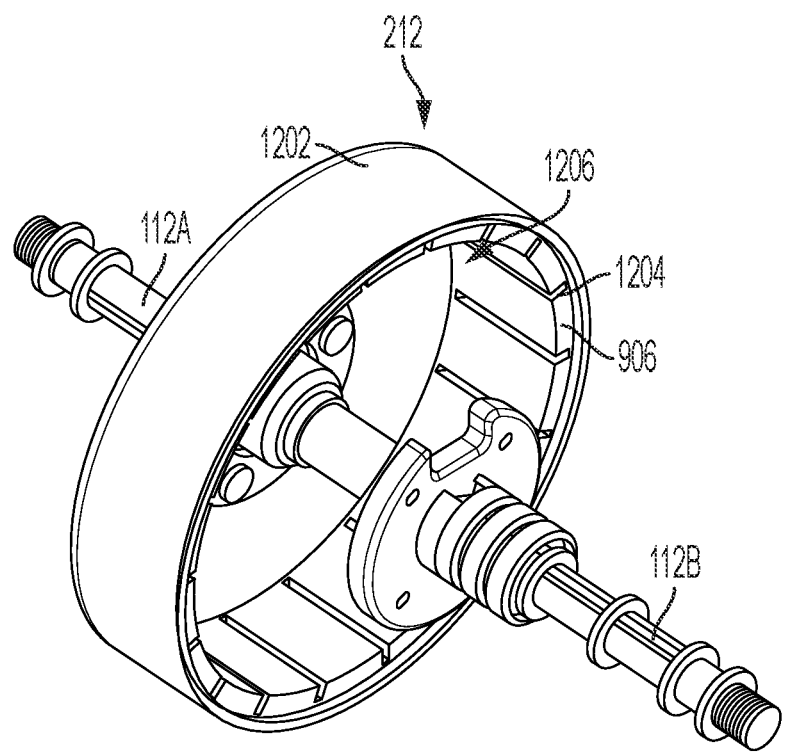
Figure 14:
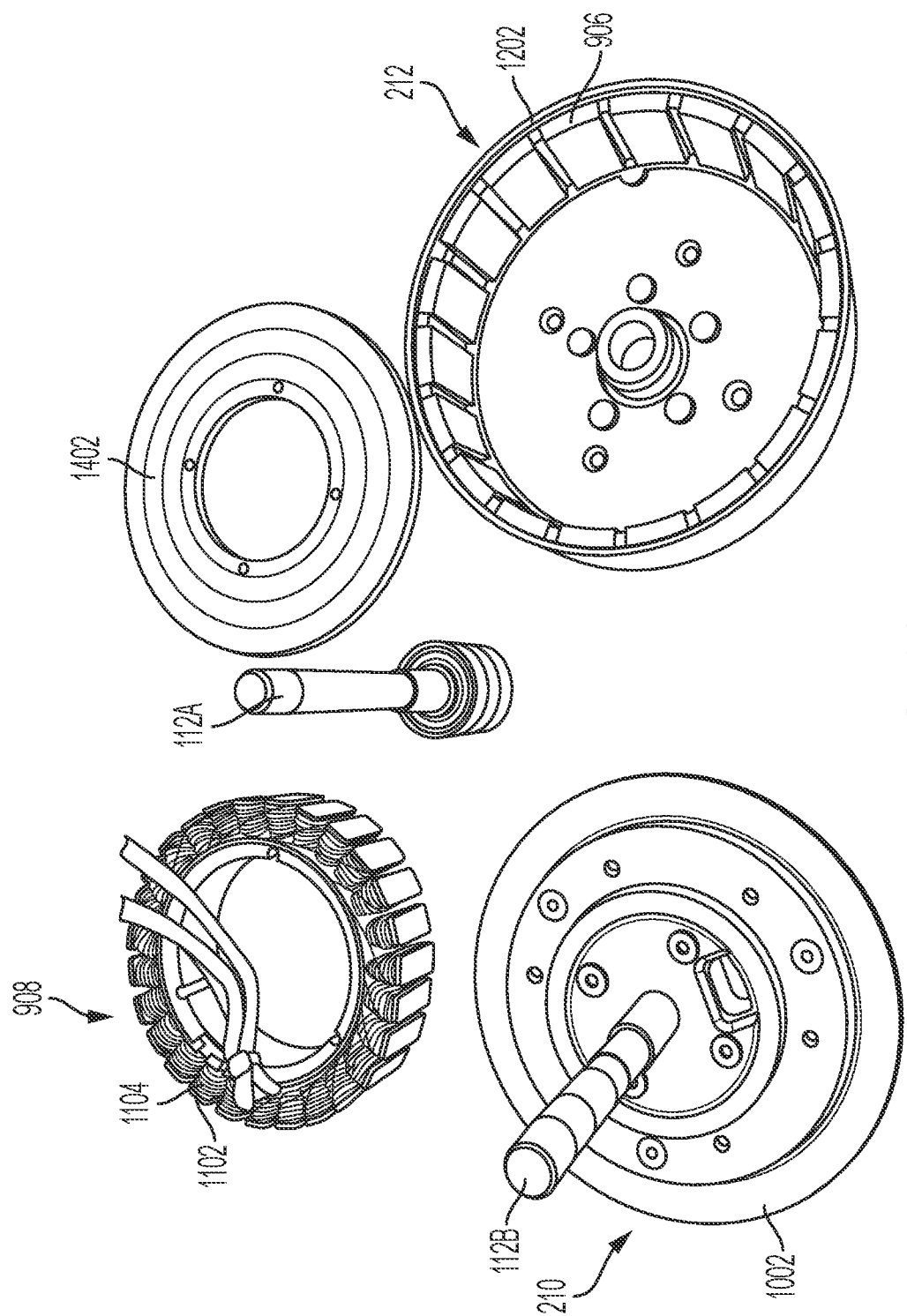
FIGS. 14-17 illustrate views of the disassembled components of the energy conversion device of FIGS. 1-5, 8, and 9 in accordance with one or more embodiments of the present disclosure.
Figure 15:
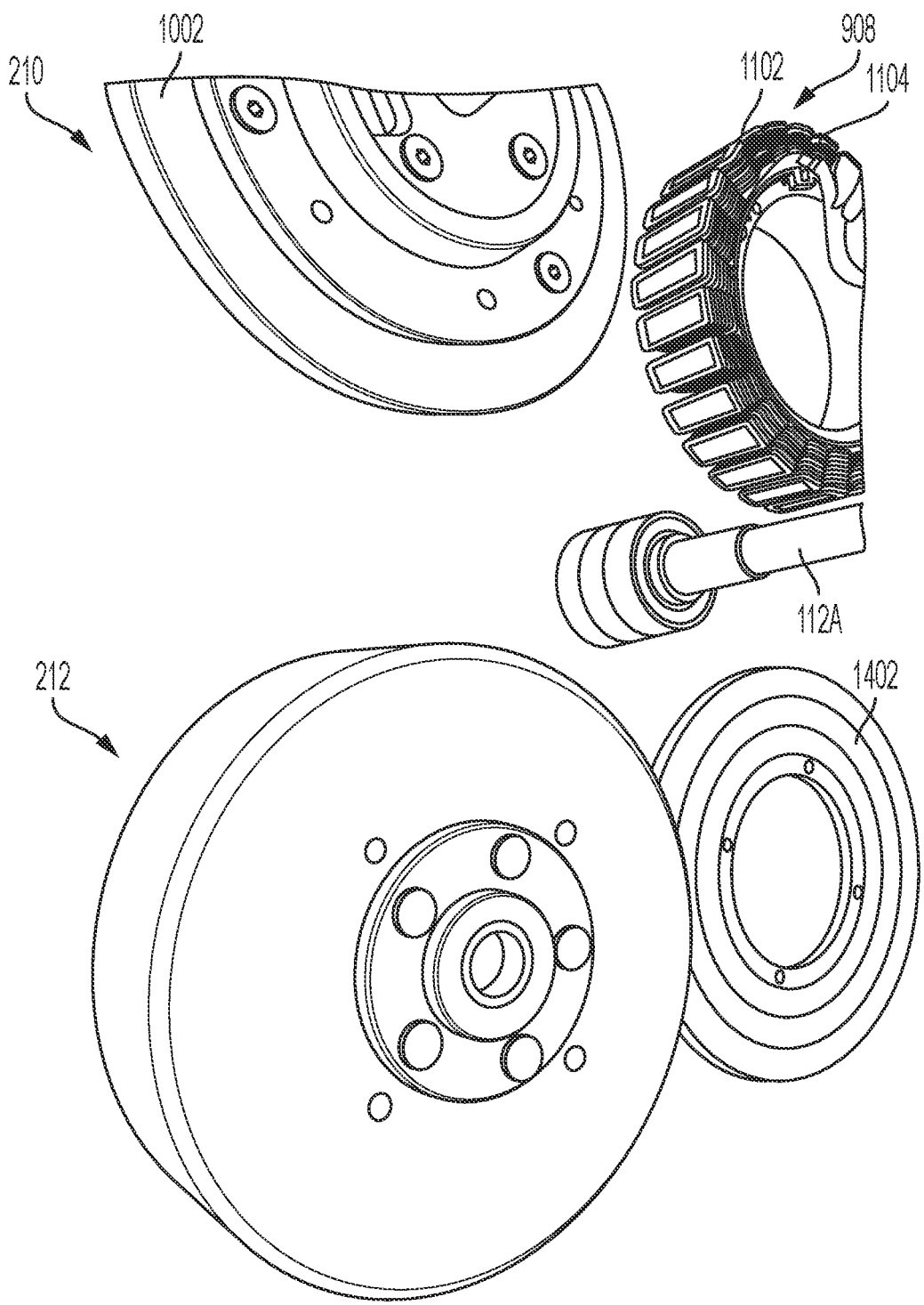
Figure 16:
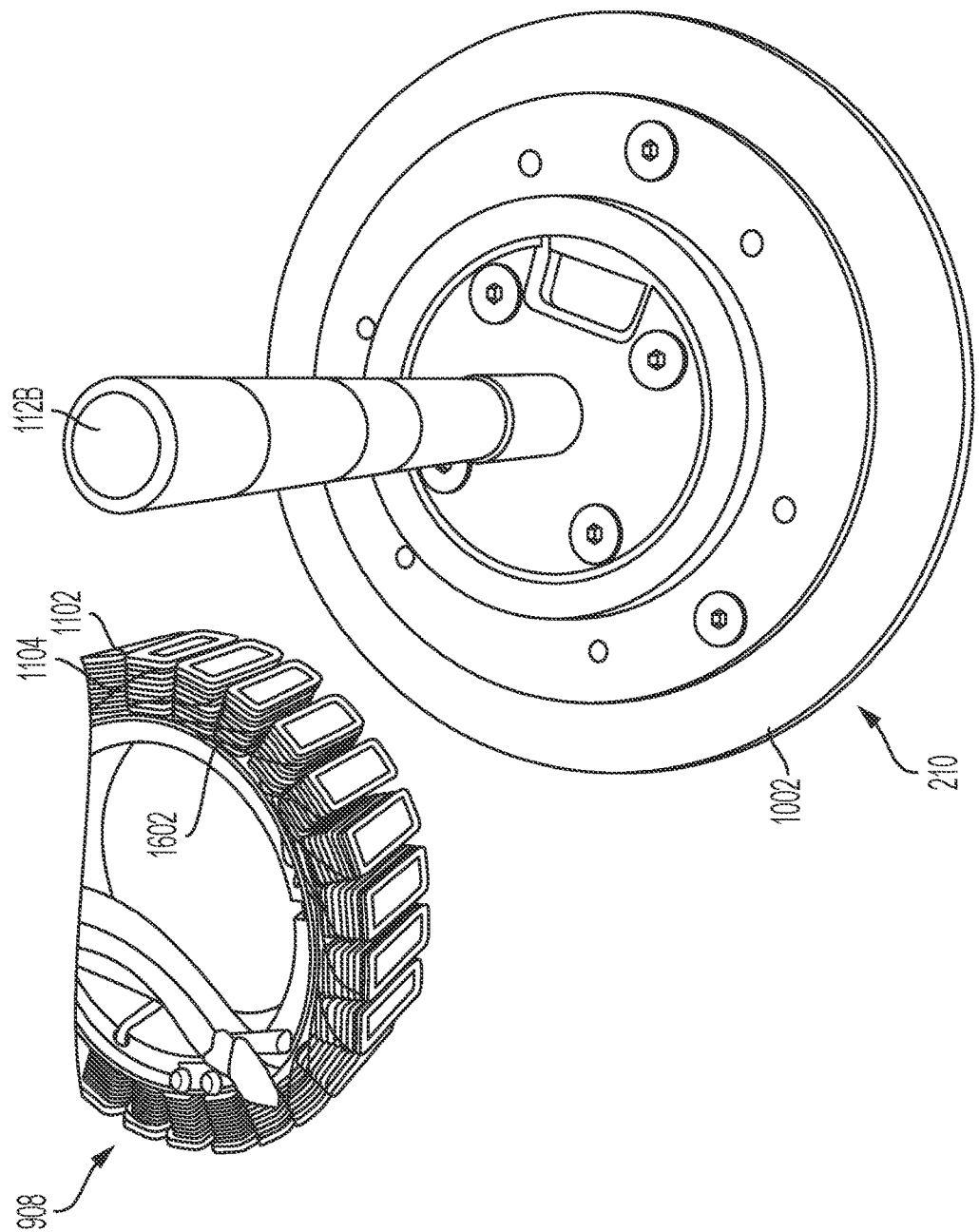
Figure 17:
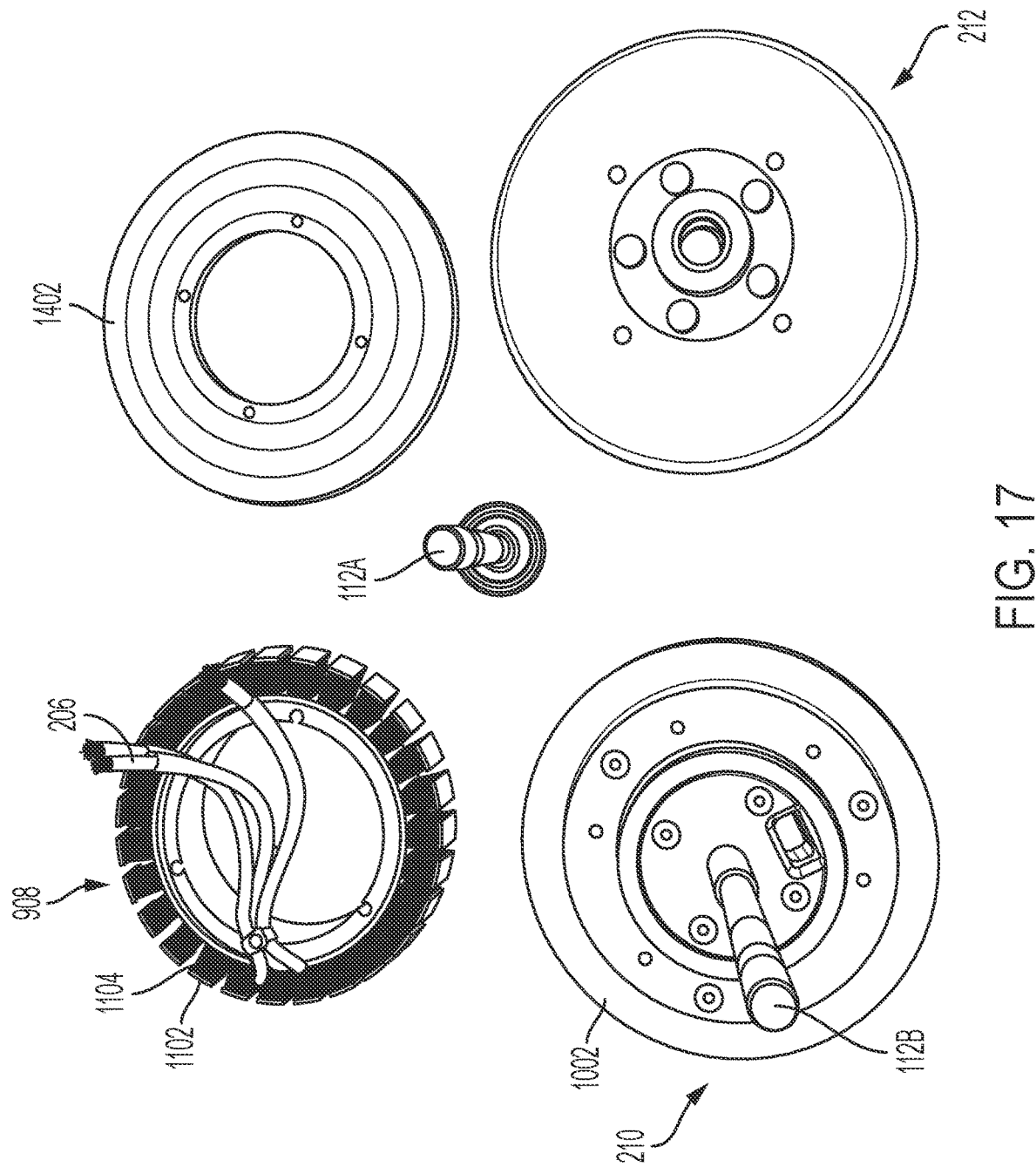

FIG. 12 and FIG. 13 illustrate different views of the rotor 212. The rotor 212 may be rotationally secured to the first portion of the shaft 112A, such that the rotor 212 may rotate with the first portion of the shaft 112A relative to the stator 210 and the second portion of the shaft 112B. The rotor 212 may include an outer shell 1202 configured to protect the internal components of the generator 102. The outer shell 1202 may define a recess 1206 within the rotor 212. The recess 1206 may be configured to receive the stator 210, such that the windings 908 may be disposed within the recess 1206 and substantially surrounded by the outer shell 1202 of the rotor 212.

The outer shell 1202 may also support the magnets 906 arranged radially about the rotor 212. The magnets 906 may be secured to an inner portion of the outer shell 1202 in a radial configuration. The magnets 906 may be arranged such that there is a gap 1204 between each magnet 906. The magnets 906 may generate changing magnetic fields in the area around the windings 908 as the rotor 212 and the stator 210 rotate relative to one another. The changing magnetic field may induce an electrical current in the windings 908 that may be transmitted from the windings 908 to the electrical output 208 as electrical energy.

FIG. 14 through FIG. 17 illustrate disassembled components of the generator 102. As described above, the generator 102 may include a rotor 212 and a stator 210. The stator 210 may include a winding plate 1002 configured to be coupled to the windings 908. The windings 908 may include multiple wire coils 1104 wound around cores 1102 arranged radially about the windings 908. Every third wire coil 1104 may be electrically connected in series through a series connection 1602. Connecting every third wire coil 1104 may generate three-phase alternating current power that may be output from the windings 908 through wire 206 to the electrical outputs 208.

In some embodiments, at least one of the rotor 212 and the stator 210 may include an insulating plate 1402. The insulating plate 1402 may be configured to create an insulated boundary between the windings 908 and the winding plate 1002 and/or the shell 1202 of the rotor 212. The insulating plate 1402 may be formed from an electrically insulating material, such as a polymer.

Figure 18:
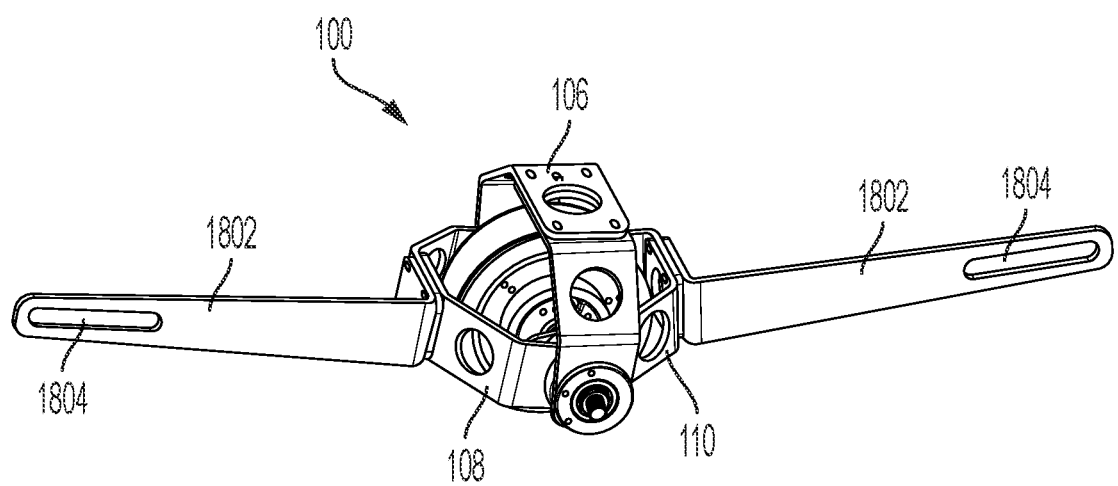
FIG. 18 illustrates a perspective view of the energy conversion device of FIGS. 1-5, 8, and 9 in accordance with one or more embodiments of the present disclosure.

FIG. 18 through FIG. 22 illustrate different mounting configurations of the energy conversion device 100. The energy conversion device 100 may include input arm extensions 1802 coupled to the outer input arm 108 and the inner input arm 110. The input arm extensions 1802 may be configured to convert linear oscillating motion into rotational motion. The input arm extensions 1802 may include an attachment point 1804 configured to couple the input arm extension 1802 to another component of the oscillating system. In some embodiments, the attachment point 1804 may be a slot as illustrated in FIG. 18. A slot attachment point 1804 may enable the input arm extension 1802 to translate relative to the component to which the input arm extension 1802 is coupled.

A size, such as a length, of the input arm extensions 1802 may be determined by the application. For example, each of the input arm extensions 1802 may be coupled to different oscillating components, such as a spring, a shock, a frame, an axle, a suspension component, etc. The length of the respective input arm extensions 1802 may be determined based on a distance between the oscillating component and the position of the generator 102. In some embodiments, a length of the input arm extensions 1802 may act as a force or amplitude multiplier by increasing a moment arm for the oscillating component relative to the generator 102. For example, input arm extension 1802 may increase or decrease the force of the oscillations that act on the generator 102. In another example, waves may cause large (e.g., high amplitude) oscillations. A long input arm extension 1802 may enable the energy conversion device 100 to convert the large oscillations into energy without damaging components of the generator 102.

Figure 19:
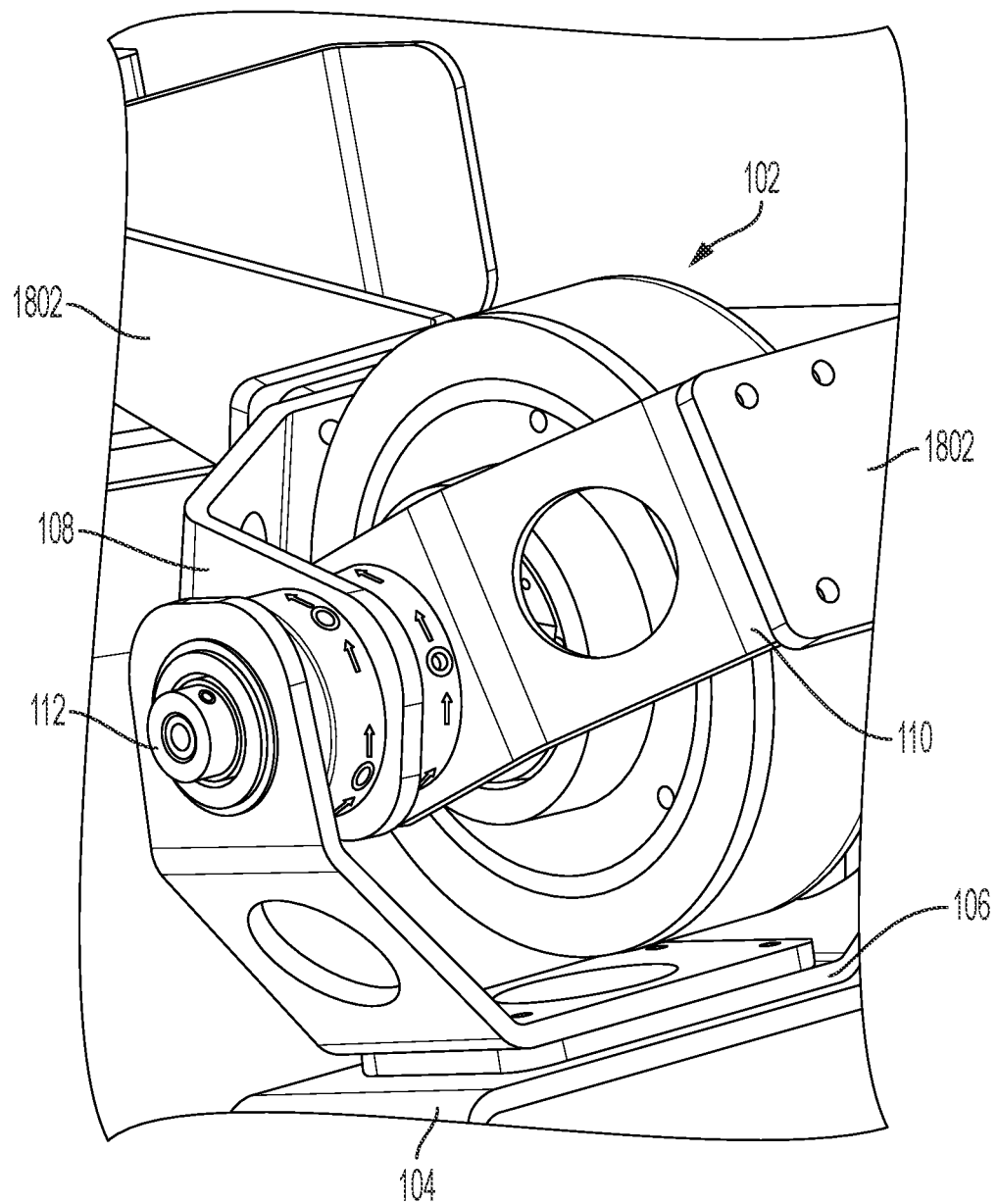
FIGS. 19-23 illustrate different mounting configurations of the energy conversion device of FIGS. 1-5, 8, 9, and 18 in accordance with one or more embodiments of the present disclosure.

FIG. 19 illustrates the generator 102 having input arm extensions 1802 extending in two different directions. In some embodiments, the mount 104 may be secured to a frame of a vehicle and the input arm extensions 1802 may be coupled to two different suspension components that may exhibit oscillating motion, such as a shock, a spring, an axle, a suspension arm, etc. In some embodiments, the mount 104 may be secured to an oscillating component, such as an axle or suspension arm and the input arm extensions 1802 may be secured to the frame such that oscillations of the oscillating component may cause the input arm extensions 1802 and the input arms 108, 110 to rotate relative to the mount arm 106 as the generator 102 oscillates toward and away from the frame with the oscillating component.

Figure 20:
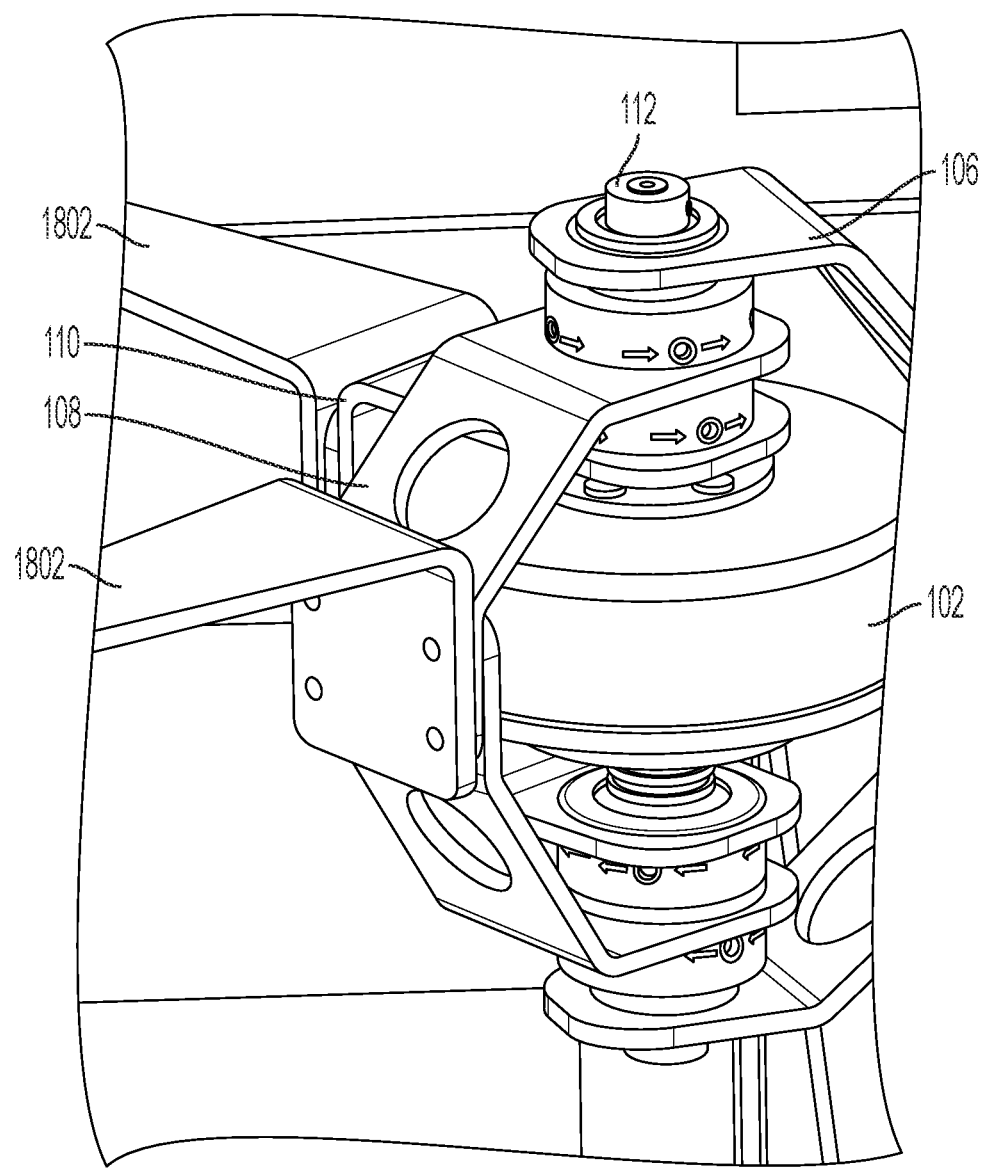

FIG. 20 illustrates the generator 102 mounted in a vertical configuration with the input arm extensions 1802 extending horizontally to capture lateral oscillations, such as vibrations.

Figure 21:
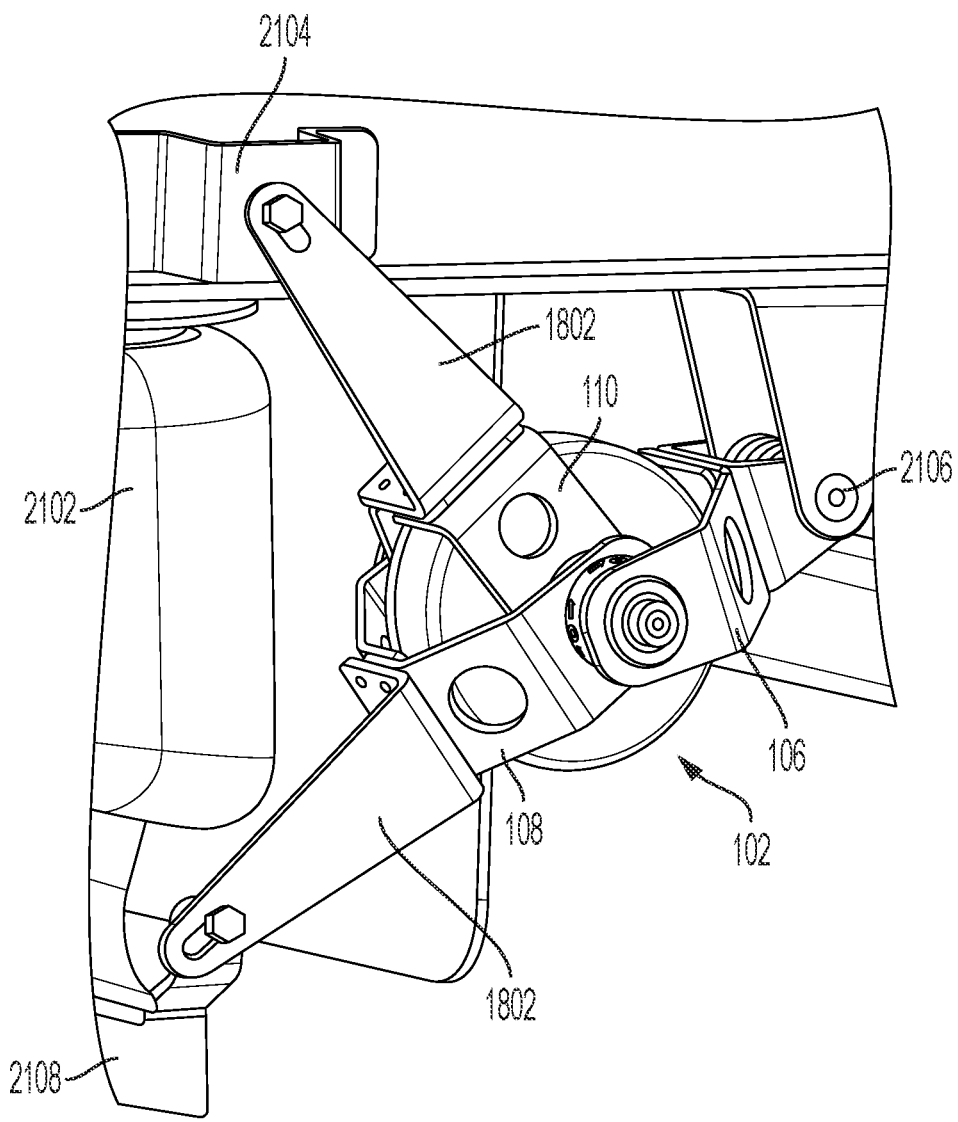

FIG. 21 illustrates the generator 102 installed in a suspension system for a vehicle. The mount arm 106 of the energy conversion device 100 may be coupled to a shackle mount 2106, configured to allow the mount arm 106 to rotate relative to the shackle mount 2106. The input arm extensions 1802 may be couple to opposite ends of a spring 2102, such as a coil spring, an air spring or an air bag. In some embodiments, such as a leaf spring system, the input arm extensions 1802 may be coupled to opposite ends of a shock absorber or between an "un-sprung" component (e.g., a component that is not separated from the ground by the suspension, such as axle, suspension arm, wheel hub, etc.) and a "sprung" component (e.g., a component that is separated from the ground by the suspension, such as a frame, body, etc.).

One of the input arm extensions 1802 may be coupled to a frame mount 2104 on the "sprung" side of the spring 2102 and the other input arm extension 1802 may be coupled to a spring mount 2108 on the "un-sprung" side of the spring 2102. Thus, the linear oscillations of the spring may be captured by the input arm extensions 1802 and converted into rotational motion by the arms 108, 110. The rotational motion may then be converted into electrical energy by the generator 102.

Figure 22:
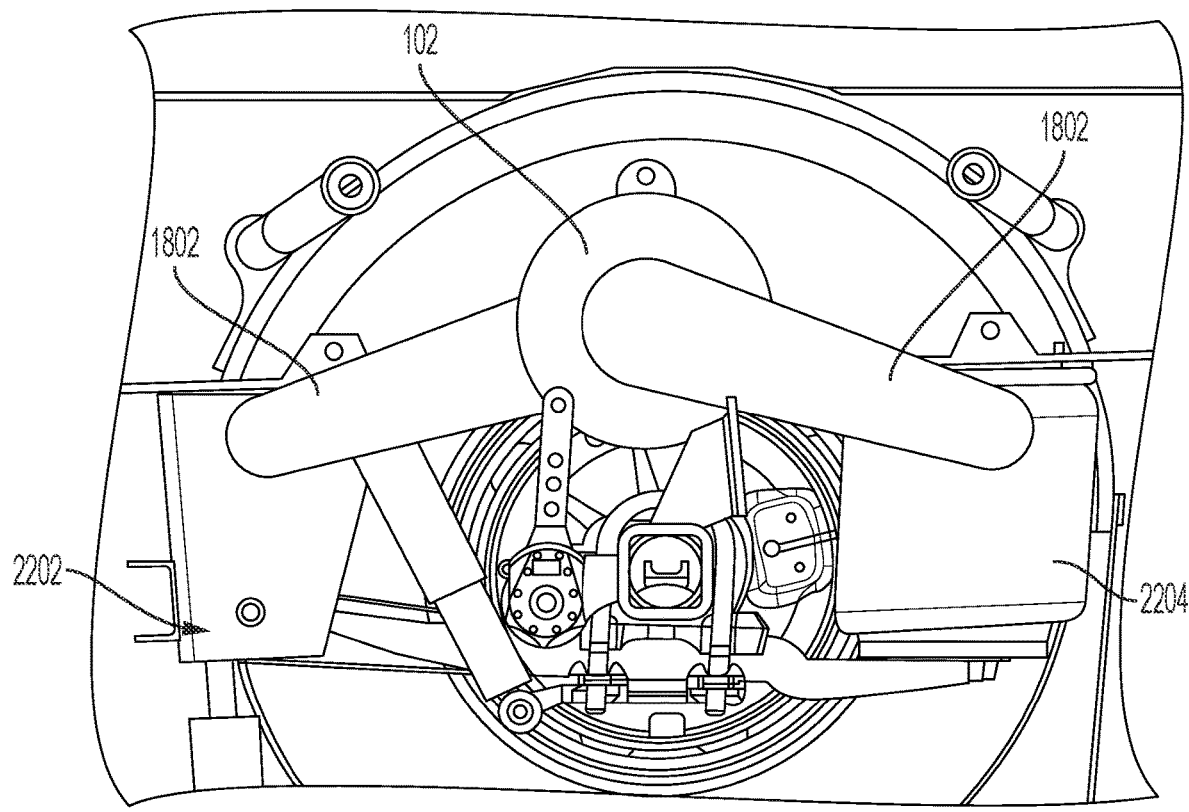

FIG. 22 illustrates a generator 102 receiving input from multiple different oscillating components. For example, one input arm extension 1802 may be coupled to a spring 2204, such as a coil spring, air spring, air bag, leaf spring, etc., and the other input arm extension 1802 may be coupled to a shock absorber 2202. The oscillations of the spring 2204 and the oscillations of the shock absorber 2202 may both be converted to rotational motion and then converted into electrical energy by the generator 102.

Figure 23:
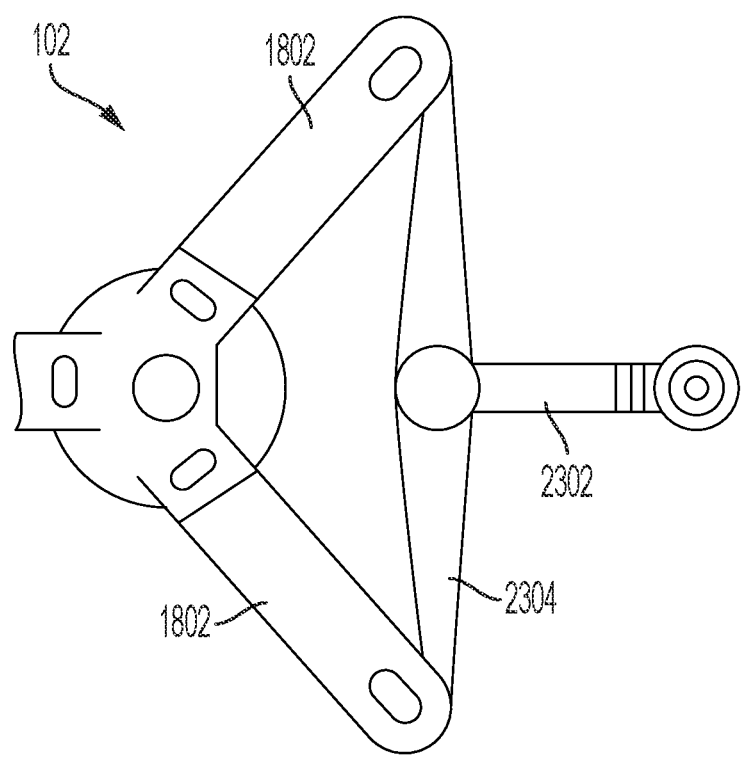

FIG. 23 illustrates a generator 102 with both of the input arm extensions 1802 coupled to the same oscillating input 2302. The oscillating input 2302 may be a spring system, such as the suspension of a vehicle, or waves, such as on a tidal generator. The two input arm extensions 1802 may be coupled together through a connecting rod 2304. The oscillating input 2302 may act on the connecting rod 2304 in a direction substantially transverse to the connecting rod 2304 at a point substantially midway between the two input arm extensions 1802. The connecting rod 2304 may cause both of the input arm extensions 1802 to move in the transverse direction at substantially the same time. Moving both the input arm extensions 1802 at substantially the same time may increase the amount of energy converted to rotational motion and then electrical energy by the oscillating input. In other words, the efficiency of the energy conversion may increase by reducing the amount of energy lost in the conversion.

Figure 24:
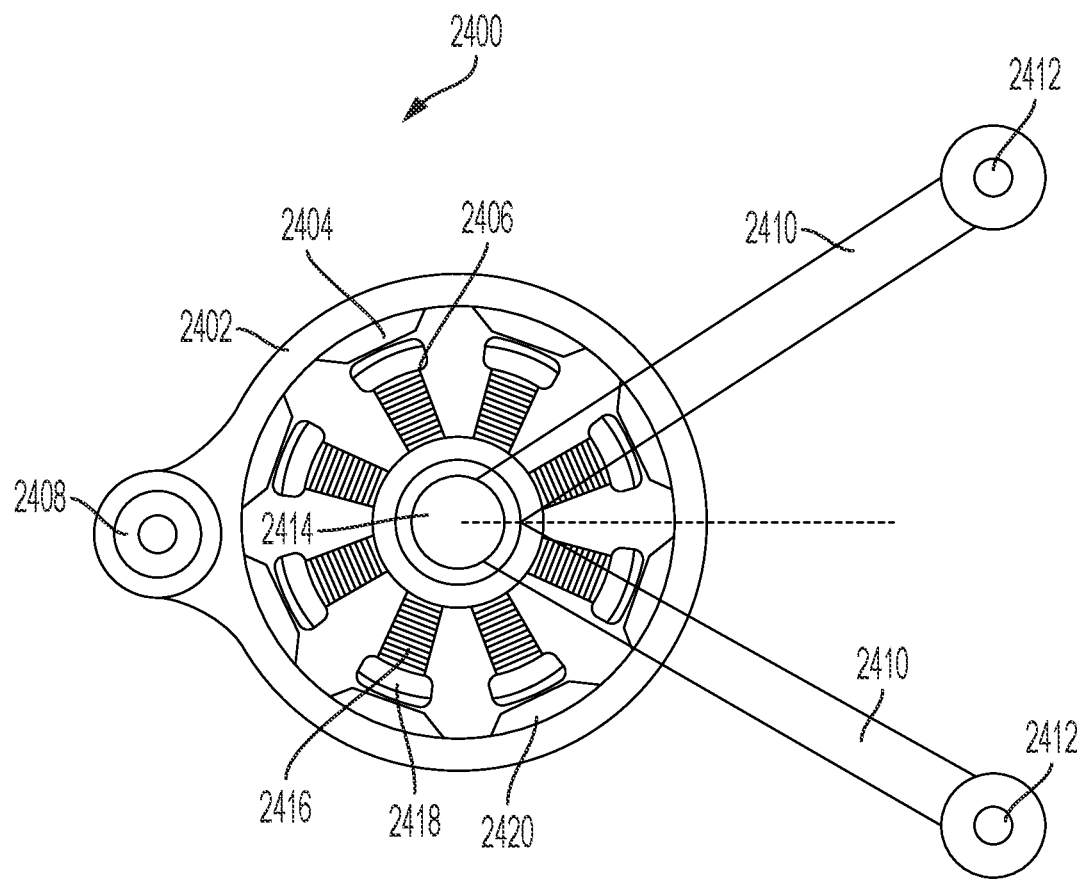
FIGS. 24 and 25 illustrate an energy conversion device in accordance with one or more embodiments of the present disclosure.
Figure 25:
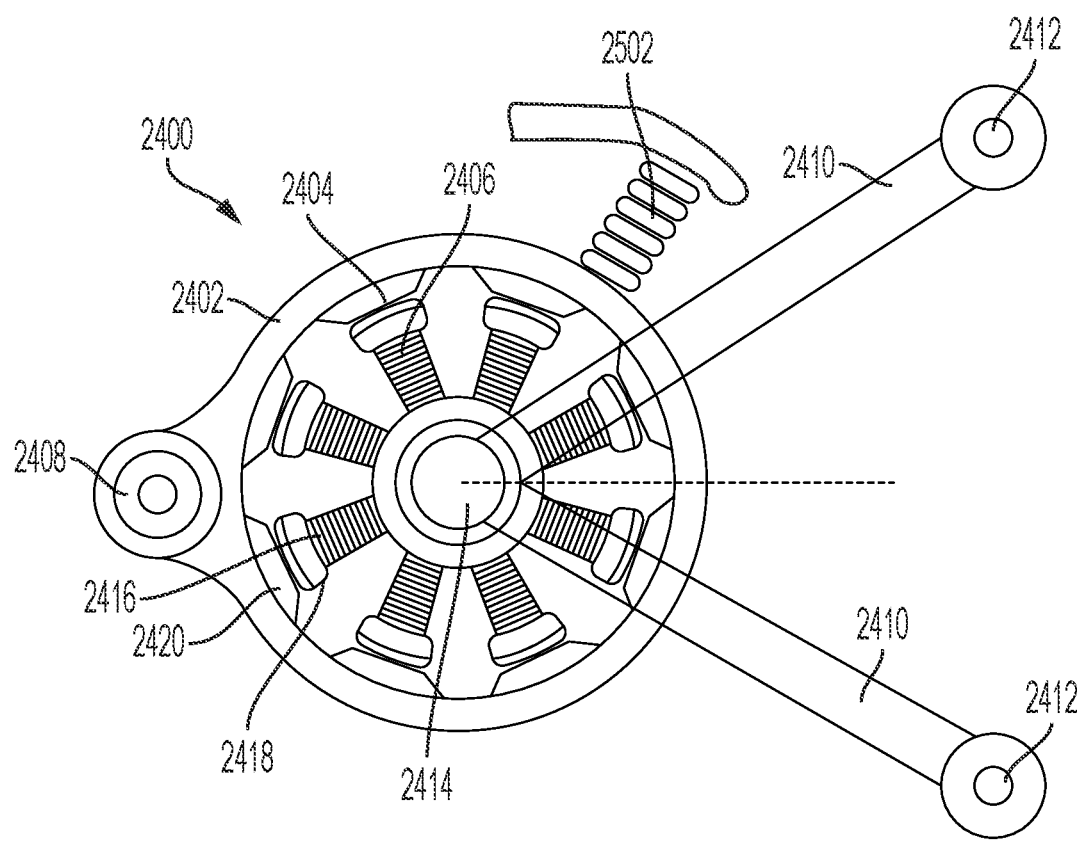

FIGS. 24 and 25 illustrate another embodiment of an energy conversion device 2400. The energy conversion device 2400 may include a shell 2402 substantially surrounding the rotor 2404 and the stator 2406. As discussed above, the rotor 2404 may include multiple magnets 2420 arranged radially about the rotor 2404 and the stator 2406 may include multiple coils 2416 of wire wound around cores 2418 arranged radially about the stator 2406. The shell 2402 may include a mount 2408 formed as part of the shell 2402. The mount 2408 may be configured to secure the energy conversion device 2400 to a stationary component.

The rotor 2404 and the stator 2406 may be configured to rotate relative to the shell 2402. The rotor 2404 and the stator 2406 may be coupled to a shaft 2414, similar to the shaft 112 described above. As described above, the shaft 2414 may be coupled to multiple input arms 2410. The input arms 2410 may be coupled to the shaft through one-way bearings in a similar arrangement to the bearings 202a, 202b, 204a, 204b described above, such that the input arms 2410 cause the rotor 2404 to rotate in a first direction and the stator 2406 to rotate in a second opposite direction as described above.

The input arms 2410 may be configured to mount to oscillating components through input arm mounts 2412. In some embodiments, the energy conversion device 2400 may be configured to rotate relative to the mount 2408 during oscillation, similar to the mounting arrangement described above in FIG. 21. In some embodiments, the energy conversion device 2400 may include a stop 2502, such as a spring, bump stop, cushion, etc., to substantially prevent the shell 2402 from contacting the frame as the energy conversion device 2400 moves during oscillation.

FIGS. 26A-33 illustrate different views of an energy conversion device 2600 including the generator 102 previously described. The components of the energy conversion device 2600 may be arranged along a shaft 2604, such that the components of the energy conversion device 2600 are substantially coaxial with one another. The energy conversion device 2600 may include the generator 102 including both the stator 210 and the rotor 212 positioned near a central portion of the shaft 2604. An electrical output 208 may be coupled to the shaft 2604 adjacent to the stator 210 and conductively coupled to the windings 908 (FIG. 9) of the stator 210. A pick-up module 802, such as a set of brushes, may be positioned over the electrical output 208 and may include electrical connections 2626 that may remain substantially stationary (e.g., will not rotate with the shaft 2604), such that wiring (e.g., vehicle wiring, transmission wiring, etc.) may be connected to the generator 102 through the electrical connections 2626.

The energy conversion device 2600 may be configured to mount to a structure through a mount 2602 and a mount arm 2608. The structure may be a substantially stationary structure relative to the motion being captured and converted to electrical energy. For example, the stationary structure may be the frame of a vehicle as described above.

The mount arm 2608 may be configured to secure the entire assembly to a relatively stationary structure. The mount arm 2608 may be rotationally secured to the energy conversion device 2600 through input assemblies 2614. As described in further detail below, the input assemblies 2614 may include gearing mechanisms 2616a, and 2616b configured to allow the shaft 2604 to rotate relative to one or more stationary components of the input assemblies 2614. The mount arms 2608 may be secured to one or more of the stationary components. The stationary components of the input assemblies 2614 may include inner housings 2620a, outer housings 2620b, and spacers 2618. In some embodiments, the stationary components may be coupled together, such as through fasteners (e.g., bolts, screws, studs, etc.), pins, dowels, etc.

The input assemblies 2614 may include a first gearing mechanism 2616a and a second gearing mechanism 2616b configured to receive rotational motion and transmit the rotational motion to the shaft 2604 through one directional bearings (e.g., unidirectional bearings, sprag clutch, one-way bearing, etc.). For example, each of the first gearing mechanism 2616a and the second gearing mechanism 2616b may be coupled to the shaft 2604 through separate one directional bearings. Each of the one directional bearings may be configured to transmit the rotation to the shaft 2604 in a first direction while allowing the gearing mechanisms 2616a, and 2616b to rotate freely in an opposite second direction. The first direction for each of the one directional bearings in the same input assembly 2614 may be the same direction, such that each of the gearing mechanisms 2616a, 2616b are configured to transmit rotation to the shaft 2604 in substantially the same direction.

Each of the input assemblies 2614 may be configured to receive motion through both a first input arm 2610 and a second input arm 2612. The first input arm 2610 may be coupled to the input assembly 2614 through a first input coupler 2622 and the second input arm 2612 may be coupled to the input assembly 2614 through a second input coupler 2624. The input arms 2610, and 2612 may be configured to convert linear motion, such as vertical or horizontal oscillations, into rotational motion to be input to the input assembly 2614 through the respective first input coupler 2622 and the second input coupler 2624. The first input coupler 2622 and the second input coupler 2624 may be coupled to the shaft 2604 through a bearing 2628 configured to allow the first input coupler 2622 and/or the second input coupler 2624 to rotate freely about the shaft 2604 without directly transmitting any motion to the shaft 2604.

Figure 26A:
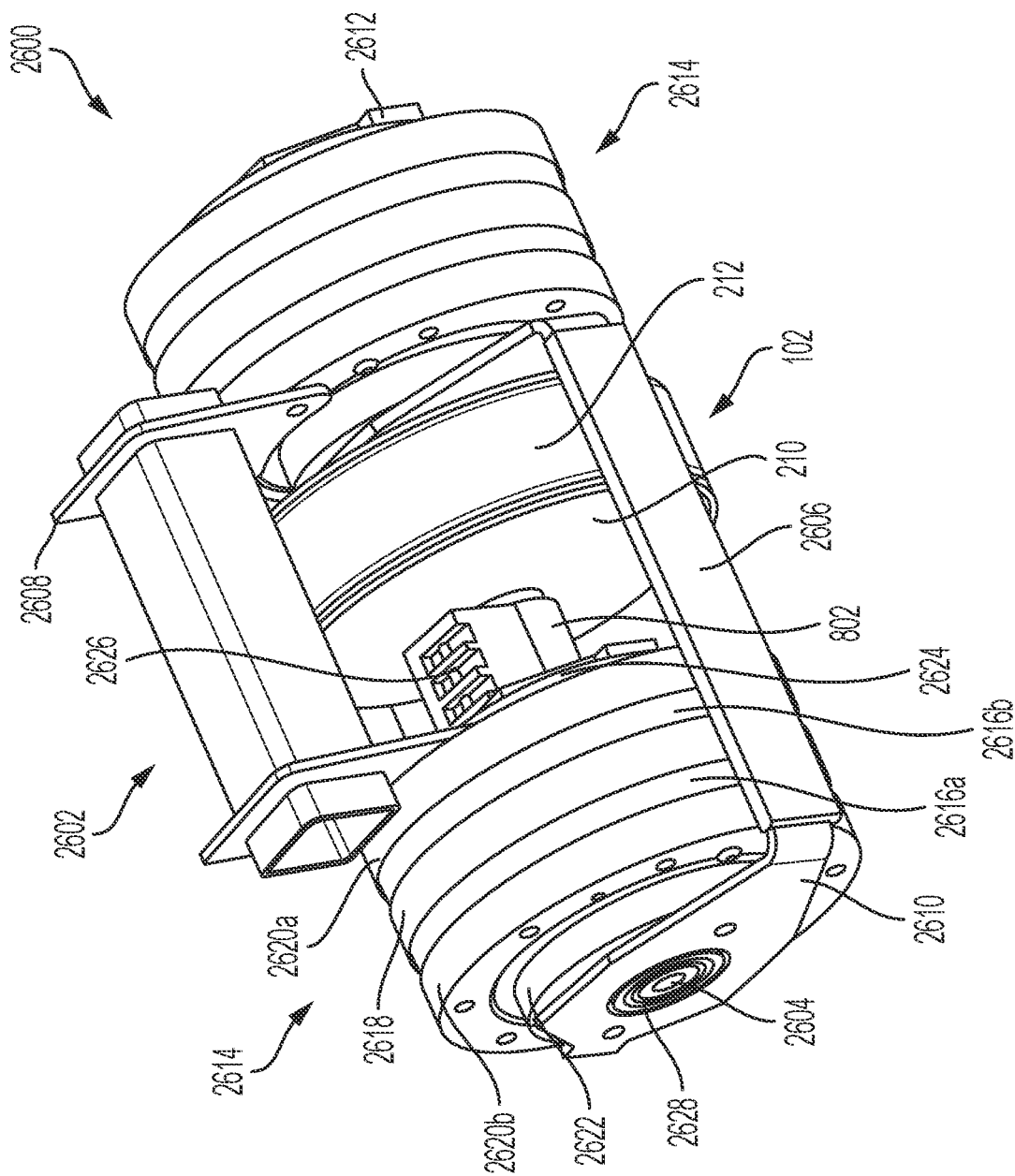
FIGS. 26A-32 illustrate different views of an energy conversion device in accordance with one or more embodiments of the present disclosure.
Figure 26C:
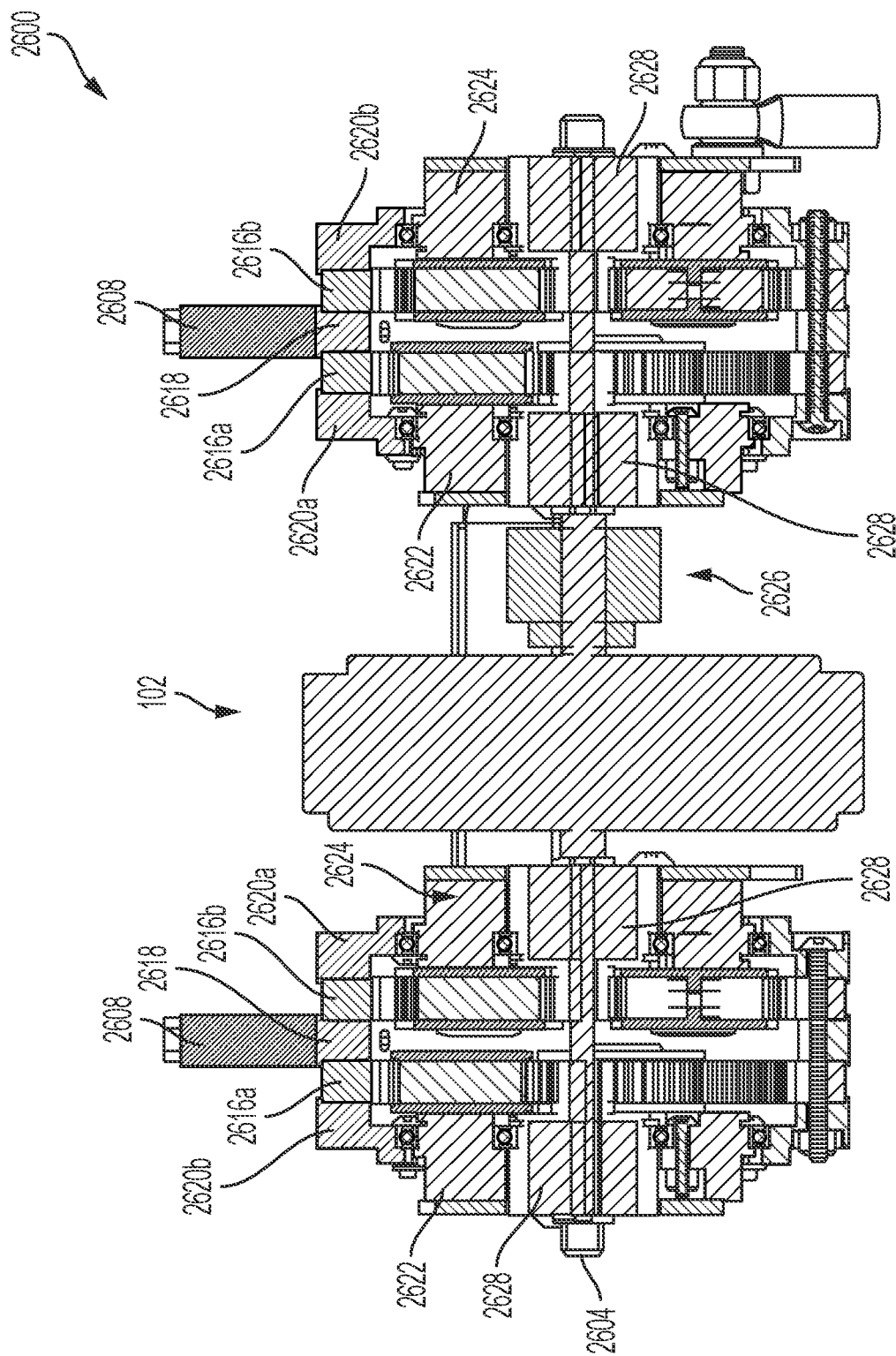
Figure 27:
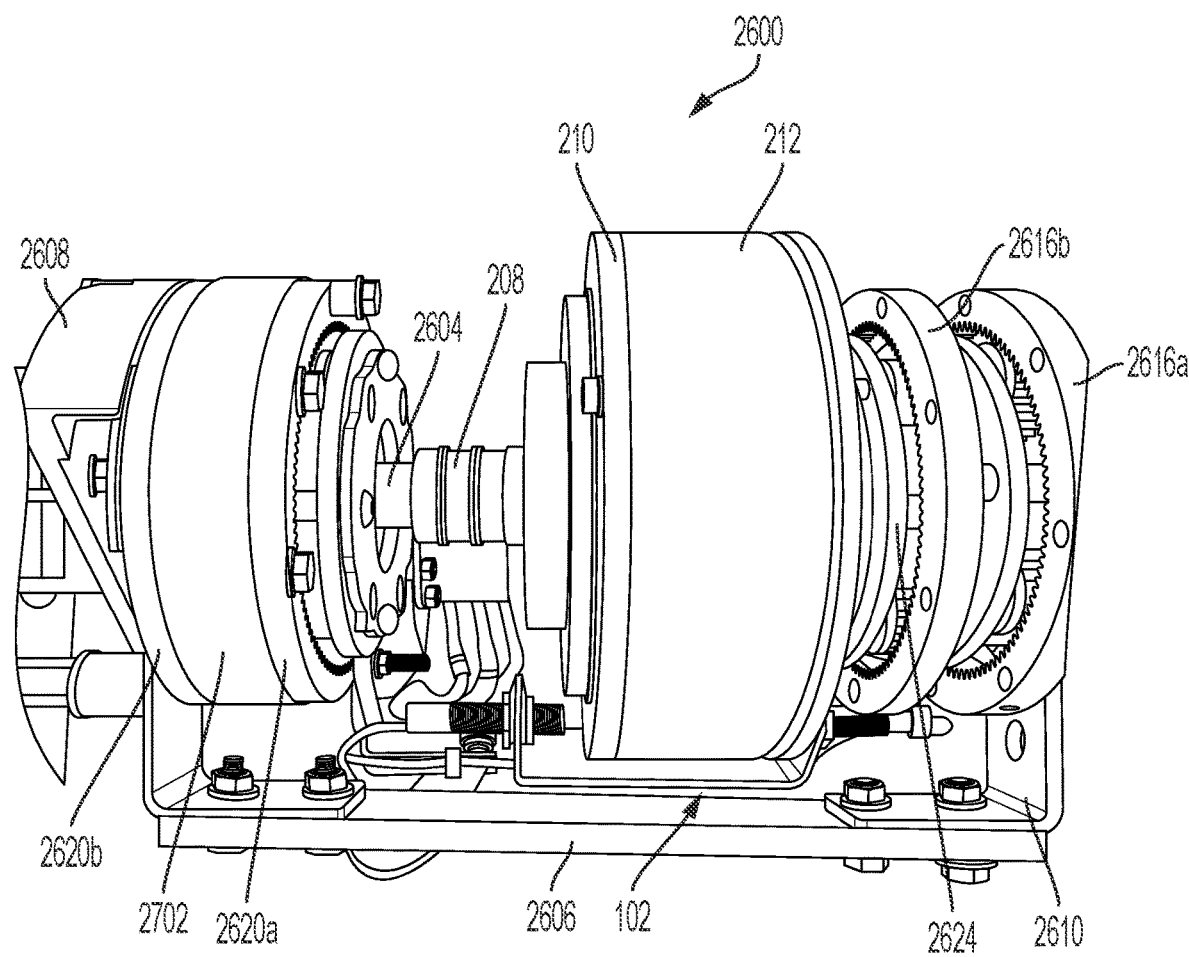
Figure 28:
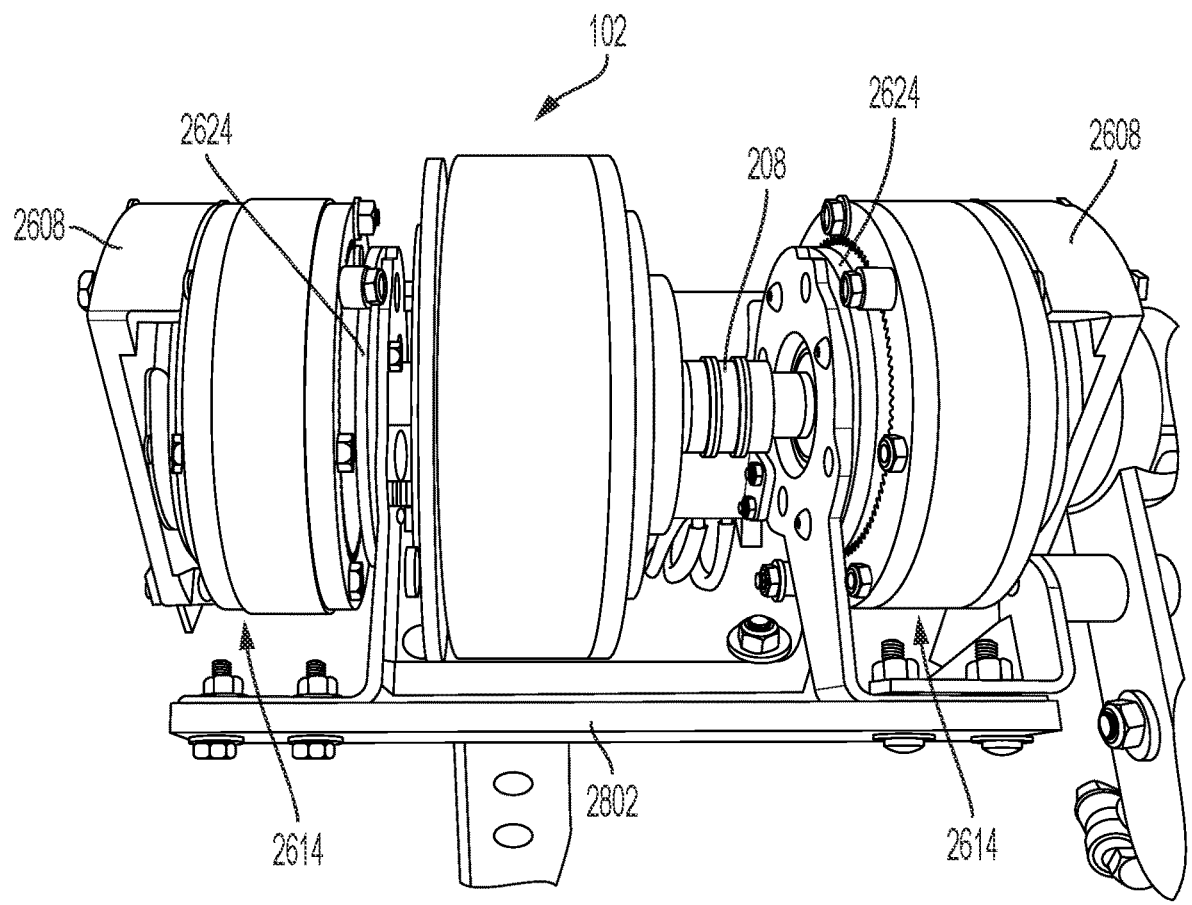
Figure 29:
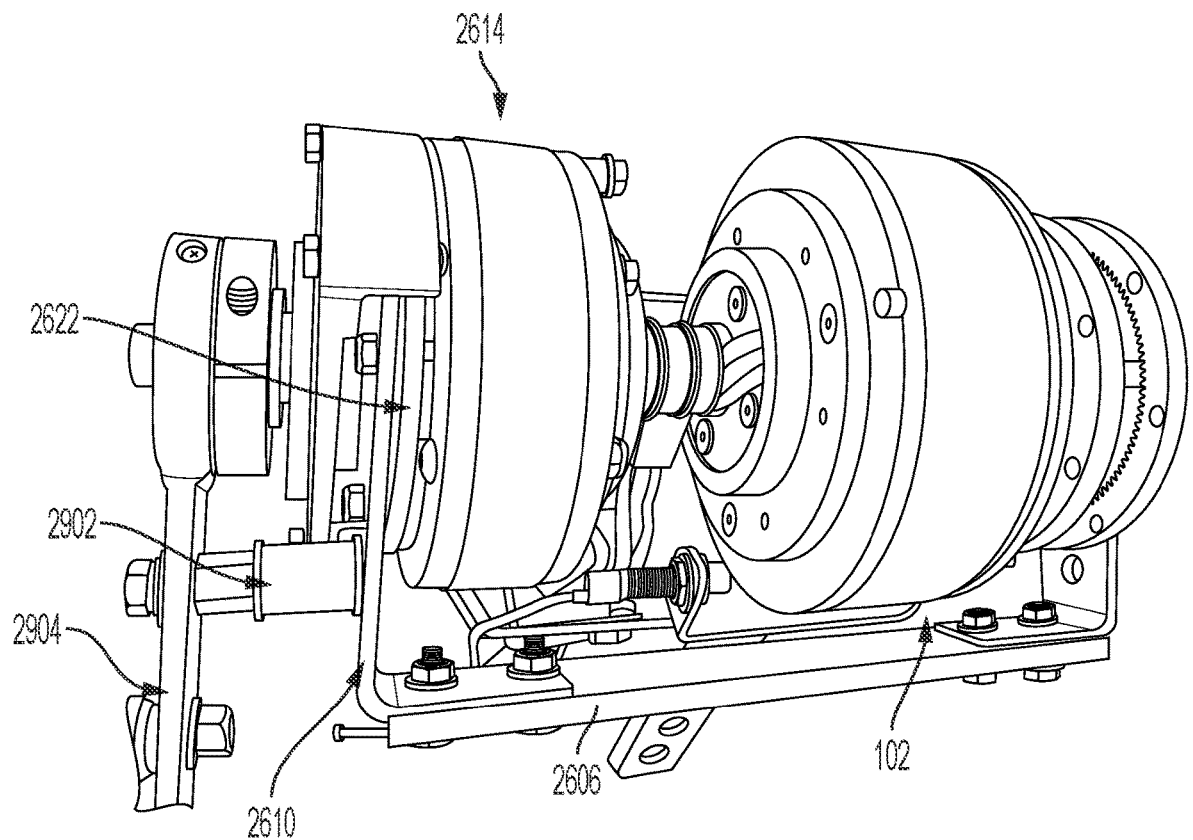
Figure 30:
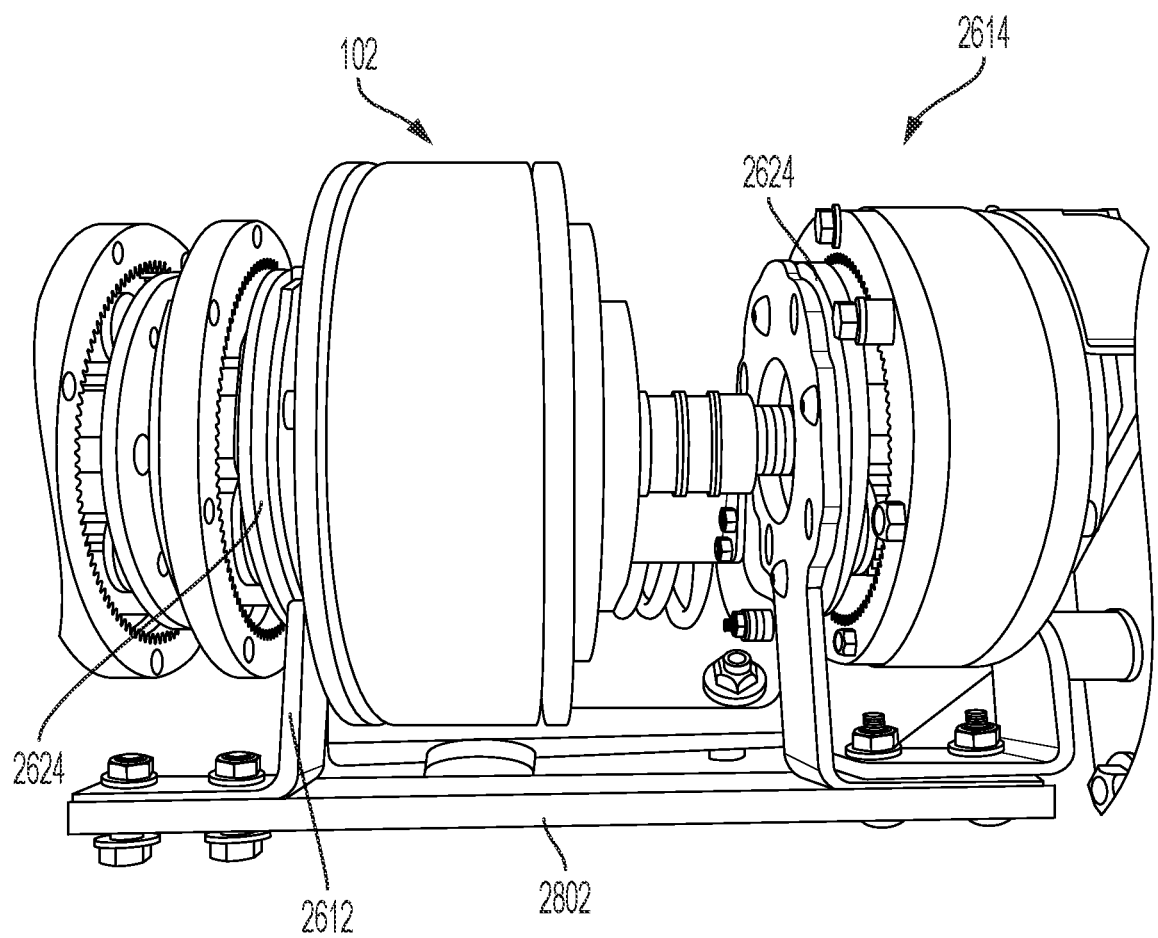
Figure 31:
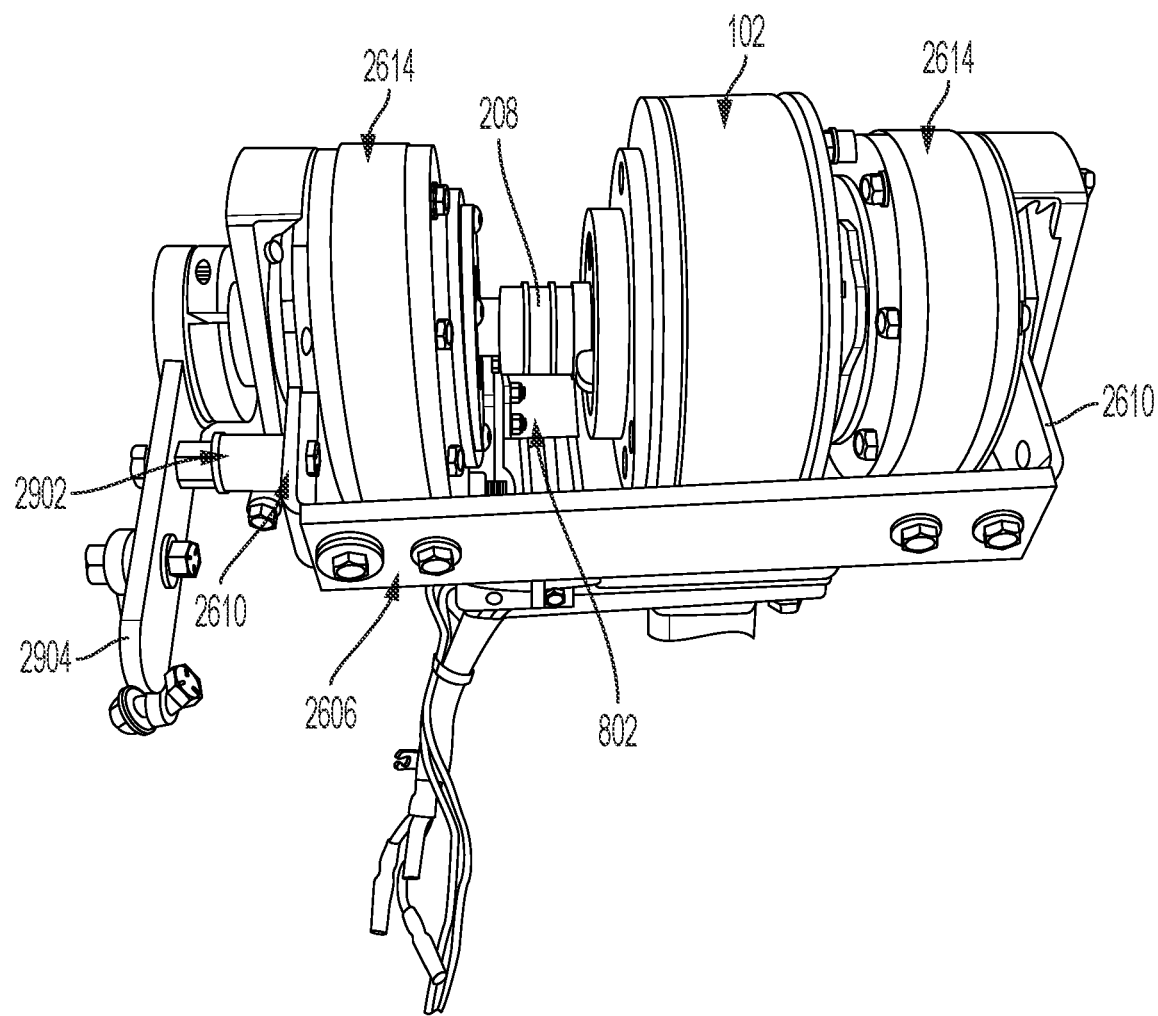
Figure 32:
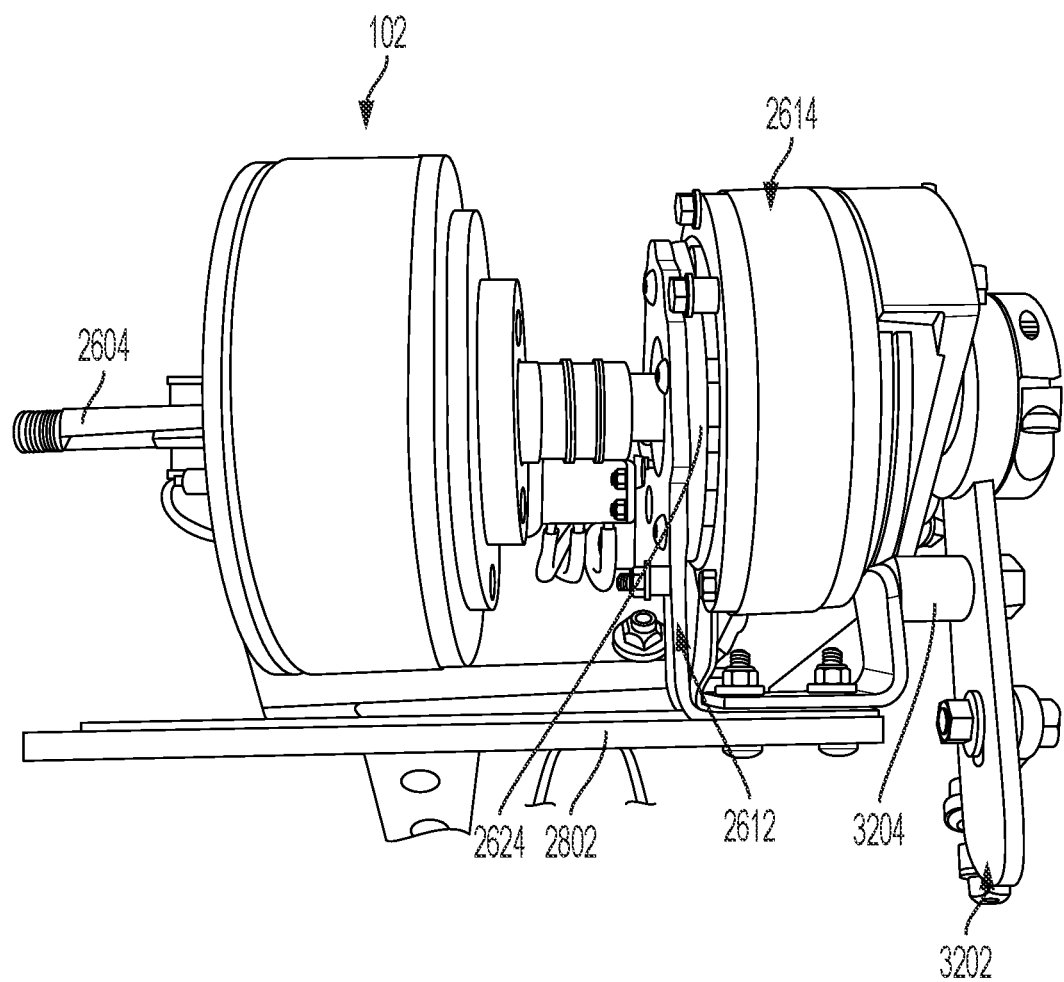
Figure 33:
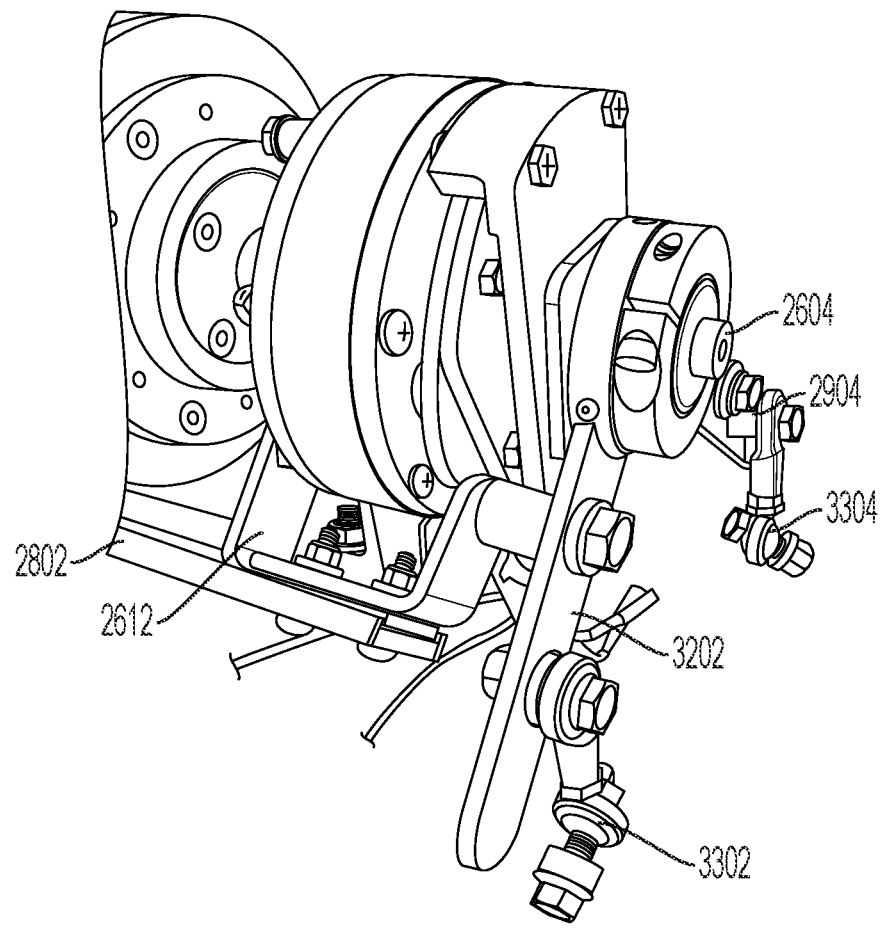
FIG. 33 illustrates a view of an input arm mounted to an energy conversion device in accordance with one or more embodiments of the present disclosure.

The first input arm 2610 may be coupled to a first input coupler 2622 on two input assemblies 2614 on opposite sides of the generator 102. For example, a first input arm 2610 may be coupled to a first input coupler 2622 on each of the two input assemblies 2614. In some embodiments, as illustrated in FIGS. 26A-26C, the first input arm 2610 may be coupled to a second input coupler 2624 on an outer side (e.g., side facing away from the generator 102) of a first input assembly 2614 and may be coupled to an inner side (e.g., side facing the generator 102) of a second input assembly 2614 on an opposite side of the generator 102. Similarly, the second input arm 2612 may be coupled to the first input coupler 2622 on an inner side of the first input assembly 2614 and may be coupled to an outer side of the second input assembly 2614 on the opposite side of the generator 102. In other embodiments, the first input arm 2610 may be coupled to the first input coupler 2622 on an outer side of both the first input assembly 2614 and the second input assembly 2614 and the second input arm 2612 may be coupled to the second input coupler 2624 on an inner side of both the first input assembly 2614 and the second input assembly 2614, such that the first input arm 2610 forms an outer input arm and the second input arm 2612 forms an inner input arm as illustrated in FIGS. 27-31. The two first input arms 2610 may be coupled to one another through a connecting arm 2606, such that the motion of one of the first input arms 2610 is transmitted to the other first input arm 2610 through the connecting arm 2606. Similarly, the two second input arms 2612 may be coupled to one another through a connecting arm 2802, such that the motion of one of the second input arms 2612 is transmitted to the other second input arm 2612 through the connecting arm 2802.

As described above, the first gearing mechanism 2616a and the second gearing mechanism 2616b of the two input assemblies 2614 may be configured to transmit the rotation to the shaft 2604 in a first direction while allowing the gearing mechanisms 2616a, and 2616b to rotate freely in an opposite second direction. The first direction for each of the one directional bearings in the same input assembly 2614 may be the same direction, such that each of the gearing mechanisms 2616a, 2616b are configured to transmit rotation to the shaft 2604 in substantially the same direction. The one directional bearings of the input assemblies 2614 on the opposite sides of the generator 102 may be configured to transmit rotation to the shaft in opposite directions. For example, the shaft 2604 on a first side of the generator 102 may be coupled to the stator 210, such that rotation input to the shaft 2604 from the input assembly 2614 on the first side of the generator 102 may input rotation to the stator 210 through the associated one-way bearings and shaft 2604. The shaft 2604 on a second opposite side of the generator 102 may be coupled to the rotor 212, such that rotation input to the shaft 2604 from the input assembly 2614 on the second side of the generator 102 may input rotation to the rotor 212 through the associated one-way bearings and shaft 2604. Rotating the shaft 2604 on the first side of the generator 102 in a direction opposite the shaft 2604 on the second side of the generator 102 may cause the stator 210 and the rotor 212 to rotate in opposite directions, which may effectively double the relative rotation between the stator 210 and the rotor 212 as described above. Put another way, the stator 210 and the rotor 212 may form counter-rotating casing members.

The input assemblies 2614 may include covers 2702, such as dust covers, configured to separate the components of the input assemblies 2614, such as the first gearing mechanisms 2616a, second gearing mechanism 2616b, spacers 2618, etc., from the environments surrounding the energy conversion device 2600. For example, the cover 2702 may prevent elements, such as dust, moisture, dirt, debris, rocks, etc., from entering the input assemblies 2614 and potentially damaging the components of the input assemblies 2614. The cover 2702 may also act as a shield against impact damage, such as from flying debris.

The linear motion may be input into the energy conversion device 2600 through a first coupling arm 2904 and/or a second coupling arm 3202. The first coupling arm 2904 may be coupled to the first input arms 2610 and the connecting arm 2606 through a first input coupler 2902. The second coupling arm 3202 may be coupled to the second input arms 2612 and the connecting arm 2802 through a second input coupler 3204. The first coupling arm 2904 and the second coupling arm 3202 may provide an adjustable mounting location for input joints 3302, 3304, which may be coupled to an oscillating element to input motion into the energy conversion device 2600. The adjustable mounting location may be positioned based on the expected range (e.g., stroke, amplitude, etc.) of the motion being input. For example, if the moving element (e.g., suspension element, tidal float, etc.) has a large range of motion, the input joint 3302, 3304 may be positioned closer to a distal end (e.g., a greater distance from the shaft 2604) of the respective coupling arm 2904, 3202. If the moving element has a small range of motion, the input joint 3302, 3304 may be positioned closer to the shaft 2604. In some cases, the position of the input joints 3302, 3304 may also be determined based on the force provided by the moving element. For example, the coupling arms 2904, 3202 may provide a force multiplying effect, by increasing a moment arm of the force input.

Figure 34:
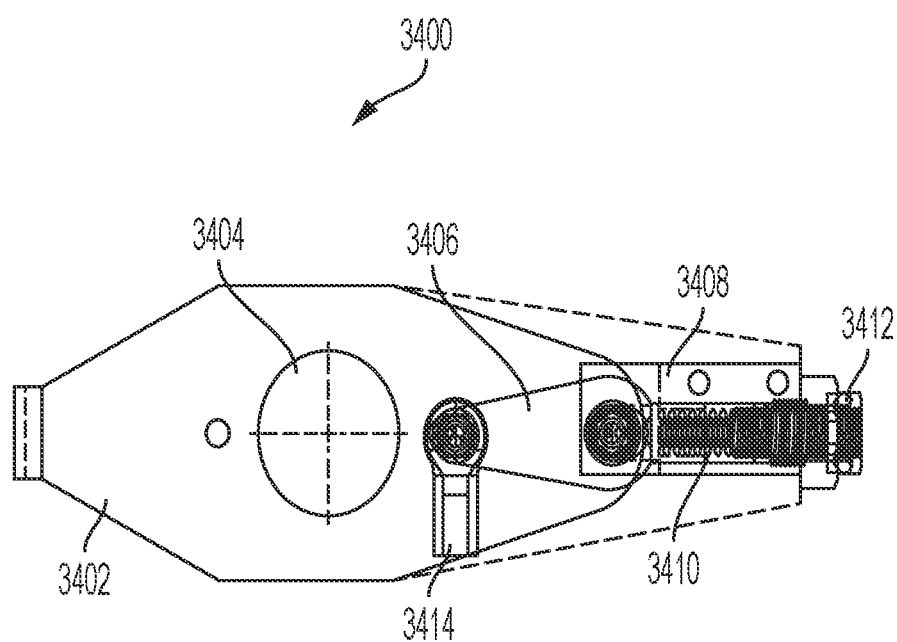
FIGS. 34-35B illustrate different views of an input arm in accordance with one or more embodiments of the present disclosure.
Figure 35A:
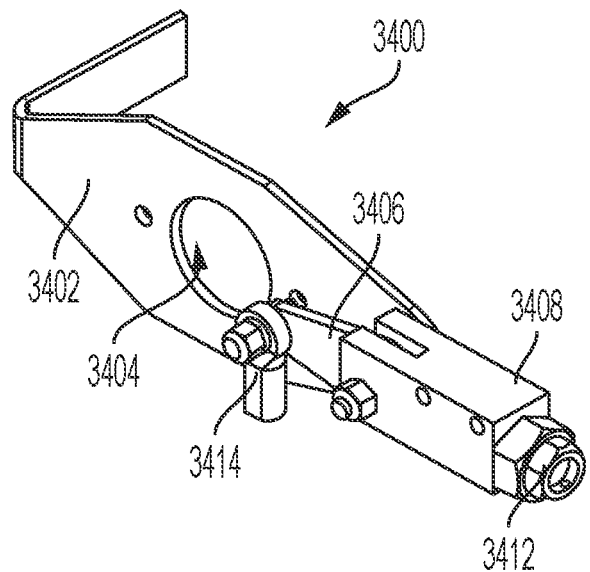
Figure 35B:
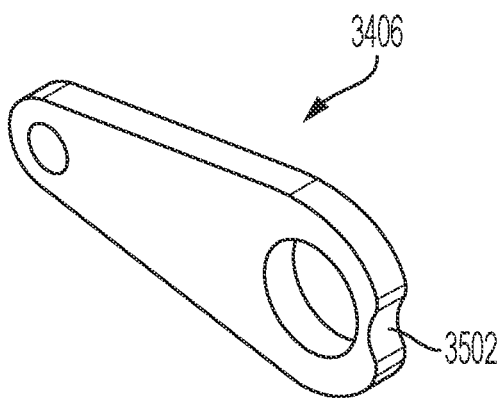

FIGS. 34 and 35B illustrate different views of a coupling arm 3400, such as the first coupling arm 2904 or the second coupling arm 3202 having an adjustable position for and an input joint 3414, such as the first input joint 3304 or the second input joint 3302. The coupling arm 3400 may include an arm 3402 defining a bearing aperture 3404 configured to secure the arm 3402 to a bearing on a shaft (e.g., shaft 112, shaft 2604, etc.). The input joint 3414 may be coupled to the arm 3402 through a locking mechanism 3408. The locking mechanism 3408 may include an adjustable link 3406 and a threaded lock 3410. The adjustable link 3406 may be configured to change a position of the input joint 3414 relative to the bearing aperture 3404, which may change a length of the moment arm of the force input. As described above, changing the length of the moment arm may provide different force multiplying properties and may allow for greater or lower ranges of motion.

In some embodiments, the adjustable link 3406 may rotate relative to the locking mechanism 3408 to change a position of the input joint 3414 relative to the bearing aperture 3404. The threaded lock 3410 may include locking hardware 3412, such as a screw, bolt, or stud configured to lock the adjustable link 3406 into a desired position. For example, the adjustable link 3406 may include indexing features, such as teeth, notches, grooves, etc., which may be engaged by the threaded lock 3410 to substantially prevent the adjustable link 3406 from moving once in the desired location. In other embodiments, the adjustable link 3406 may be coupled to the threaded lock 3410, such that the adjustable link 3406 may increase or decrease in effective length when the locking hardware 3412 is threaded into or out of the locking mechanism 3408. As illustrated in FIG. 34 increasing an effective length of the adjustable link 3406 may effectively reduce the distance between the bearing aperture 3404 and the input joint 3414 whereas decreasing the effective length of the adjustable link 3406 may effectively increase the distance between the bearing aperture 3404 and the input joint 3414. In some embodiments, the adjustable link 3406 may include a key way 3502 as illustrated in FIG. 35B, which may engage with the locking mechanism 3408 to orient the adjustable link 3406 within the locking mechanism 3408.

Figure 36:
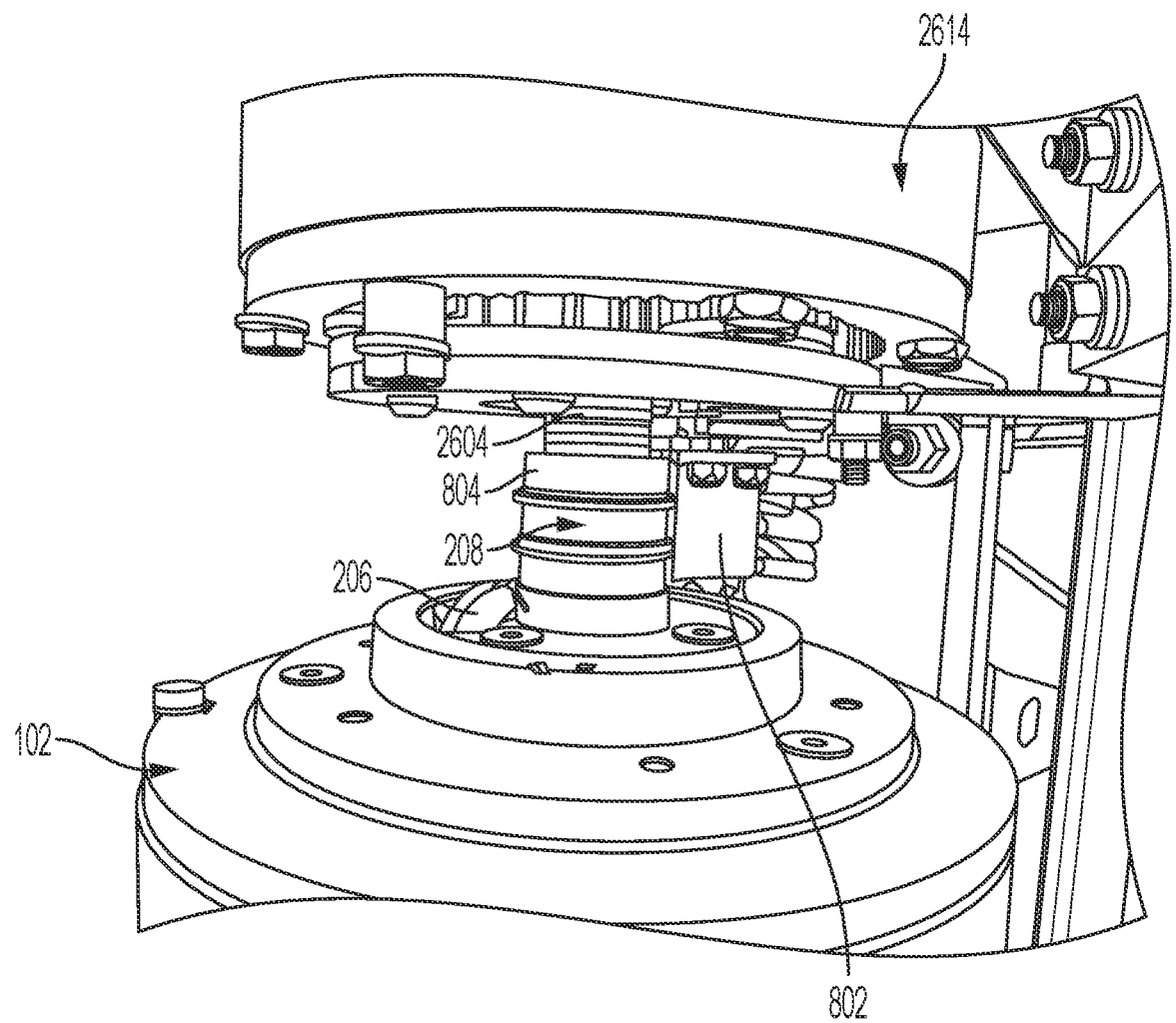
FIG. 36 illustrates a view of an electrical transmission portion of the energy conversion device illustrated in FIGS. 26A-32.
Figure 37:
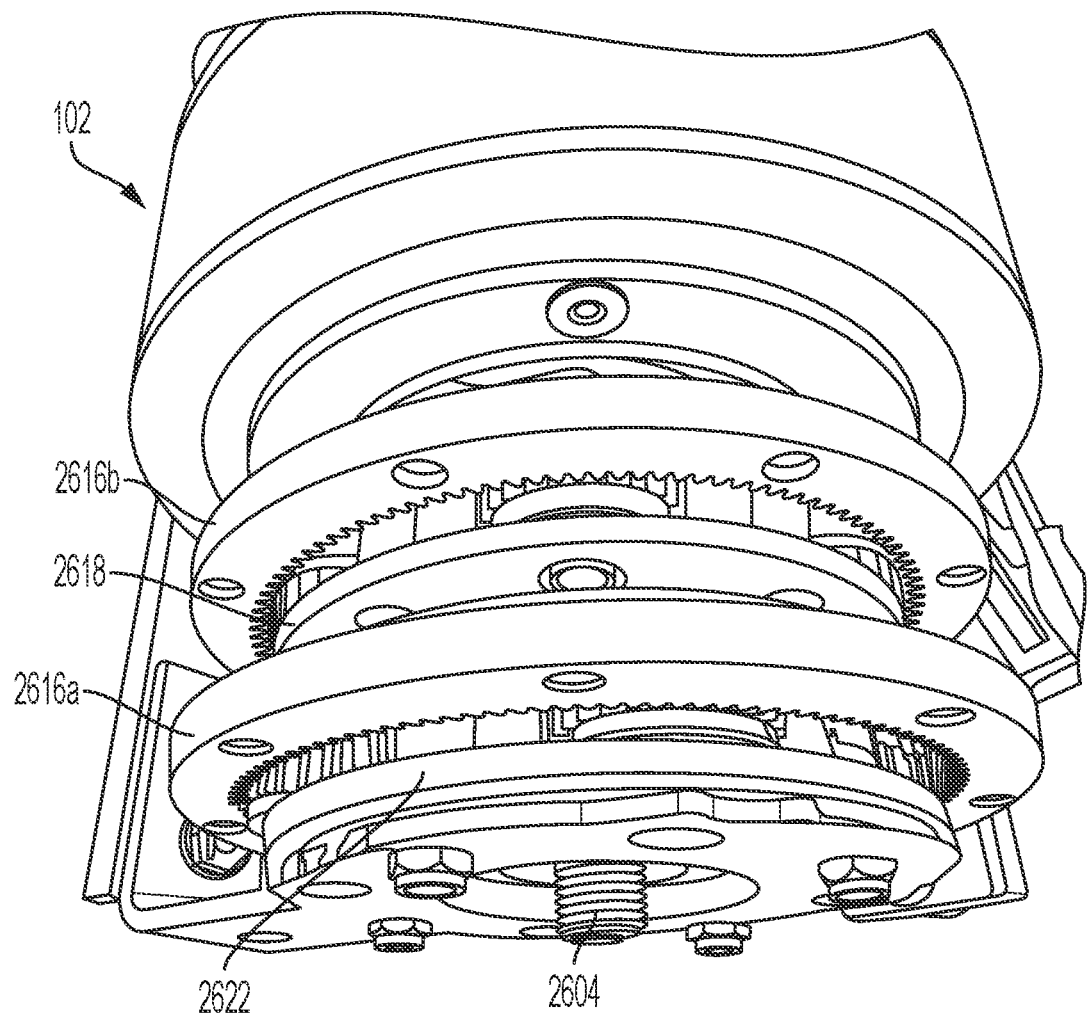
FIGS. 37-44 illustrate different views of an input assembly of the energy conversion device illustrated in FIGS. 26A-32.
Figure 38:
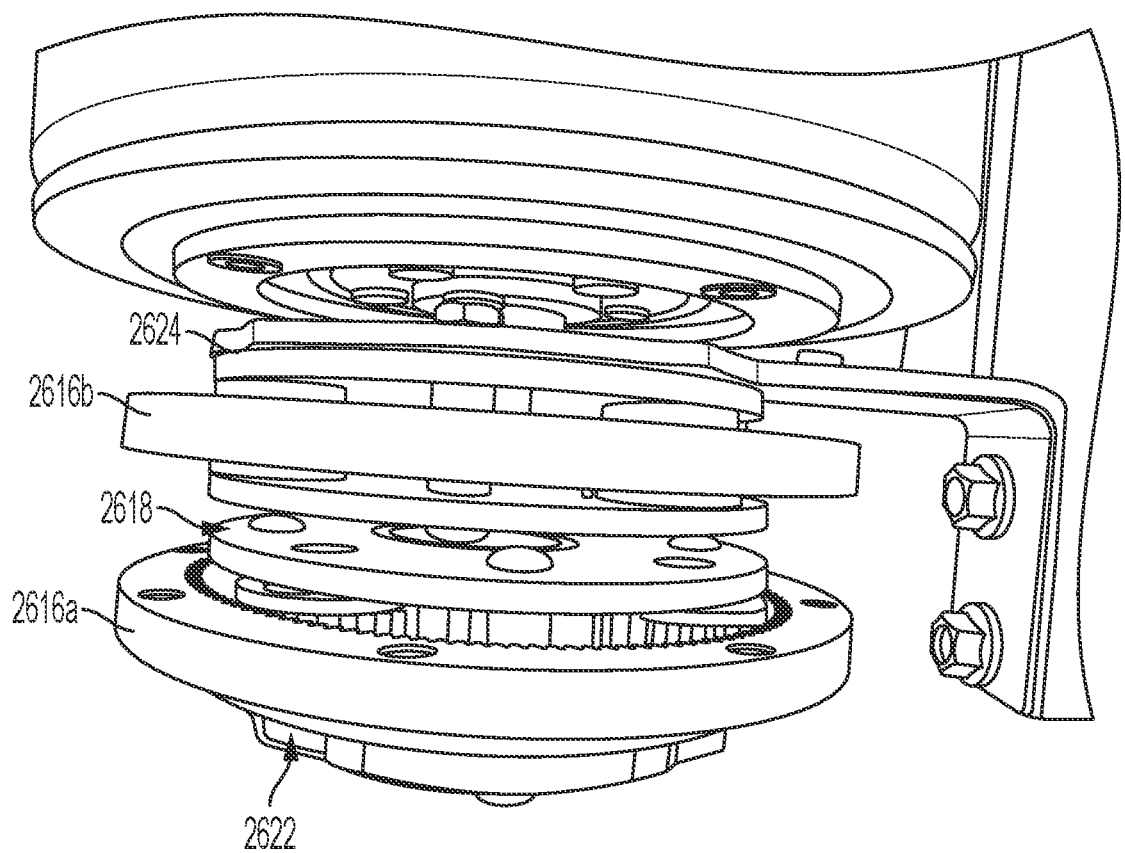

FIG. 36 illustrates a view of the electrical output 208 of the energy conversion device 2600. The electrical output 208 may be positioned on the shaft 2604 between the generator 102 and the input assembly 2614. As described above, the electrical output 208 may include conductive paths 804 which may be configured to interface with the pick-up module 802. The pick-up module 802 may include brushes configured to be placed in slidable contact with the conductive paths 804. The slidable contact between the brushes of the pick-up module 802 and the conductive paths 804 may allow the electrical output 208 to rotate relative to the pick-up module 802 while remaining in contact with the pick-up module 802, such that the pick-up module 802 may remain stationary relative to the shaft 2604. The conductive paths 804 may be coupled to the generator 102 through wires 206. Thus, the electricity generated by the generator 102 may be conveyed to the conductive paths 804 of the electrical output 208 through the wires 206 and the electricity may then be transmitted to the pick-up module 802 through the brushes.

FIGS. 37-44 illustrate different views of the input assembly 2614 and components thereof. As described above, the input assemblies 2614 may include gearing mechanisms 2616a, 2616b. The gearing mechanisms 2616a, 2616b may be configured to increase a rotational input through the gears present in the gearing mechanism 2616a, 2616b. A gear ratio of the gearing mechanism 2616a, 2616b may define a proportional increase of the rotation input. For example, if the first gearing mechanism 2616a has a gear ratio of 5:1 in input rotation may be increased by a factor of 5, such that if the input rotation rotates through 15° the first gearing mechanism 2616a may input a rotation of 75° to the shaft 2604. The gearing mechanisms 2616a, 2616b may have gear ratios in a range including 1:1 to 10:1, such as in a range including 2:1 to 7:1, or 5:1. In some embodiments, the first gearing mechanism 2616a and the second gearing mechanism 2616b may have different gear ratios. For example, the moving element providing the oscillating input to the first gearing mechanism 2616a may have a different range of motion from the moving element providing the oscillating input to the second gearing mechanism 2616b. The gear ratios of the first gearing mechanism 2616a and the second gearing mechanism 2616b may be configured such that to rotation provided to the shaft by each of the first gearing mechanism 2616a and the second gearing mechanism 2616b is substantially the same. In other embodiments, the gear ratios of the first gearing mechanism 2616a and the second gearing mechanism 2616b may be substantially identical.

Figure 39A:
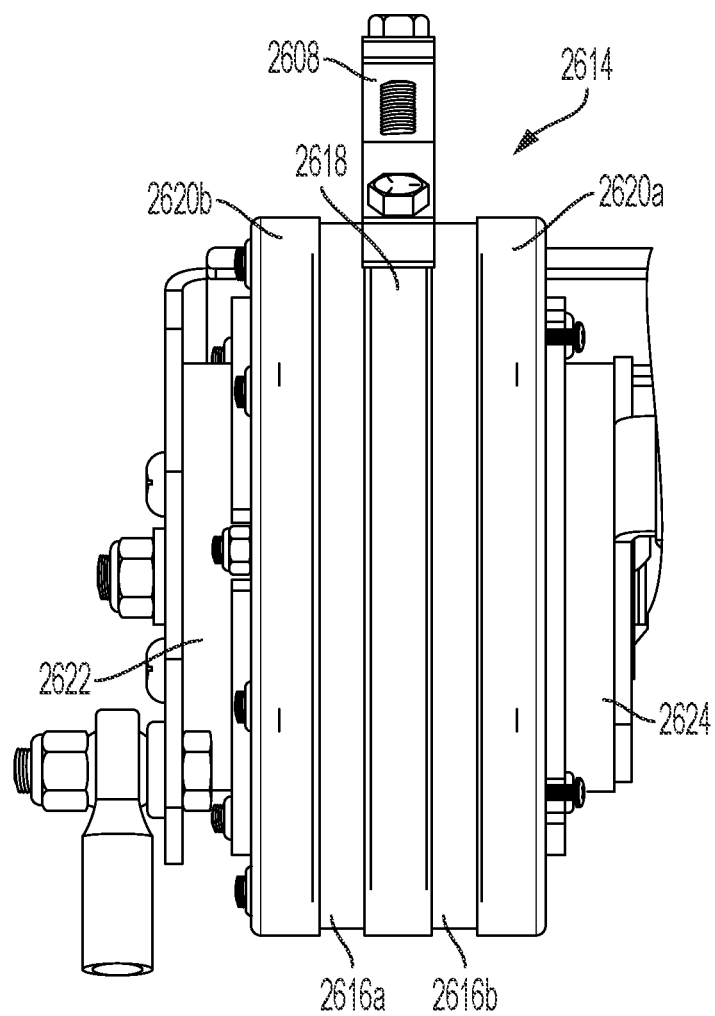
Figure 39B:
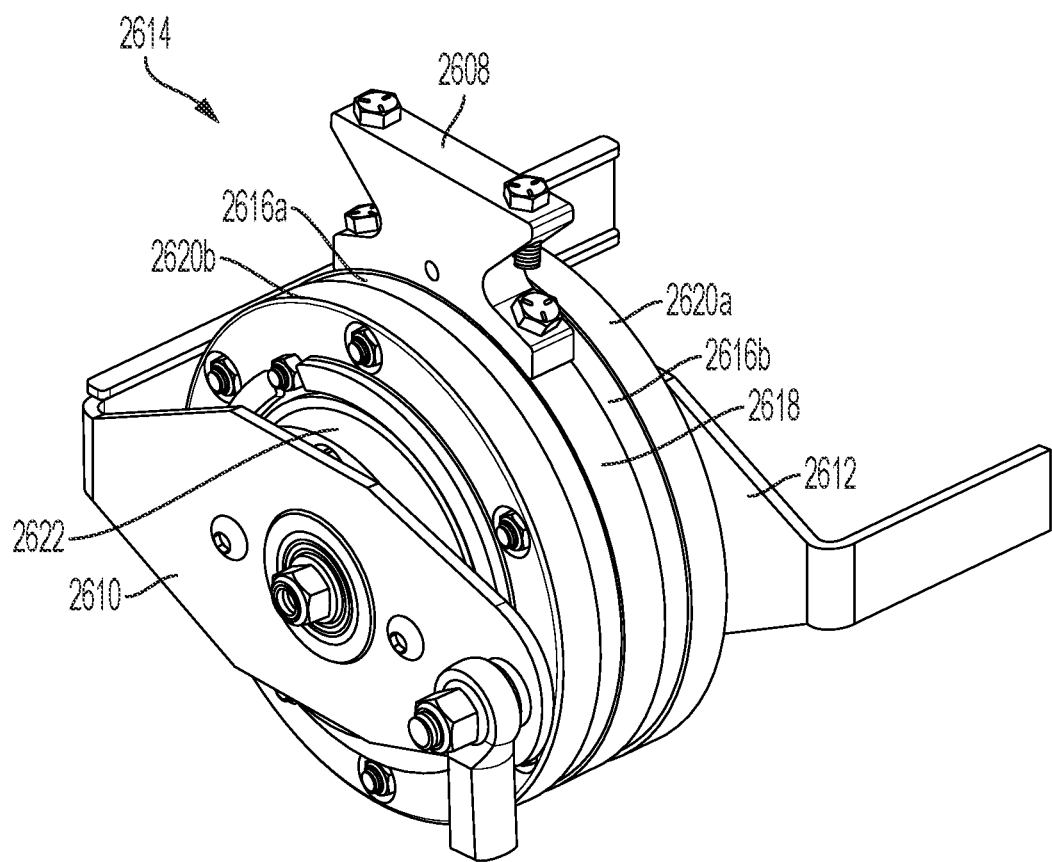
Figure 39C:
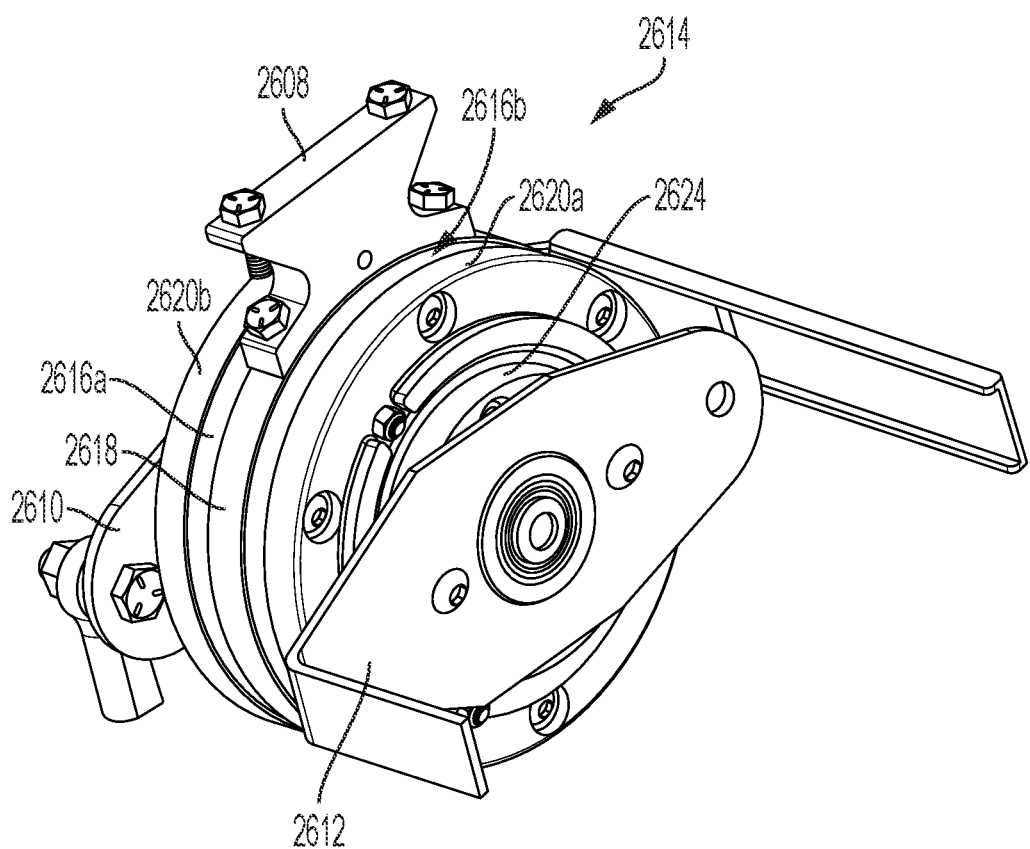
Figure 40:
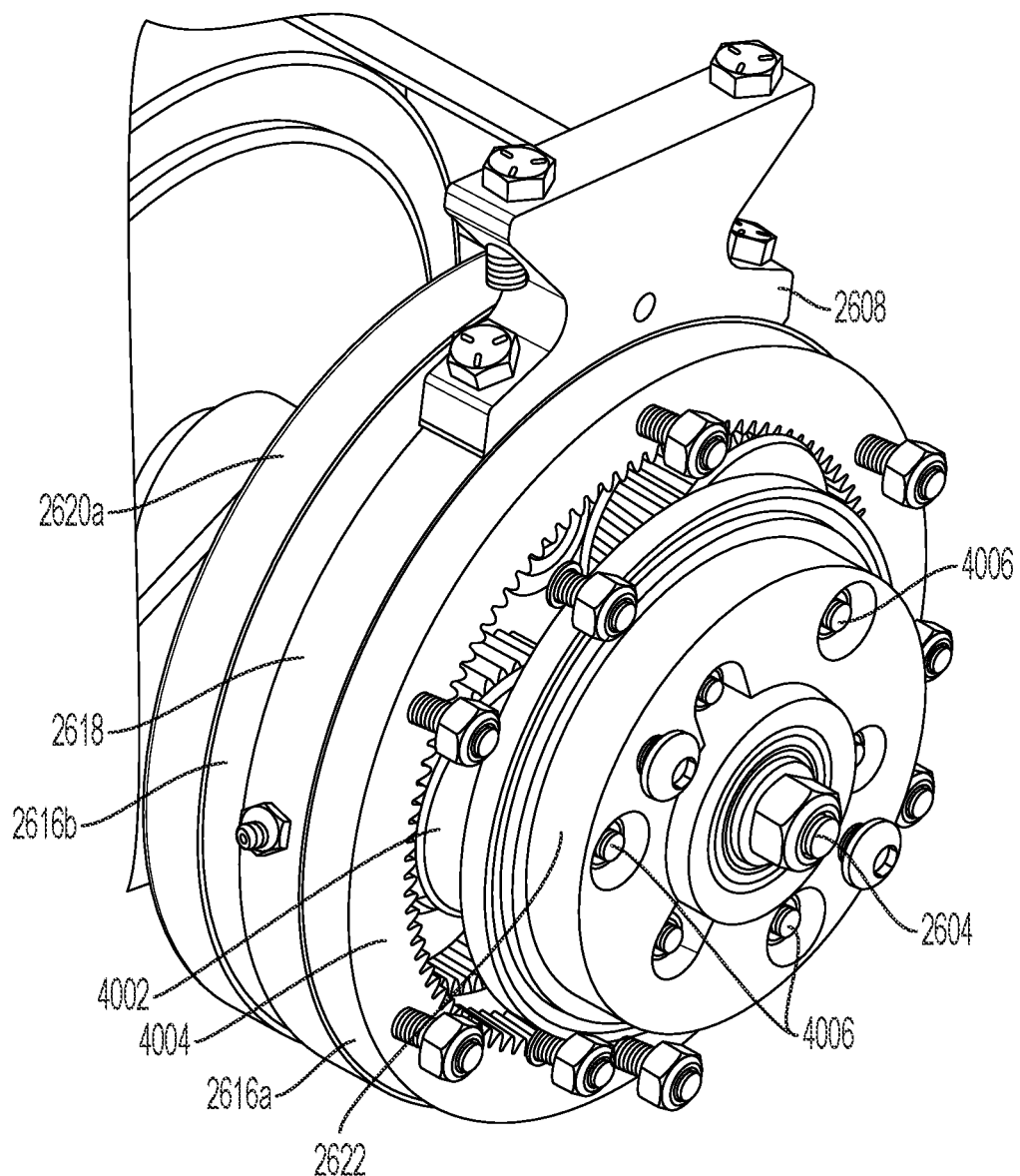
Figure 41:
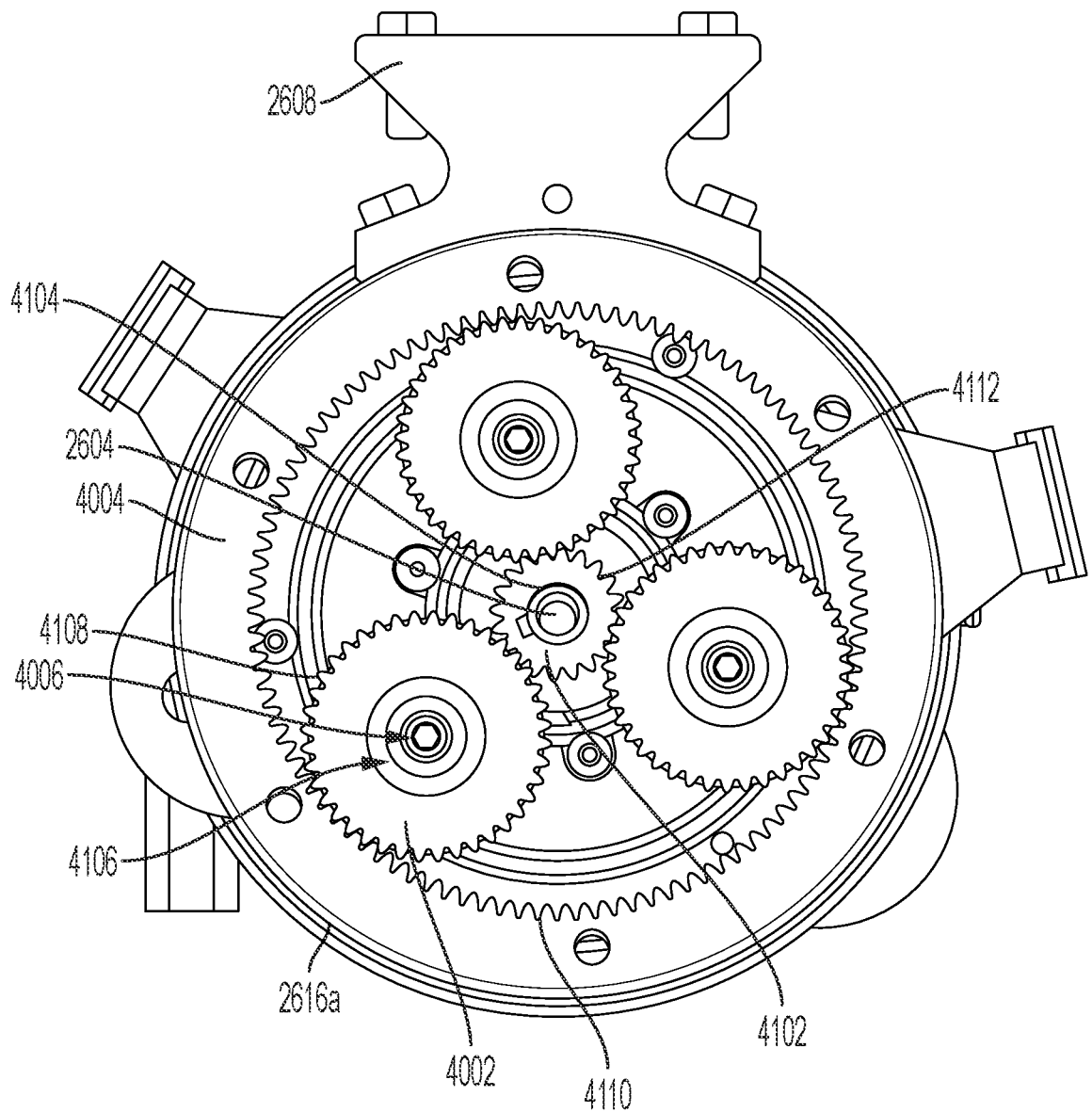
Figure 42:
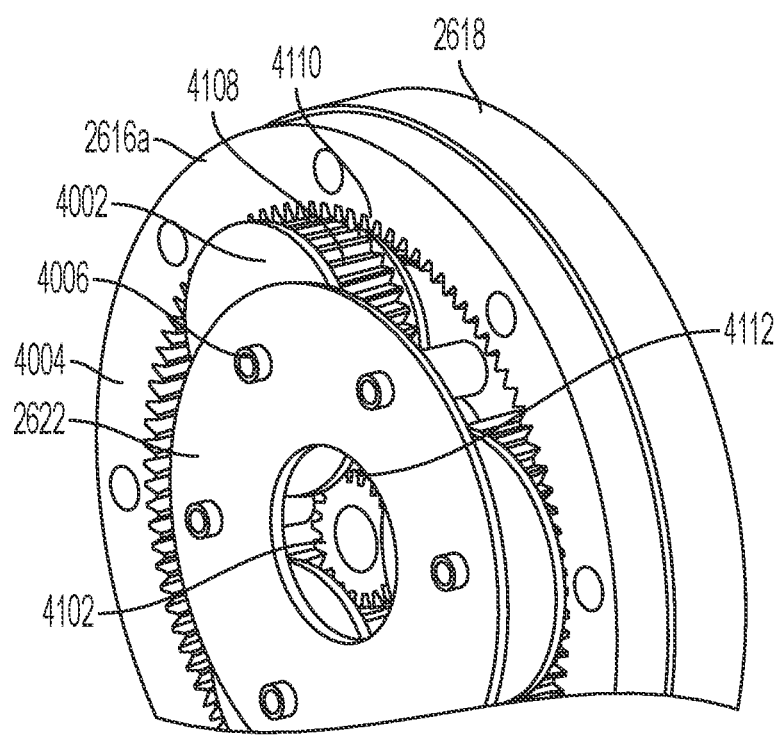
Figure 43:
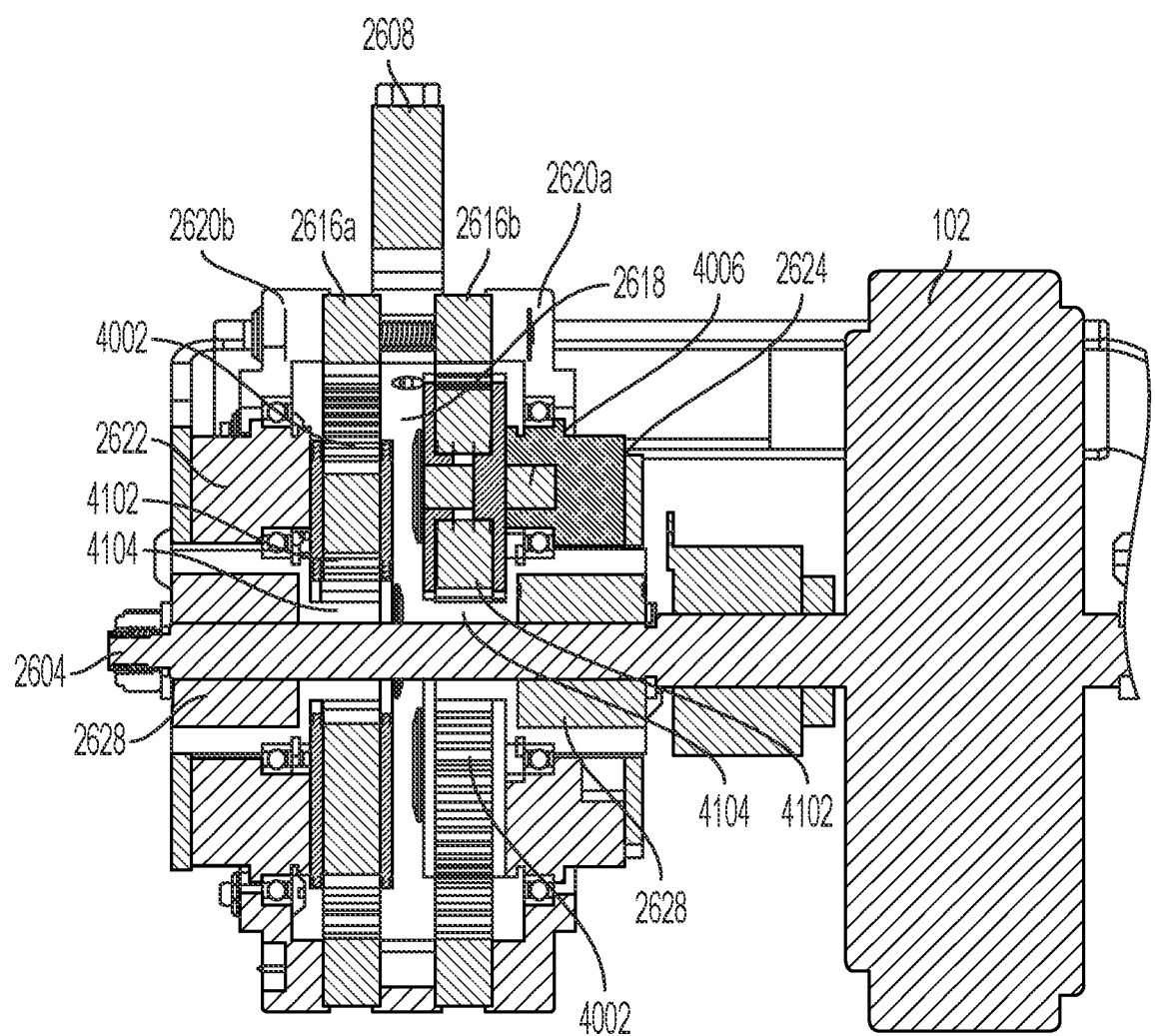
Figure 44:
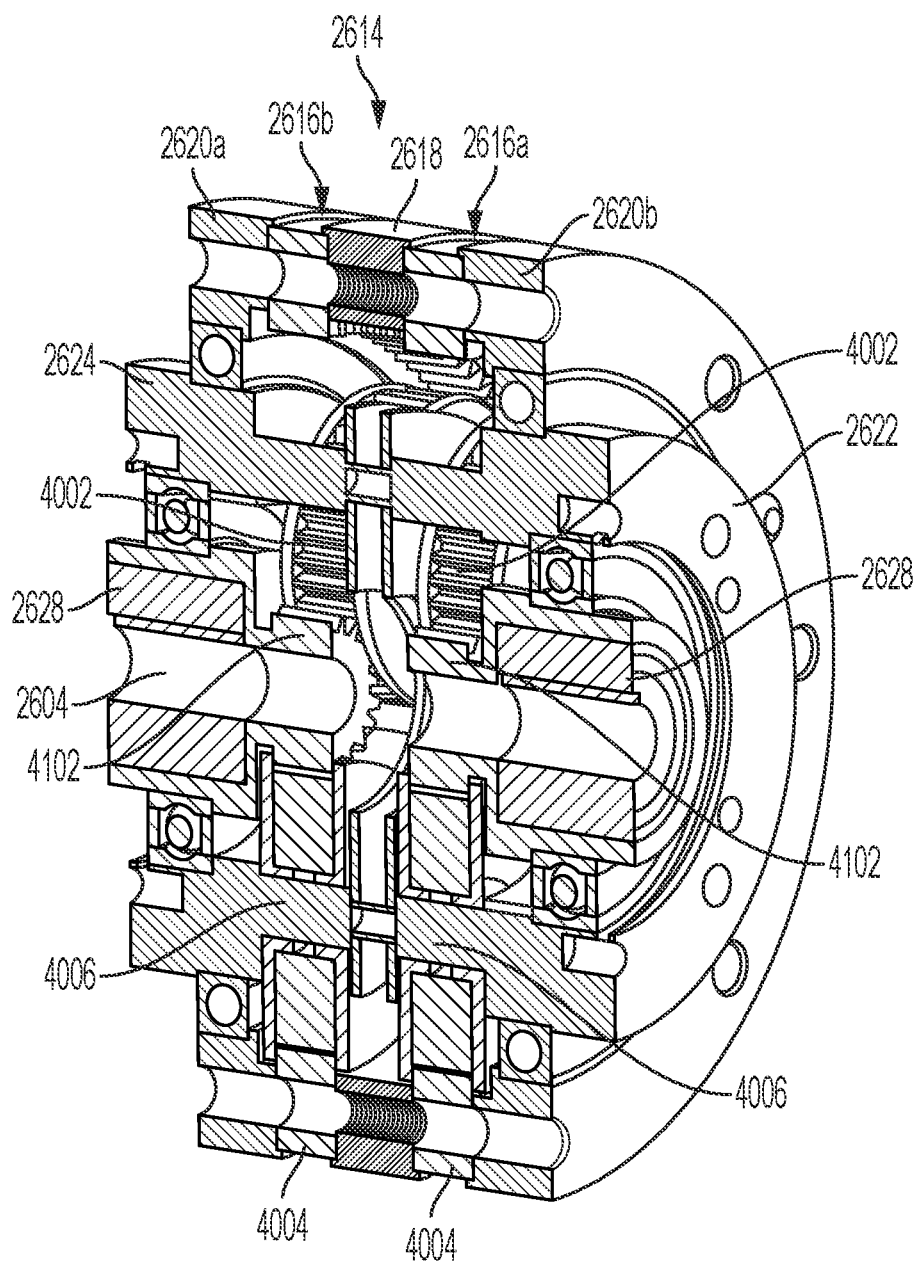

The gearing mechanisms 2616a, 2616b may be planetary gear sets including a ring gear 4004, planet gears 4002, and a sun gear 4102. The ring gear 4004 may be secured to the mount arm 2608, such that the ring gear 4004 does not move relative to the mount 2602. For example, the ring gear 4004 may be secured to at least one of the spacer 2618, the inner housing 2620a, and the outer housing 2620b. As illustrated in FIGS. 39A through 40, the ring gear 4004 may be sandwiched between the spacer 2618 and either the inner housing 2620a or the outer housing 2620b. The ring gear 4004 may be rotationally secured to both the spacer 2618 and the respective inner housing 2620a or outer housing 2620b with hardware (e.g., bolts, screws, studs, etc.) passing through all three elements at multiple radial locations. In some embodiments, the hardware may pass from the inner housing 2620a to the outer housing 2620b passing through the ring gear 4004 of the first gearing mechanism 2616a, the spacer 2618, and the second gearing mechanism 2616b as well, such that each of the inner housing 2620a, the ring gear 4004 of the first gearing mechanism 2616a, the spacer 2618, the ring gear 4004 of the second gearing mechanism 2616b, and the outer housing 2620b are secured to one another. The mount arm 2608 may be secured directly to one or more of the spacer 2618, the inner housing 2620a, and the outer housing 2620b. The mount arm 2608 may thereby by indirectly secured to the ring gears 4004 and the other components of the spacer 2618, inner housing 2620a, outer housing 2620b through the hardware connections between the inner housing 2620a, the ring gear 4004 of the first gearing mechanism 2616a, the spacer 2618, the ring gear 4004 of the second gearing mechanism 2616b, and the outer housing 2620b.

The first input coupler 2622 and the second input coupler 2624 may then interface with the planet gears 4002 of the respective first gearing mechanism 2616a and second gearing mechanism 2616b. The planet gears 4002 may include teeth 4108, which may engage with teeth 4110 of the ring gear 4004. The gearing mechanisms 2616a, 2616b may include at least two planet gears 4002, such as at least three planet gears 4002, or at least four planet gears 4002. Each planet gear 4002 may include an input shaft 4006 and a bearing 4106. The bearing 4106 may allow each planet gear 4002 to rotate freely about the respective input shaft 4006. Each input shaft 4006 of the planet gears 4002 may be coupled to the respective first input coupler 2622 or second input coupler 2624, such that the input couplers 2622, 2624 act as a carrier in the planetary gear set. As the respective input coupler 2622, 2624 rotates about the shaft 2604, each of the planet gears 4002 may move about the shaft 2604. As the planet gears 4002 move about the shaft 2604, the engagement of the teeth 4108 of the planet gears 4002 and the teeth 4110 of the ring gear 4004 may cause the planet gears 4002 to rotate about the respective input shafts 4006 as the planet gears 4002 move about the shaft 2604.

The gearing mechanism 2616a, 2616b may include a sun gear 4102 coupled to the shaft 2604 through a one-way bearing 4104. The sun gear 4102 may be centrally positioned in the gearing mechanism 2616a, 2616b, such that the planet gears 4002 rotate about (e.g., orbit) the sun gear 4102. The teeth 4108 of the planet gears 4002 may engage with teeth 4112 of the sun gear 4102, such that the rotation of planet gears 4002 may be transmitted to the sun gear 4102. The one-way bearing 4104 may allow the sun gear 4102 to transmit rotation to the shaft 2604 in one direction while rotating freely relative to the shaft 2604 in the opposite direction. The gear ratio of the gearing mechanism 2616a, 2616b may be defined by a difference in the number of teeth or diameter of the planet gears 4002 and the sun gear 4102. As described above, the gear ratio of the gearing mechanism 2616a, 2616b may cause the shaft 2604 to rotate a greater amount than the respective input coupler 2622, 2624. In the planetary gear set this would result in the sun gear 4102 rotating through a greater angle than the angular position change of the planet gears 4002 (e.g., angle of rotation of the input coupler 2622, 2624).

Figure 45:
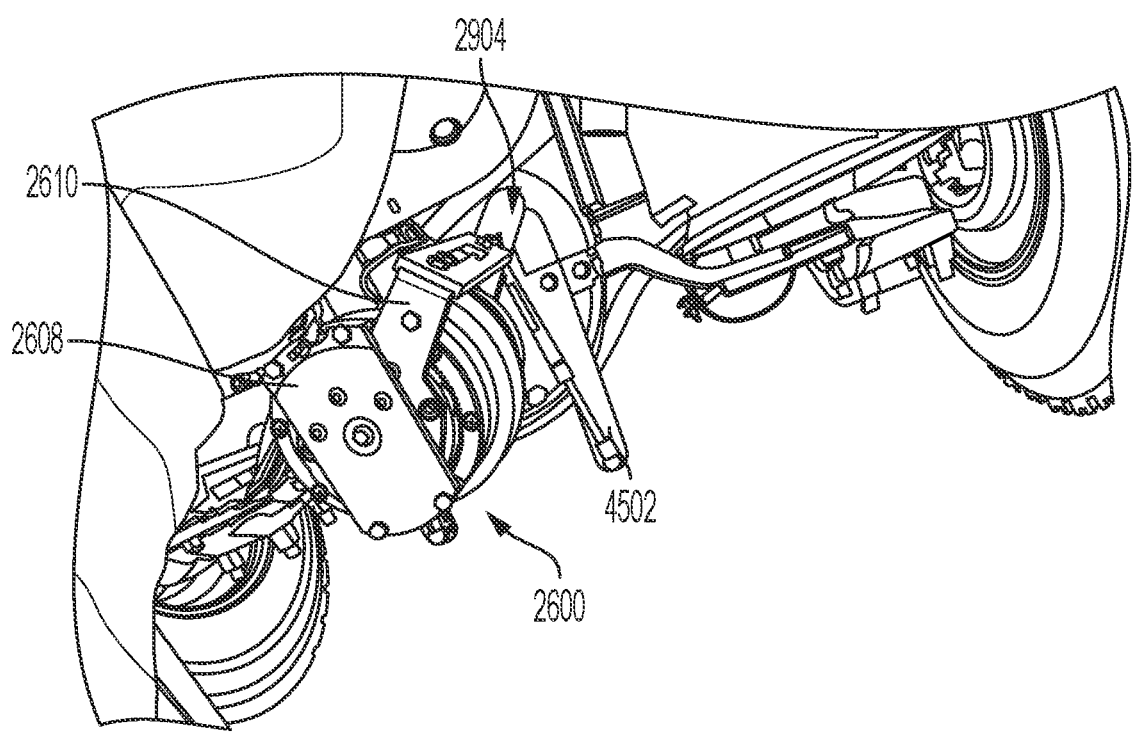
FIGS. 45-47 illustrate different mounting configurations of the energy conversion device illustrated in FIGS. 26A-32.
Figure 46:
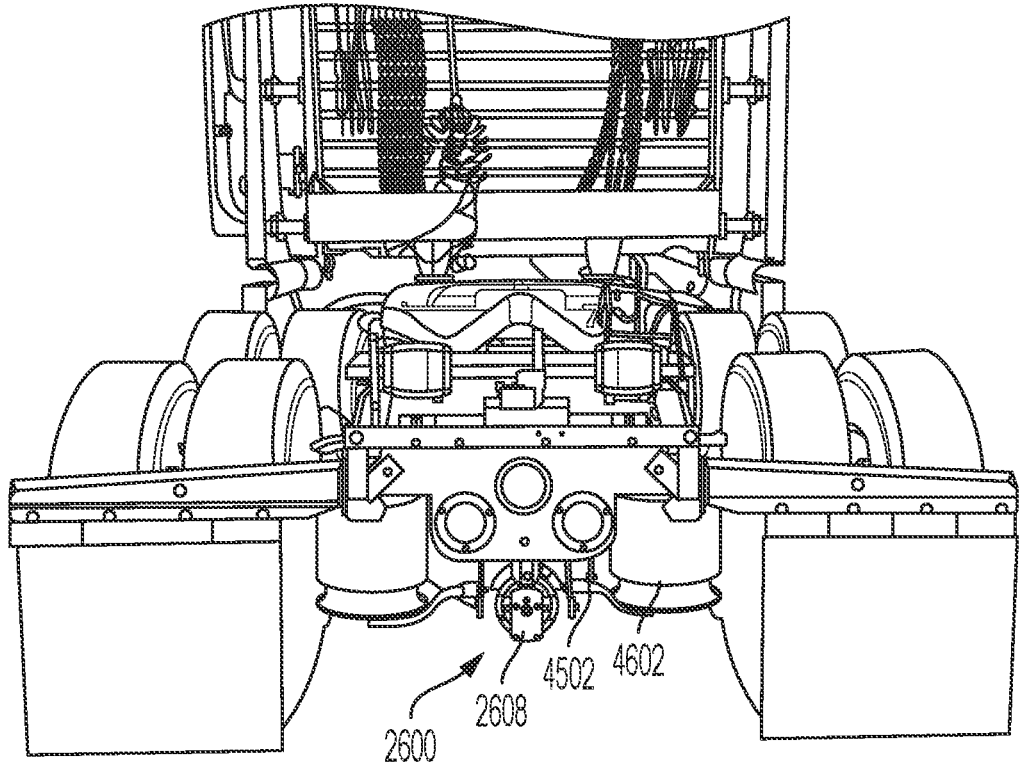
Figure 47:
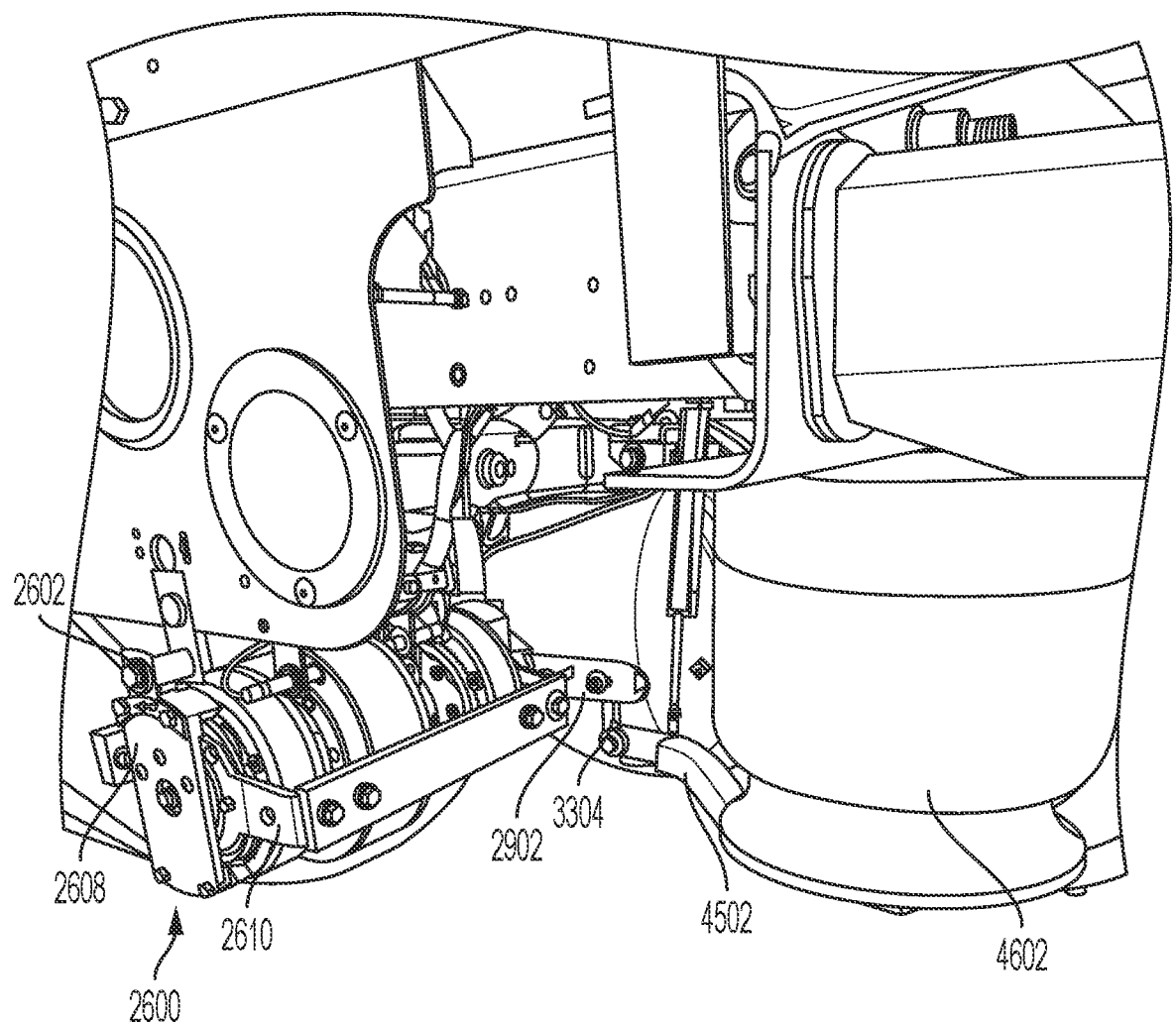

FIGS. 45-47 illustrate embodiments of the energy conversion device 2600 installed on a vehicle, such as a light duty truck in FIG. 45 and a heavy duty truck in FIGS. 46 and 47. These embodiments are exemplary and non-limiting, the energy conversion device 2600 may be utilized in many different applications including, but not limited to, trailers, cars, trucks, heavy equipment, military equipment, aircraft, boats, ships, trains, tidal generators, etc.

The energy conversion device 2600 may be secured to the frame of the vehicle through the 2602 and mount arm 2608. The first input arm 2610 may be coupled to a suspension member 4502 of the vehicle through the first input joint 3304 and the first input coupler 2902. In some embodiments, the suspension member 4502 may be an oscillating member of the suspension of the vehicle as illustrated in FIG. 45. In other embodiments, the suspension member 4502 may be a member configured to couple the first input coupler 2902 to another oscillating suspension element, such as a suspension spring 4602 (e.g., leaf spring, coil spring, strut, air-bag, etc.) as illustrated in FIGS. 46 and 47. The second input arm 2612 may be similarly coupled to another suspension member 4502 and/or suspension spring 4602 through the respective second input joint 3302 and second input coupler 3204 as described above. In some embodiments, the first input arm 2610 and the second input arm 2612 may be coupled to the same type of suspension member 4502 and/or suspension spring 4602 on opposite sides of the vehicle. In some embodiments, the first input arm 2610 and the second input arm 2612 may be coupled to the same suspension member 4502 and/or suspension spring 4602, such that the same motion is input into each of the first input arm 2610 and the second input arm 2612, substantially doubling the power generated from a single motion. In other embodiments, the first input arm 2610 and the second input arm 2612 may be coupled to different suspension members 4502 and/or suspension springs 4602 to capture different types of motion.

Figure 48A:
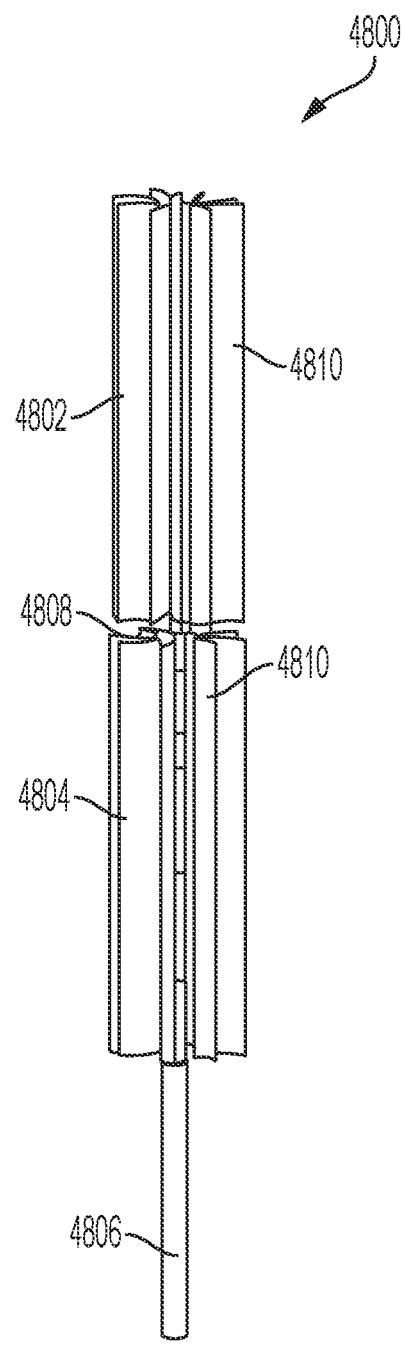
FIGS. 48A and 48B illustrate a wind turbine in accordance with one or more embodiments of the present disclosure.
Figure 48B:
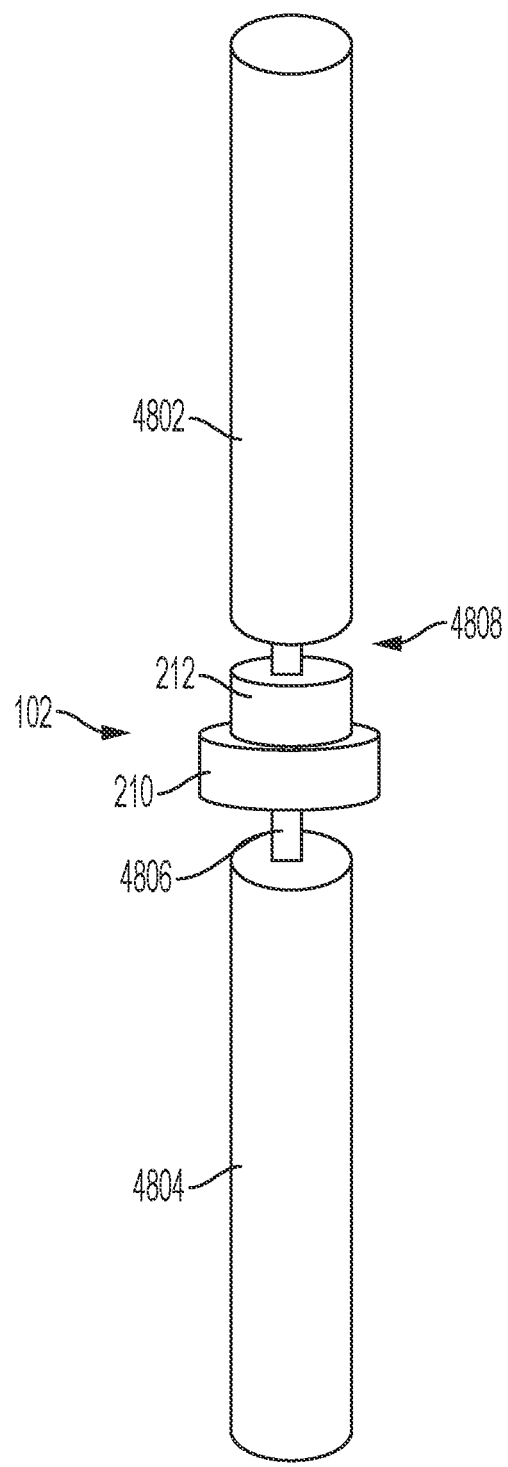
Figure 49A:
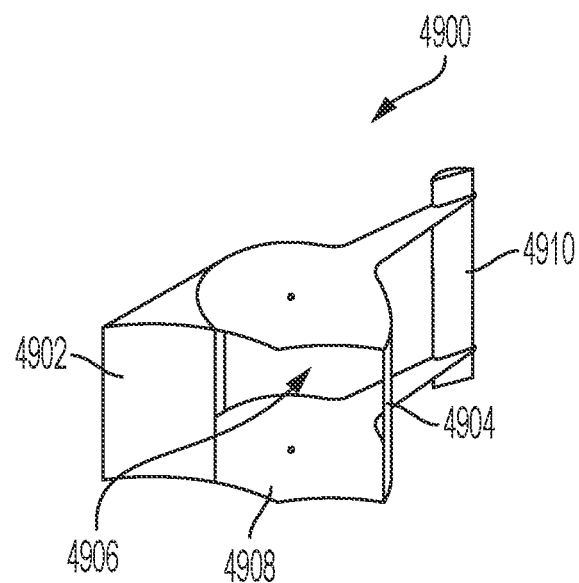
FIGS. 49A-51B illustrate different views of a scoop for use with the wind turbine of FIG. 48.
Figure 49B:
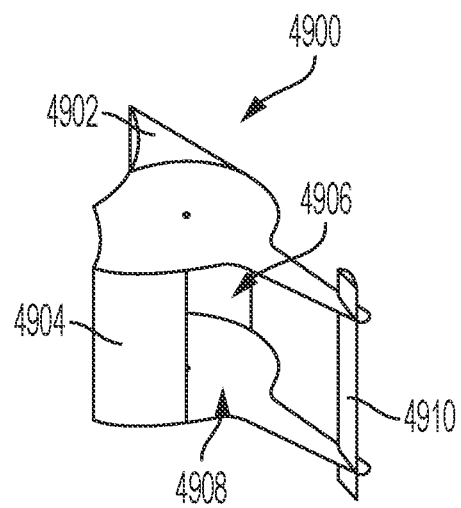
Figure 49C:
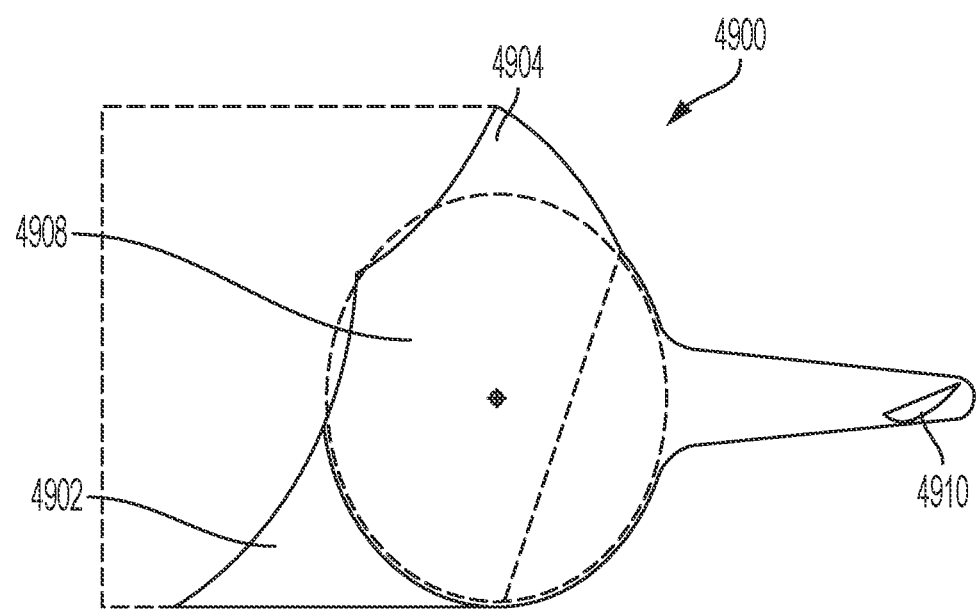

The generator 102 may be incorporated into a rotational power generation system, such as a wind turbine, water turbine, a steam turbine, etc. FIGS. 48A and 48B illustrate a wind turbine 4800, with which the generator 102 may be incorporated. The wind turbine 4800 may include a first turbine 4802 and a second turbine 4804 coupled to a shaft 4806. The first turbine 4802 and the second turbine 4804 may be configured to rotate in opposite directions. For example, the vanes 4810 of the first turbine 4802 and the second turbine 4804 may be curved in opposite directions, such that wind impinging on wind turbine 4800 from the same direction will cause the first turbine 4802 to rotate in a first direction and the second turbine 4804 to rotate in a second opposite direction.

The first turbine 4802 may be coupled to the stator 210 of the generator 102 and the second turbine 4804 may be coupled to the rotor 212 of the generator 102, such that the stator 210 and the rotor 212 rotate in opposite directions relative to one another to generate power in a similar manner to that described above with respect to the oscillating motion. Rotating the stator 210 and the rotor 212 in opposite directions may double the relative speed of the rotor 212 with respect to the stator 210, which may increase the power generated by the generator 102. In some embodiments, the generator 102 may be positioned between the first turbine 4802 and the second turbine 4804 in an interface region

4808. In other embodiments, the generator 102 may be positioned remote from the first turbine 4802 and the second turbine 4804. For example, the shaft 4806 may include nested shafts, such that a first shaft may rotate in a first direction and a second shaft may rotate in a second opposite direction. The generator 102 may be coupled to the shaft 4806 at a location remote from the first turbine 4802 and the second turbine 4804, such as a base of the shaft 4806. The stator 210 may be coupled to the first shaft of the nested shafts and the rotor 212 being coupled to the second shaft of the nested shafts, such that the stator 210 and the rotor 212 rotate in opposite directions.

An open wind turbine, such as those illustrated in FIGS. 48A and 48B may experience drag from the wind contacting the back side of the vanes of the turbine. The drag on the turbine may be limited by blocking portions of the turbine, such as with a cage or a scoop. FIGS. 49A-51B illustrate different views of a scoop 4900 for a wind turbine. The scoop 4900 may include a front deflector 4902 configured to direct airflow to one portion of the scoop 4900, while deflecting the airflow away from the other portion. The scoop 4900 may include a turbine area 4908 configured to house a turbine 5102. The front deflector 4902 may be positioned such that the airflow is directed to a face of the vanes 5104 of the turbine 5102 and deflects the airflow away from the back side of the vanes 5104, which may reduce the drag on the turbine 5102. The scoop 4900 may also include a rear scoop 4904, which may direct the airflow to an exhaust opening 4906 at the rear of the scoop 4900. Controlling the flow direction through the turbine area 4908 may increase an efficiency of the turbine 5102, such that a greater amount of power is captured from the wind by the turbine 5102.

In some embodiments, the scoop 4900 may include a wing 4910 or weather vane positioned behind the exhaust opening 4906. The wing 4910 may be configured to position the scoop 4900 in line with the direction of the wind. For example, if the wind is blowing perpendicular to the scoop 4900, the wing 4910 may cause the scoop 4900 to rotate until the wind is passing through the opening in the scoop 4900 into the turbine area 4908.

In some embodiments, such as in larger applications, the scoop 4900 may include a drive assembly 5004 configured to reposition the scoop 4900. The scoop 4900 may include a wind direction detector 5002, such as a weather vane or a sensor. The drive assembly 5004 may then position the scoop 4900 into an optimal position. The drive assembly 5004 may include a drive gear 5006 operatively coupled to a positioning gear 5008. In some embodiments, the drive gear 5006 may be coupled to the positioning gear 5008 through an engagement between teeth of the drive gear 5006 and teeth of the positioning gear 5008. In other embodiments, the drive gear 5006 may be coupled to the positioning gear 5008 through a belt (e.g., V-belt, toothed belt, ribbed belt, etc.) or a chain. The drive gear 5006 may be driven by an electric motor. In some cases, the electric motor may drive the drive gear 5006 based on a position set point. In other cases, the electric motor may drive the drive gear 5006 based on the output of a control loop, such as a PID loop comparing the readings from the wind direction detector 5002 to a threshold value.

Figure 4:
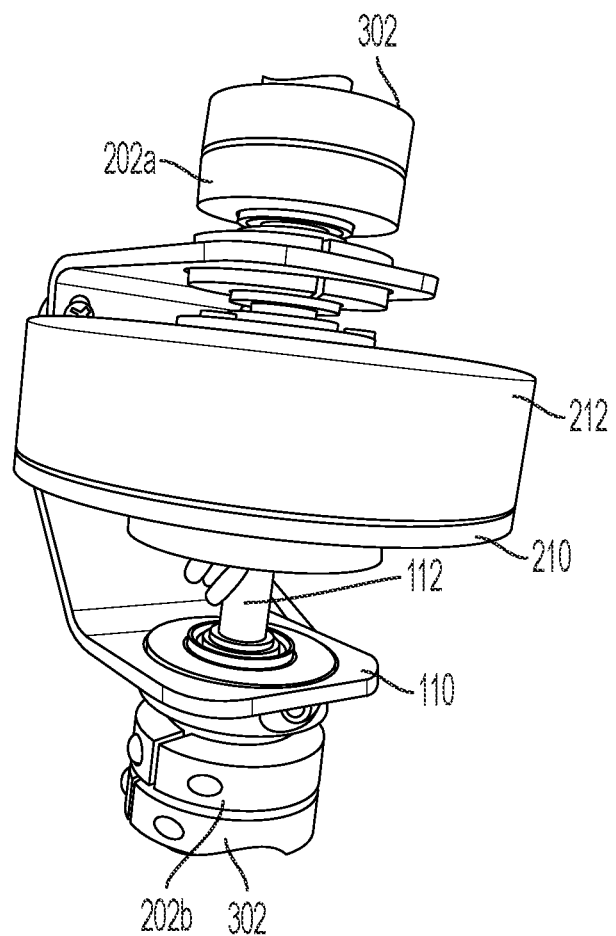
Figure 5:
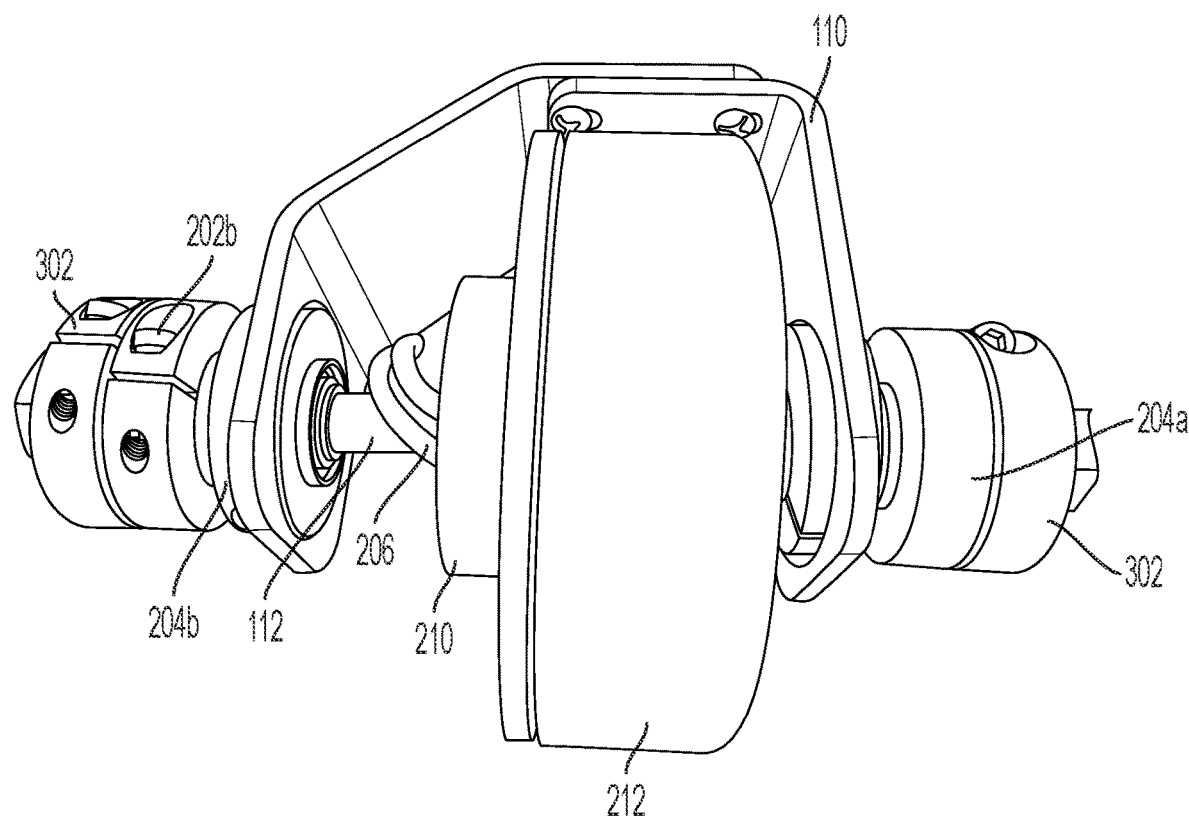

The turbine 5102 may be coupled to an output 5010 outside the scoop 4900. The output 5010 may be coupled to a shaft, such that rotation of the turbine 5102 may be transmitted to the output 5010. In some embodiments, the output 5010 may be directly coupled to the generator 102 (FIG. 4). In other embodiments, the output 5010 may be a pulley or gear operatively coupled to the generator 102, such as through a belt or chain.

FIGS. 52-54B illustrate several examples of a wind generator 5200. The wind generator 5200 may include a front deflector 5202 configured to direct airflow to a first turbine 5204 and a second turbine 5206. The first turbine 5204 and the second turbine 5206 may be configured to rotate in opposite directions. For example, the first turbine 5204 may include vanes 5212 that are configured to cause the first turbine 5204 to rotate in a clockwise direction and the second turbine 5206 may include vanes 5212 that are configured to cause the second turbine 5206 to rotate in a counter-clockwise direction. Similar to the front deflector 4902 described above, the front deflector 5202 of the wind generator 5200 may substantially prevent airflow from impinging on a backside of the vanes 5212 of the first turbine 5204 and the second turbine 5206. The front deflector 5202 may also direct the airflow toward the front face of the vanes 5212. Thus, the front deflector 5202 may increase the efficiency of each of the first turbine 5204 and the second turbine 5206.

Figure 53:
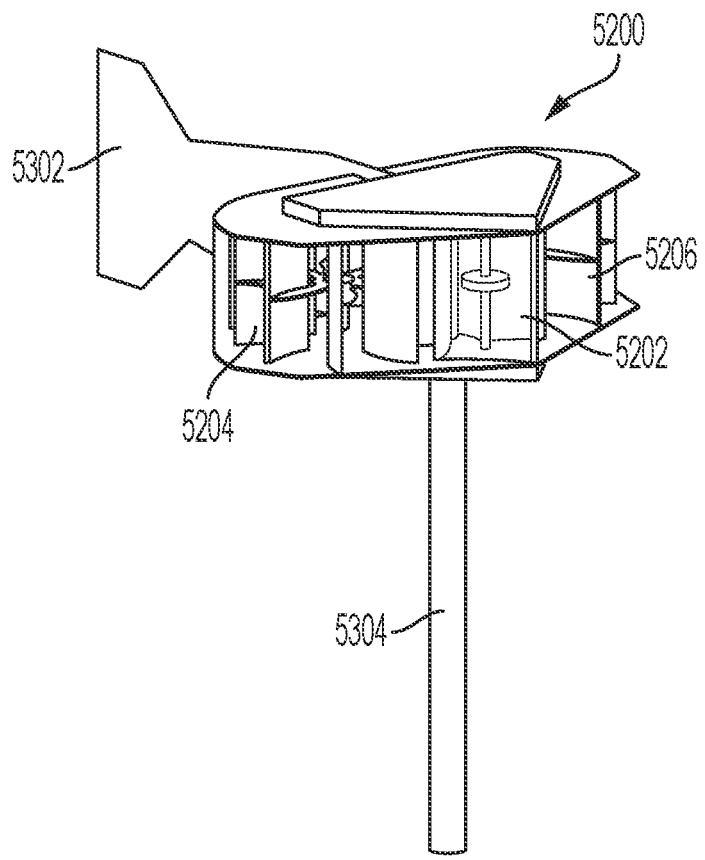
Figure 57A:
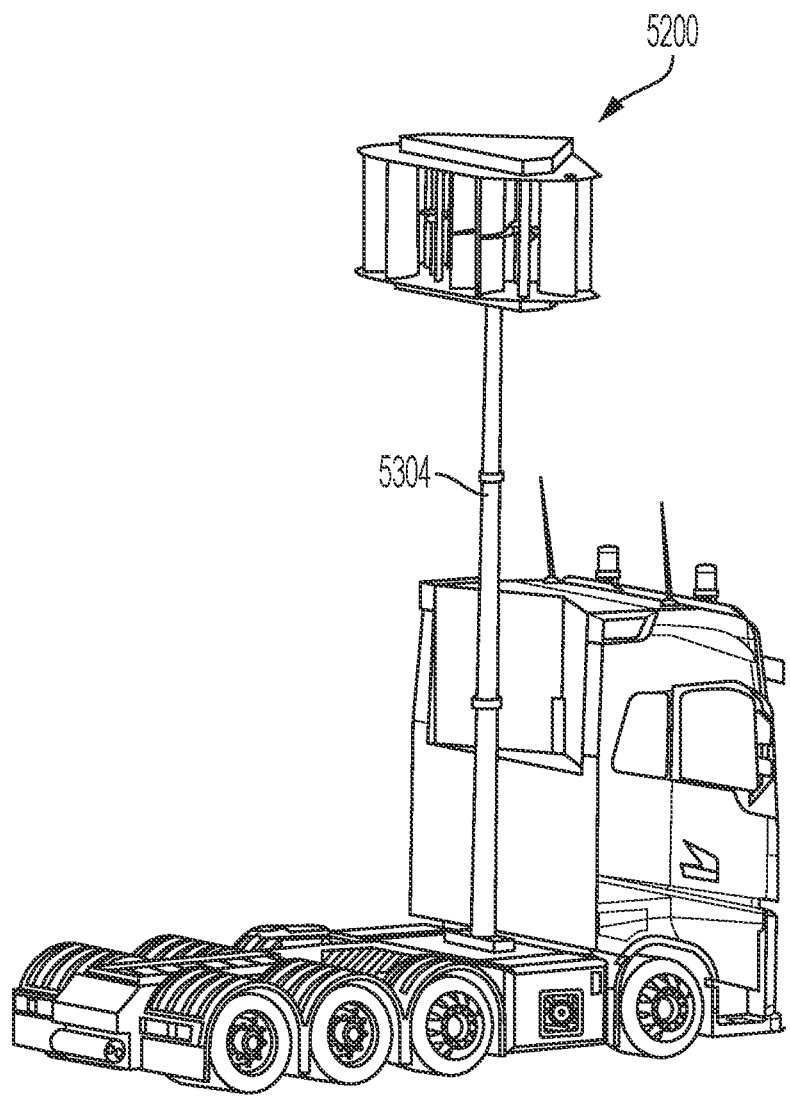
FIGS. 57A and 57B illustrate different views of the wind generator of FIG. 52 mounted to a vehicle in accordance with embodiments of the present disclosure.
Figure 57B:
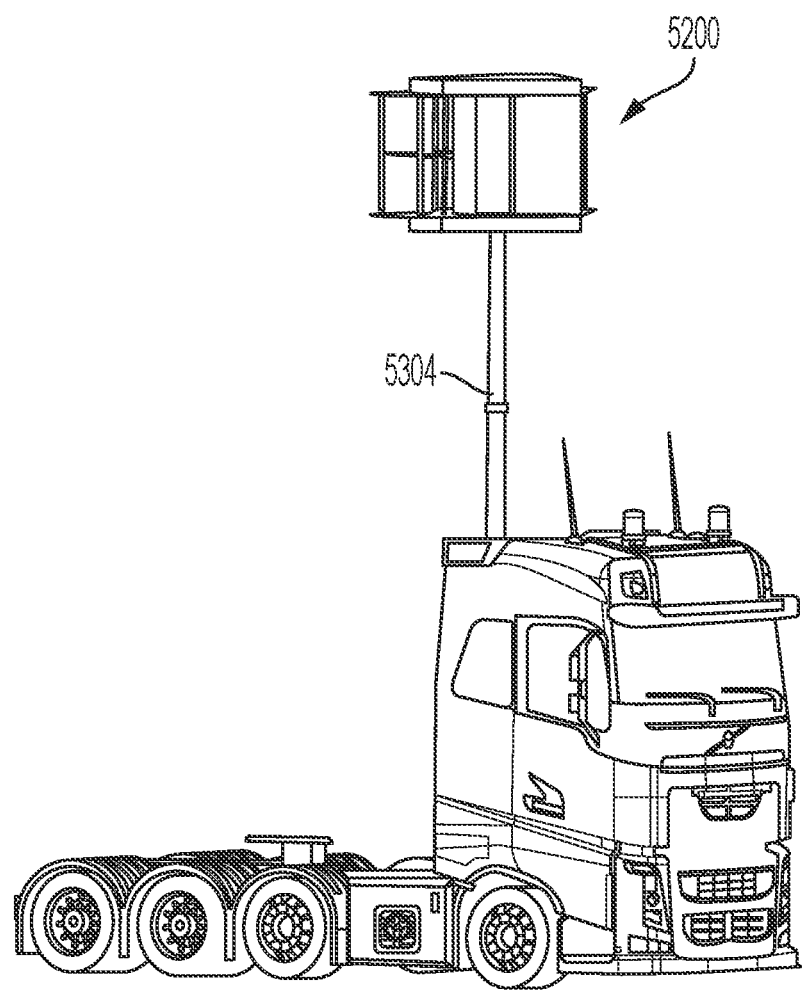

In some embodiments, the wind generator 5200 may be positioned on a structure 5304 as illustrated in FIG. 53. The structure 5304 may be a tower, a roof top, a pole, etc., configured to position the wind generator 5200 at a higher elevation where airflow may have fewer interruptions to increase an efficiency of the wind generator 5200. In some embodiments, the wind generator 5200 may include a wing 5302 or weather vane positioned behind the exhaust opening of the wind generator 5200. The wing 5302 may be configured to position the wind generator 5200 in line with the direction of the wind. For example, if the wind is blowing perpendicular to the wind generator 5200, the wing 5302 may cause the wind generator 5200 to rotate until the wind is passing over the front deflector 5202 and into the turbines 5204, 5206. In some embodiments, the structure 5304 may be a telescoping pole that may extend and retract. As illustrated in FIGS. 57A and 57B, the telescoping structure 5304 may be coupled to a vehicle, such as a heavy duty truck. For example, the telescoping structure 5304 may allow the wind generator 5200 to be positioned in a low-profile position (e.g., a position to minimize wind resistance or air drag) while the vehicle is in motion. When the vehicle is stopped, such as when the vehicle is parked for the night, waiting in a loading area, etc., the telescoping structure 5304 may raise the wind generator 5200 to a higher elevation with improved airflow, such that the wind generator 5200 may generate electrical power to recharge batteries of the vehicle and/or to power vehicle accessories, such as air conditioners, heaters, radio, refrigerated trailers etc., without running the engine of the vehicle.

Figure 50:
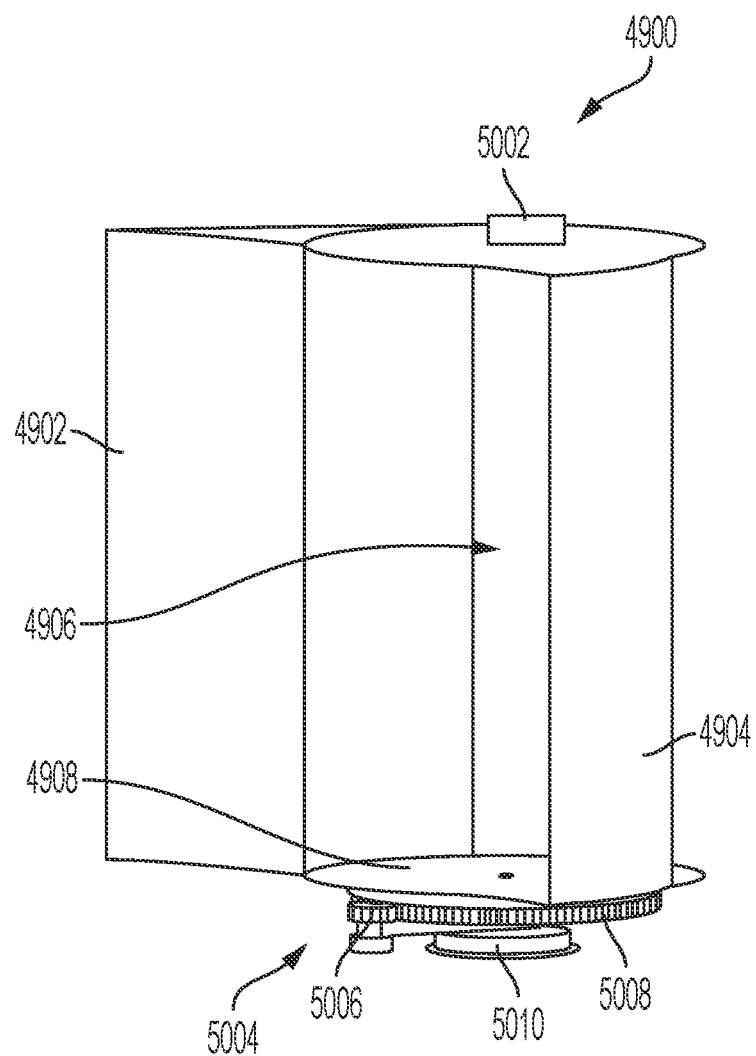
Figure 51A:
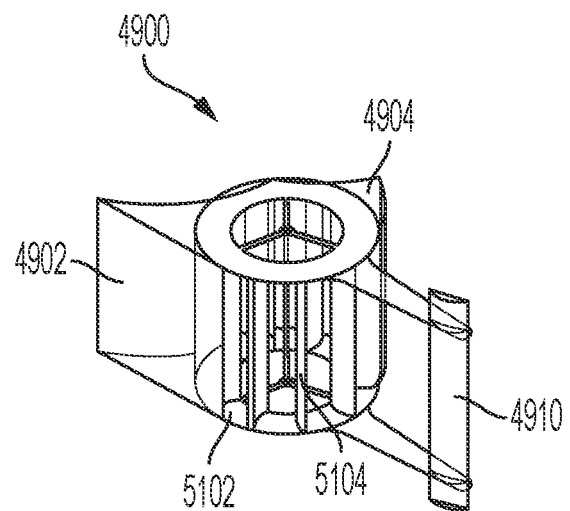
Figure 51B:
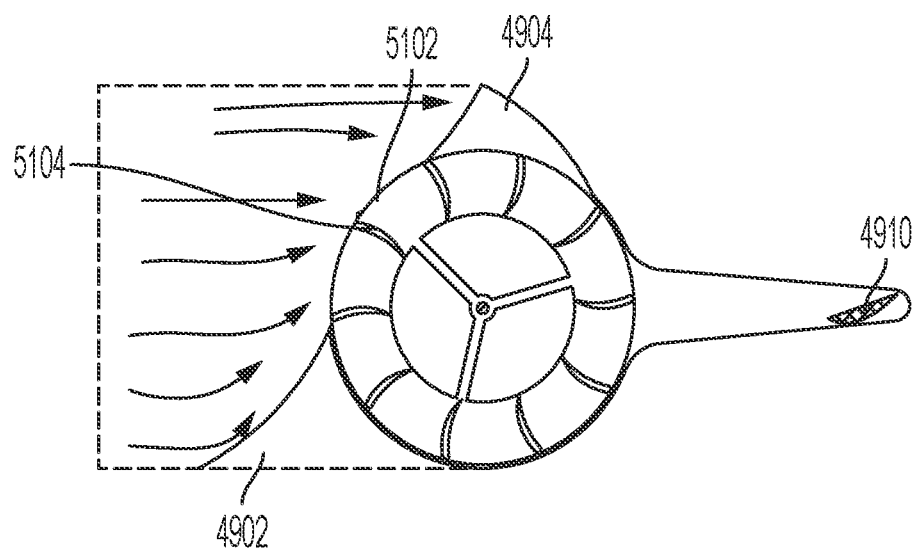
Figure 52:
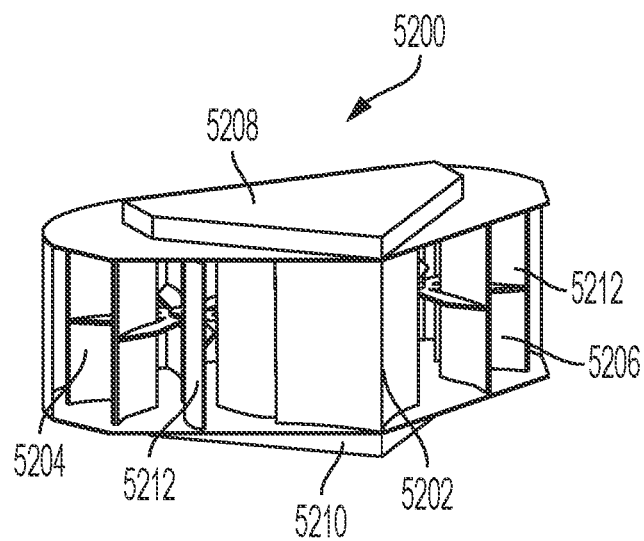
FIGS. 52-54B illustrate different views of a wind generator in accordance with embodiments of the present disclosure.
Figure 54A:
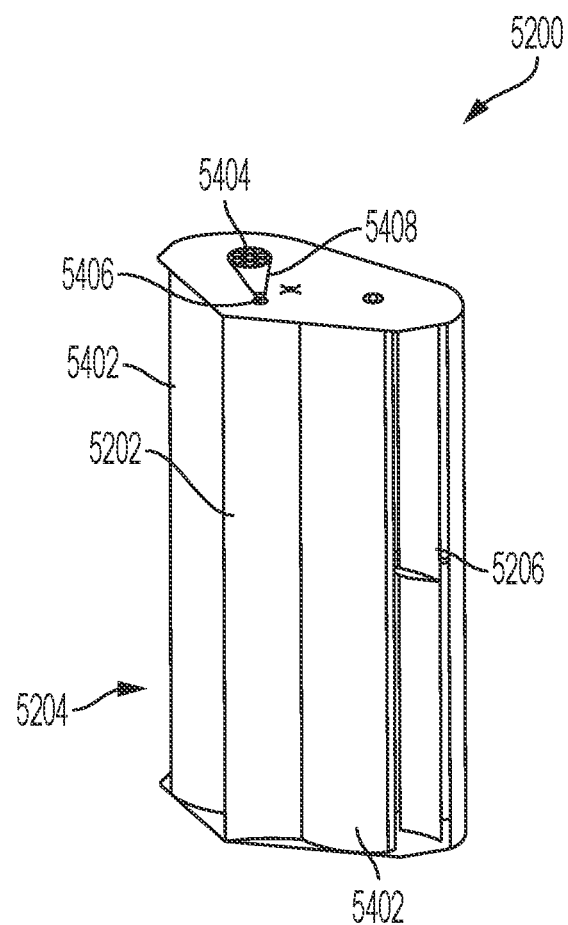
Figure 54B:
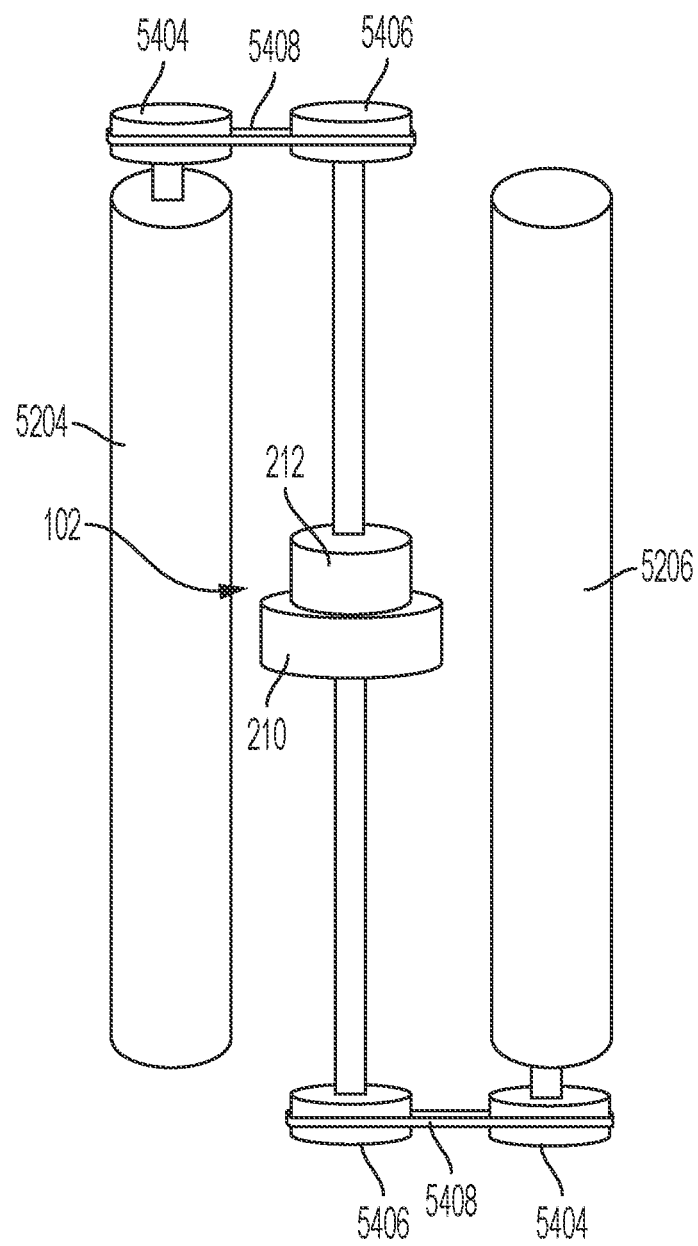

In larger applications, such as the embodiment illustrated in FIGS. 54A and 54B, the wind generator 5200 may include a drive assembly similar to the drive assembly 5004 illustrated in FIG. 50 configured to reposition the wind generator 5200. The wind generator 5200 may include a weather vane or a sensor similar to the wind direction detector 5002 illustrated in FIG. 50. The drive assembly may then position the wind generator 5200 into an optimal position.

The first turbine 5204 and the second turbine 5206 may be operably coupled to a generator 102 to generate electrical power from the rotation of the turbines 5204, 5206. For example, the first turbine 5204 may be operatively coupled to the stator 210 and the second turbine 5206 may be operatively coupled to the rotor 212. Thus, the rotation of the first turbine 5204 may cause the stator 210 to rotate in a first direction and the rotation of the second turbine 5206 may cause the rotor 212 to rotate in a second opposite direction. As described above, rotating the stator 210 and the rotor 212 in opposite directions may increase the relative speed between the stator 210 and the rotor 212, which may result in increased power generation.

The wind generator 5200 may include a top cover 5208 and a bottom cover 5210. The covers 5208, 5210 may be configured to protect motion transfer components, such as outputs, inputs, gears, pulleys, belts, chains, etc., that may be used to operatively coupled the turbines 5204, 5206 to the generator 102. FIG. 54A illustrates a wind generator 5200 with the covers 5208, 5210 removed to view an embodiment of the motion transfer components. As illustrated in FIGS. 54A and 54B, the motion transfer components may include a turbine output 5404 coupled to at least one of the turbines 5204, 5206. The turbine output 5404 may be operably coupled to a generator input 5406, such as a shaft. As illustrated in FIGS. 54A and 54B, the turbine output 5404 may be operably coupled to the generator input 5406 through a connecting band 5408, such as a belt (e.g., toothed belt, ribbed belt, v-belt, etc.) or a chain. In some embodiments, the turbine output 5404 and the generator input 5406 may be gears operatively coupled through an engagement of the teeth of the gears.

The turbine outputs 5404 of the turbines 5204, 5206 may be positioned on opposite ends of the wind generator 5200, such as the top and the bottom of the wind generator 5200. This may facilitate rotating the opposite ends of the generator input 5406 in opposite directions as described above. For example, the generator 102 may be positioned behind the front deflector 5202 between the two ends of the wind generator 5200. The first turbine 5204 may be operatively coupled to the generator input 5406 on a first end of the wind generator 5200. The generator input 5406 on the first end of the wind generator 5200 may be operatively coupled to the stator 210 of the generator 102. The second turbine 5206 may be operatively coupled to the generator input 5406 on a second end of the wind generator 5200. The generator input 5406 on the second end of the wind generator 5200 may be operatively coupled to the rotor 212 of the generator 102. Thus, the turbines 5204, 5206 rotating in opposite directions may result in the stator 210 and the rotor 212 rotating in opposite directions.

The wind generator 5200 may include covers 5402 configured to cover the inlets to the turbines 5204, 5206. The covers 5402 may be configured to close off the inlets to prevent airflow over the turbines 5204, 5206 when the wind generator 5200 is offline. For example, the covers 5402 may be closed when the wind generator 5200 is undergoing maintenance or repairs. In other instances the covers 5402 may be closed when the wind generator 5200 is being transported. In some cases, the covers 5402 may be configured to substantially prevent damage to the turbines 5204, 5206, such as during transportation or during a storm. The covers 5402 may be formed to substantially match a curvature of an outer diameter of the turbines 5204, 5206. The covers 5402 may retract into an area behind the front deflector 5202 when not in the closed configuration. The covers 5402 may be configured to substantially prevent damage to the generator 102 when the wind generator 5200 is operating by forming a barrier between the turbines 5204, 5206 and the generator 102, such that debris may not pass through the turbines 5204, 5206 and impact the generator 102.

Figure 55:
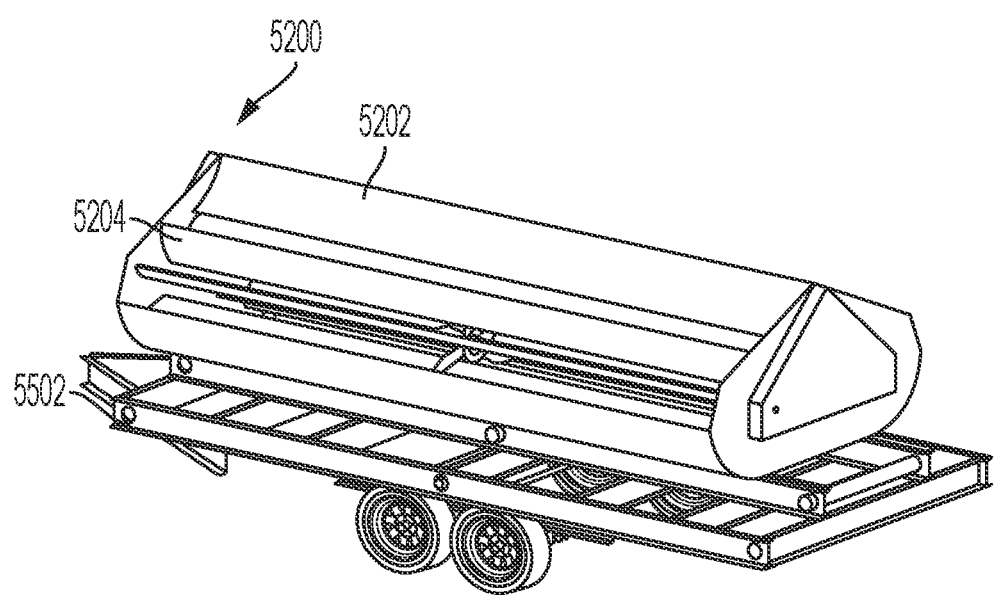
FIGS. 55 and 56 illustrate different views of the wind generator of FIG. 54A mounted to a transportation platform in accordance with embodiments of the present disclosure.
Figure 56:
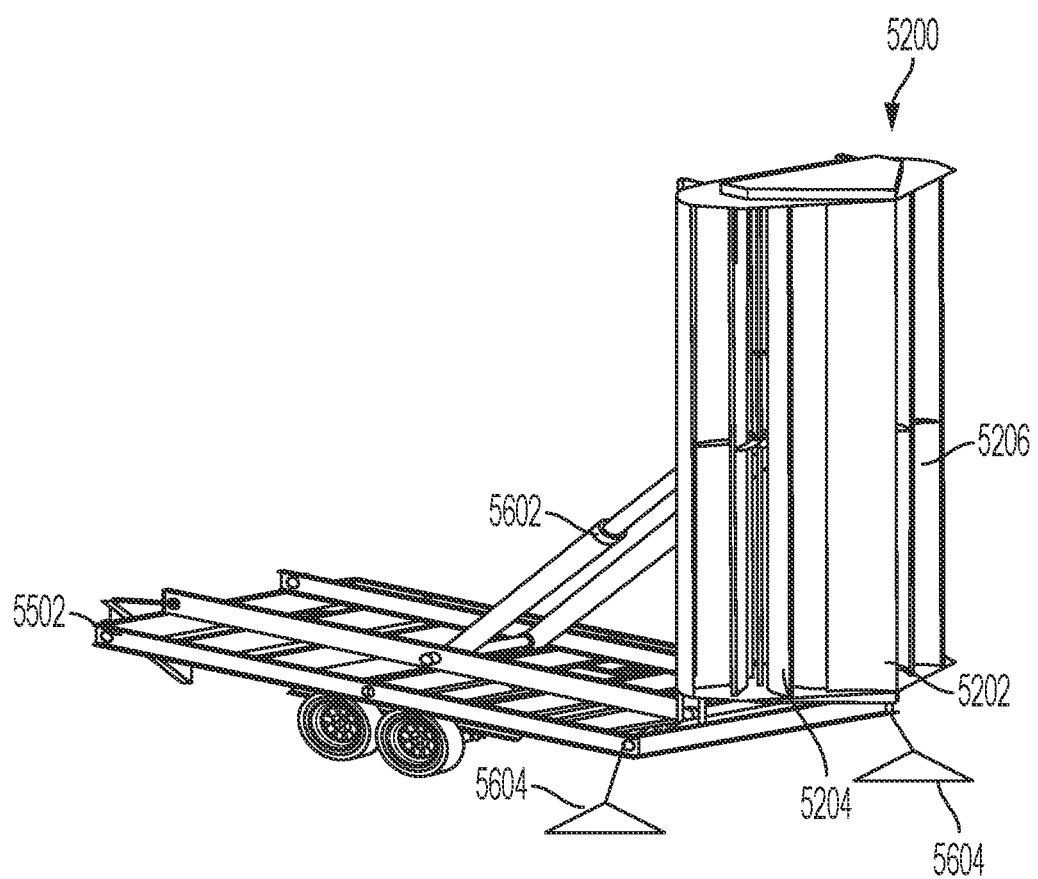

FIGS. 55 and 56 illustrate a transportable embodiment of a wind generator 5200. The wind generator 5200 may be mounted to a transportation platform 5502, such as the platform on a trailer or a train car. The wind generator 5200 may be configured to lie flat on the transportation platform 5502, such that the exhaust opening of the wind generator 5200 lies on the transportation platform 5502 and the front deflector 5202 is pointed away from the transportation platform 5502 as illustrated in FIG. 55. Positioning the wind generator 5200 to lie flat on the transportation platform 5502 during transportation may reduce the frontal area of the wind generator 5200. Reducing a frontal area of the wind generator 5200 may reduce the drag during transportation. Furthermore, positioning the weight of the wind generator 5200 closer to the transportation platform 5502 may increase the stability of the wind generator 5200 during transportation.

The wind generator 5200 may be lifted into an operational position with a lifting apparatus 5602, such as hydraulic or pneumatic rams as illustrated in FIG. 56. In some embodiments, the lifting apparatus 5602 may be a manual apparatus, such as a hand crank including gearing or a pulley system to lift the wind generator 5200 into the operational position. In some embodiments, the wind generator 5200 may include locking hardware, such as pins, latches, etc., to lock the wind generator 5200 in the operational and/or transportation positions. In some embodiments, the wind generator 5200 may be configured to pivot or rotate on the transportation platform 5502 when in the operational position, such that the wind generator 5200 may be positioned in an optimal position for generating power from the wind. For example, the wind generator 5200 may include a wing (e.g., wing 5302) or a drive assembly (e.g., drive assembly 5004) for positioning the wind generator 5200 in the optimal position. The transportation platform 5502 may include additional stabilizing elements 5604, such as extendable jacks, stabilizer legs, extendable feet, etc. The stabilizing elements 5604 may be configured to support the transportation platform 5502 against tipping when the wind generator 5200 is in the operational position.

The embodiments of the present disclosure may enable the capture of oscillating motion for the conversion into electrical energy. Oscillating motion is present in vehicles when driving, such as through bumps in the road, uneven road surfaces, etc. Capturing and converting energy from the suspension of vehicles may enable vehicle manufacturers to increase the efficiency of vehicles, such as by increasing vehicle ranges for electric or hybrid vehicles, reducing the run time of fossil fuel powered range extenders in hybrid vehicles, and even reducing the electrical load (e.g., alternator load) on standard fossil fuel powered vehicles improving the fuel efficiency of the vehicles.

Embodiments of the present disclosure may enable efficient the capture of electrical energy from renewable energy sources that involve oscillating motion, such as tidal generators and/or wind generators.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. An energy conversion device comprising:
   a shaft including a first portion and a second portion wherein the first portion of the shaft is configured to rotate relative to the second portion of the shaft;
   a rotor coupled to the first portion of the shaft;
   a stator coupled to the second portion of the shaft;
   a first one-way bearing coupled to the first portion of the shaft configured to transfer rotational input to the first portion of the shaft in a first direction; and
   a second one-way bearing coupled to the second portion of the shaft configured to transfer rotational input to the second portion of the shaft in a second direction opposite the first direction.

2. The energy conversion device of claim 1, further comprising an input arm coupled to the first one-way bearing and the second one-way bearing.

3. The energy conversion device of claim 2, further comprising a second input arm coupled to a third one-way bearing and a fourth one-way bearing, wherein the third one-way bearing is coupled to the first portion of the shaft configured to transfer rotational input to the first portion of the shaft in the first direction and the fourth one-way bearing is coupled to the second portion of the shaft configured to transfer rotational input to the second portion of the shaft in the second direction.

4. The energy conversion device of claim 1, wherein the rotor includes a plurality of magnets arranged radially about the rotor.

5. The energy conversion device of claim 1, wherein the stator includes a plurality of windings arranged radially about the stator.

6. The energy conversion device of claim 1, further comprising an input assembly coupled to the first one-way bearing.

7. The energy conversion device of claim 6, wherein the input assembly includes a gearing mechanism operatively coupled to an input arm.

8. The energy conversion device of claim 7, wherein the gearing mechanism includes a planetary gear set including a ring gear, one or more planet gears, and a sun gear, wherein the sun gear is coupled to the first one-way bearing and the one or more planet gears are coupled to the input arm.

9. An energy conversion assembly comprising:
   a drive shaft, the drive shaft including a first portion and a second portion, wherein the first portion is configured to rotate relative to the second portion;
   a first input arm coupled to the drive shaft through at least two one-way bearings, wherein a first one-way bearing is coupled to the first portion of the drive shaft and positioned in a first direction and a second one-way bearing is coupled to the second portion of the drive shaft in a second direction opposite the first direction; and
   a generator coupled to the drive shaft, the generator comprising a rotor and a stator, wherein the rotor is coupled to the first portion of the drive shaft and the stator is coupled to the second portion of the drive shaft.

10. The energy conversion assembly of claim 9, further comprising at least one gearing mechanism coupling the first input arm to the drive shaft through the at least two one-way bearings.

11. The energy conversion assembly of claim 10, wherein the at least one gearing mechanism comprises a planetary gear set including a ring gear, one or more planet gears, and a sun gear.

12. The energy conversion assembly of claim 11, wherein the sun gear is coupled to at least one of the at least two one-way bearings and the one or more planet gears are coupled to the first input arm.

13. The energy conversion assembly of claim 9, further comprising a second input arm coupled to the drive shaft through a second set of at least two one-way bearings, wherein a third one-way bearing is coupled to the first portion of the drive shaft and positioned in a first direction and a fourth one-way bearing is coupled to the second portion of the drive shaft in a second direction opposite the first direction.

14. A wind generator comprising:
   a drive shaft, the drive shaft including a first portion and a second portion, wherein the first portion is configured to rotate relative to the second portion;
   a first wind turbine configured to rotate in a first direction, the first wind turbine operatively coupled to the first portion of the drive shaft;
   a second wind turbine configured to rotate in a second direction opposite the first direction, the second wind turbine operatively coupled to the second portion of the drive shaft; and
   a generator coupled to the drive shaft, the generator comprising a rotor and a stator, wherein the rotor is coupled to the first portion of the drive shaft and the stator is coupled to the second portion of the drive shaft.

15. The wind generator of claim 14, wherein the first wind turbine and the second wind turbine are substantially coaxial.

16. The wind generator of claim 14, wherein the first wind turbine and the second wind turbine are laterally offset from one another and the drive shaft is positioned laterally between the first wind turbine and the second wind turbine.

17. The wind generator of claim 16, further comprising a first connecting band coupling an output of the first wind turbine to the first portion of the drive shaft and a second connecting band coupling an output of the second wind turbine to the second portion of the drive shaft.

18. The wind generator of claim 14, further comprising a deflector configured to direct airflow to a front side of vanes of the first wind turbine and the second wind turbine and to substantially prevent airflow over a back side of the vanes of the first wind turbine and the second wind turbine.

19. The wind generator of claim 14, further comprising an extendable mounting structure configured to move the wind generator between an operating position and a transporting position.

20. The wind generator of claim 19, wherein the extendable mounting structure is coupled between the wind generator and a transportation platform.

* * * * *